United States Patent [19]

Greene et al.

[11] Patent Number: 5,166,879
[45] Date of Patent: Nov. 24, 1992

[54] LOAD CONDITION PREEMPTION OF SCHEDULED GEARSHIFTS IN AN AUTOMATIC TRANSMISSION

[75] Inventors: Thomas L. Greene, Plymouth; Steven M. Lepi; Bruce J. Palansky, both of Livonia; Michael J. Cullen, Dearborn, all of Mich.

[73] Assignee: Ford Motor Company, Dearborn, Mich.

[21] Appl. No.: 622,102

[22] Filed: Dec. 3, 1990

[51] Int. Cl.⁵ .................. B60K 41/06; G06F 15/20
[52] U.S. Cl. ............................ 364/424.1; 74/866
[58] Field of Search ............ 364/424.1; 74/866, 870, 74/871

[56] References Cited

U.S. PATENT DOCUMENTS

| | | | |
|---|---|---|---|
| 3,747,438 | 7/1973 | Toyoda et al. | 74/866 |
| 4,285,252 | 8/1981 | Yamaki et al. | 74/866 |
| 4,335,428 | 6/1982 | Miki et al. | 364/424.1 |
| 4,380,048 | 4/1983 | Kishi et al. | 364/424.1 |
| 4,471,437 | 9/1984 | Yoshino et al. | 364/424.1 |
| 4,637,278 | 1/1987 | Nishikawa et al. | 74/866 |
| 4,897,790 | 1/1990 | Bieber | 364/424.1 |
| 4,943,921 | 7/1990 | Baltusis et al. | 364/424.1 |
| 4,958,287 | 9/1990 | Sugimura et al. | 364/424.1 |
| 5,016,175 | 5/1991 | Baltusis et al. | 364/424.1 |

Primary Examiner—Parshotam S. Lall
Assistant Examiner—Collin W. Park
Attorney, Agent, or Firm—Frank G. McKenzie; Roger L. May

[57] ABSTRACT

An electronic control system for scheduling gearshifts in an automatic transmission includes storing in electronic memory accessible to a microprocessor, functions relating vehicle speed to throttle position, one function being related to each upshift and downshift. Gearshifts are made by probing computer memory with current values for throttle position and vehicle speed, and determining on the basis of the stored shift schedule whether an upshift or downshift is required. Upshift points are determined also on the basis of an empirically determined function relating throttle position and vehicle acceleration immediately before an upshift. Shift control logic commands an upshift on the basis of a predetermined shift schedule, provided minimum vehicle acceleration-engine throttle position criteria are satisfied. Vehicle acceleration and speed from stored schedules of gearshift functions are corrected automatically and continually by a calculated ratio to account for changes in the driveline components from the components originally installed in the powertrain of which the transmission is a member and differences these component changes produce from a calculated base NOV value.

12 Claims, 35 Drawing Sheets

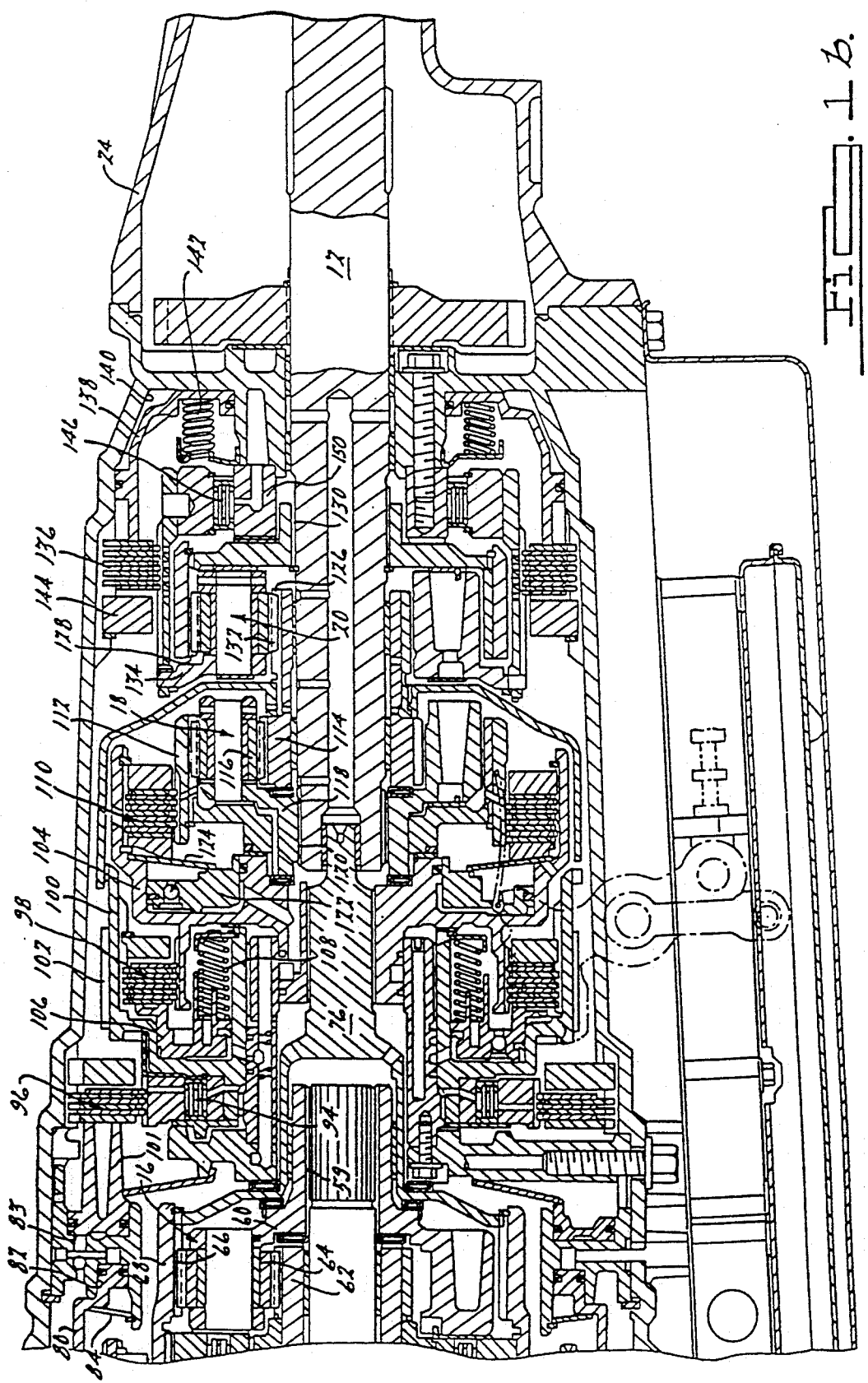

1st Gear In OD and D Ranges

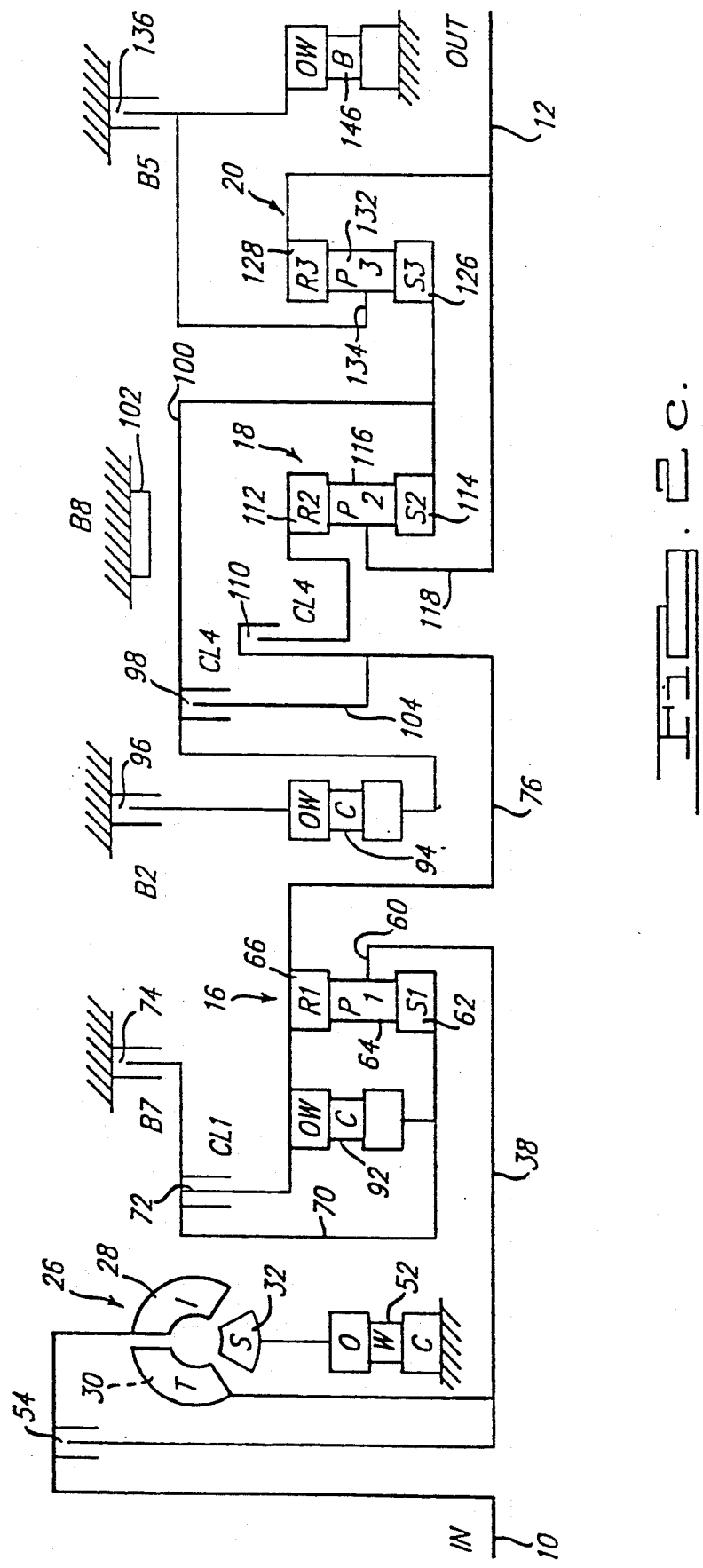

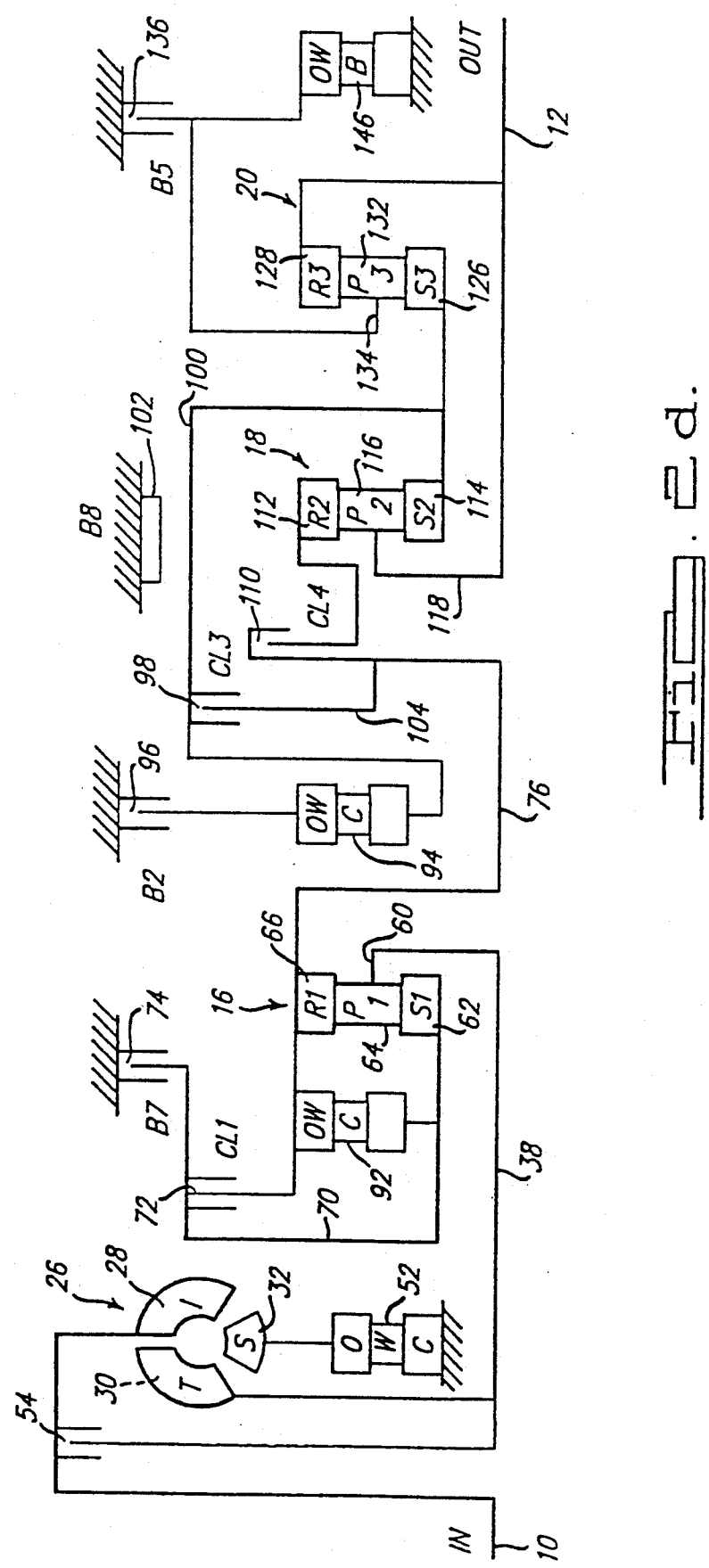
FIG. 2.d.
4th Gear OD Range

*1st Gear Manual or 1 Range*

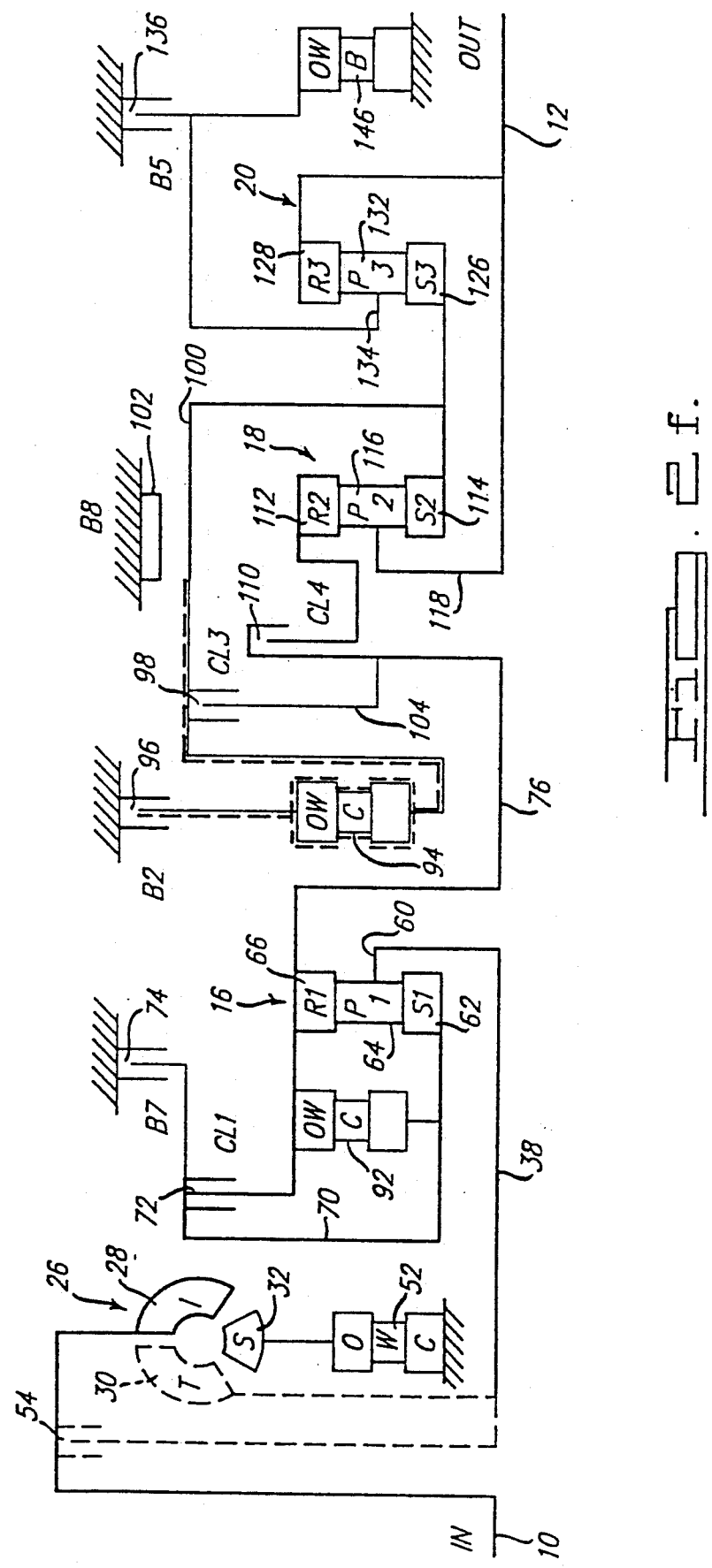

3rd Gear Manual or D Range

| SPEED/ RANGE | FRICTION ELEMENTS ||||||| ONE WAY CLUTCHES ||||||
| | COAST | INTERMEDIATED | DIRECT | FORWARD | REVERSE | OVERDRIVE | BAND | DRIVE ||| COAST |||
| | | | | | | | | OWC | OWC | OWB | OWC | OWC | OWB |
| | 72 CL1 | 96 B2 | 98 CL3 | 110 CL4 | 136 B5 | 74 B7 | 102 B8 | 92 | 94 | 146 | 92 | 94 | 146 |
| 1 Manual | X | | | X | X | | | | | | | | |
| 1 Automatic | | | | X | | | | X | | X | O/R | | O/R |
| 2 Manual | X | X | | X | | | X | | | O/R | | | O/R |
| 2 Automatic | | X | | X | | | | X | X | O/R | O/R | O/R | O/R |
| 3 Manual | X | X | X | X | | | | | O/R | O/R | | O/R | O/R |
| 3 Automatic | | X | X | X | | | | X | O/R | O/R | O/R | O/R | O/R |
| 4 | | X | X | X | | X | | O/R | O/R | O/R | O/R | O/R | O/R |
| R | X | | X | | X | | | | O/R | | | O/R | |

X = Engaged    O/R = Overrunning

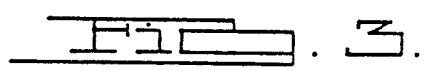

FIG. 3.

| PRND21 Position | Gear | Shift Control Sol.1 188 | Sol.2 190 | Converter Clutch Control Sol.3 192 | Coast Clutch Control Sol.4 194 | Coast Braking |
|---|---|---|---|---|---|---|
| OD | 4<br>3<br>2<br>1 | Off<br>↓<br>On<br>↓ | Off<br>On<br>↓<br>Off | On/Off<br>↓ | Off<br>↓<br>↓<br>↓ | Yes<br>No<br>↓<br>↓ |
| OD (Cancel SW. On) | 3<br>2<br>1 | Off<br>On<br>↓ | On<br>↓<br>Off | ↓ | On<br>↓<br>↓ | Yes<br>No<br>↓ |
| 2 | 2 | Off | Off | ↓ | Off | Yes |
| 1 | 1 | On | Off | Off | Off | Yes |
| P<br>N<br>R | P<br>N<br>R | ↓<br>↓<br>On | ↓<br>↓<br>Off | Off | ↓<br>↓<br>Off | No<br>No<br>Yes |

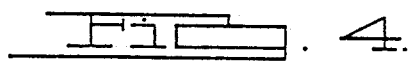

FIG. 4.

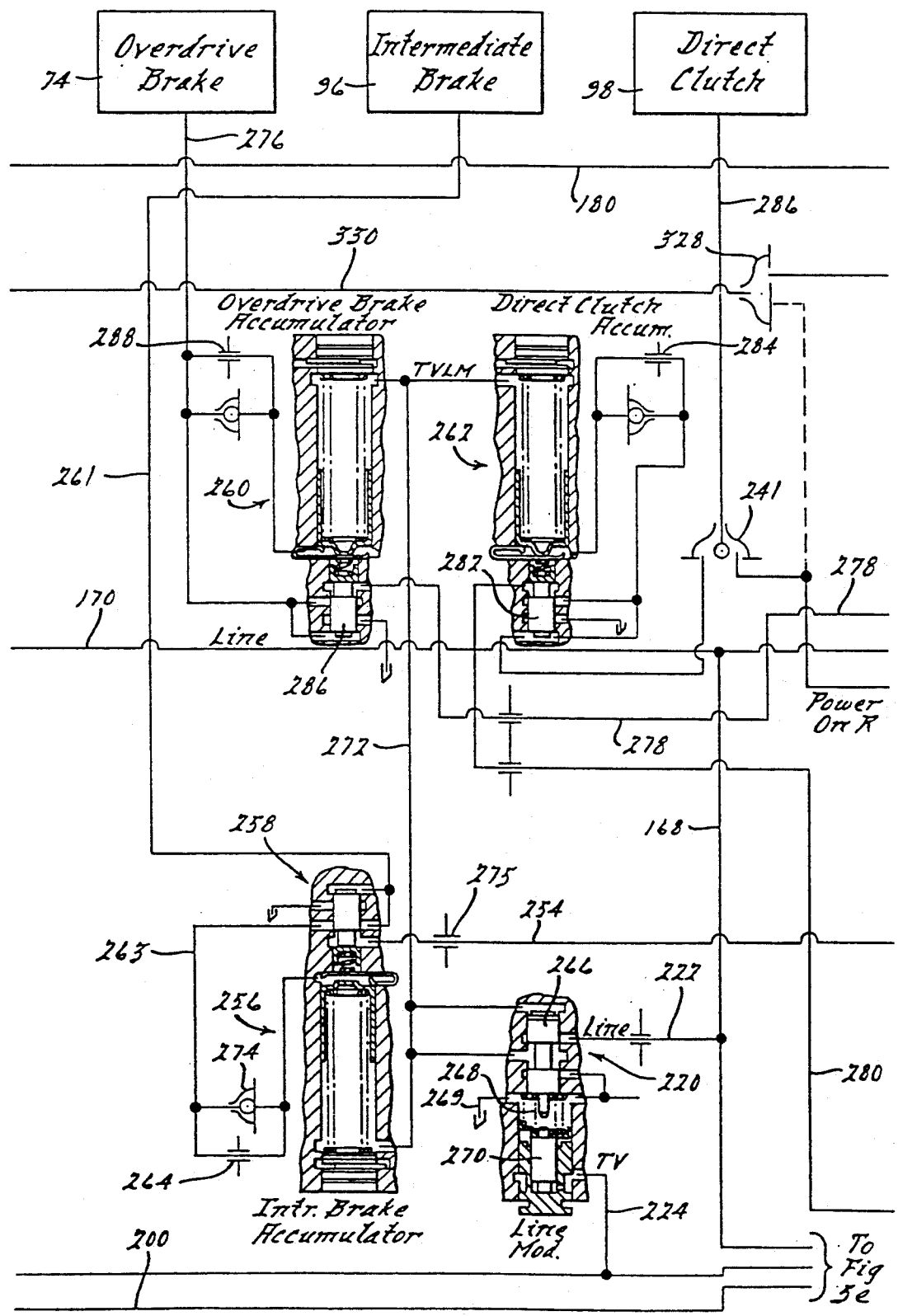

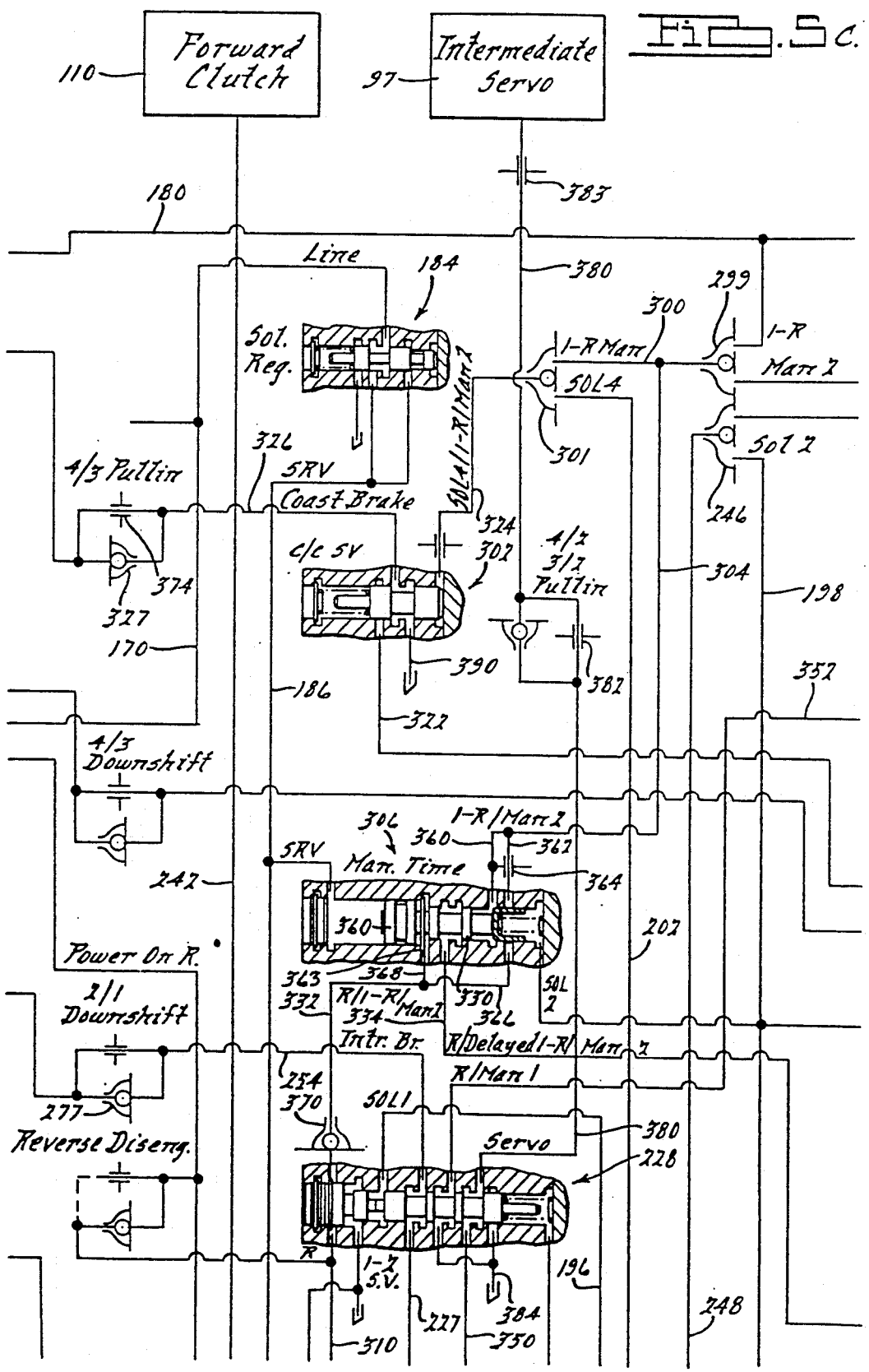

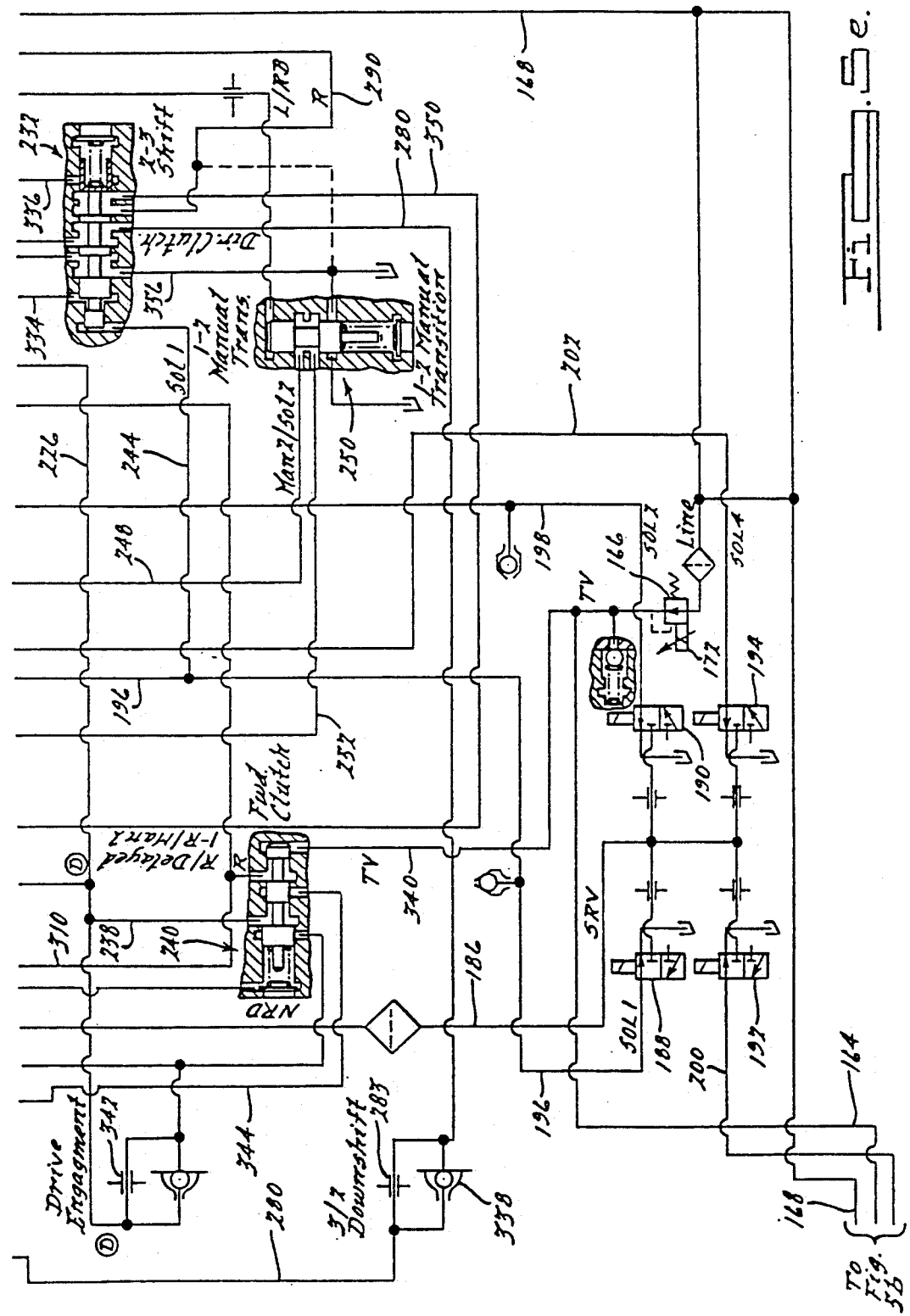

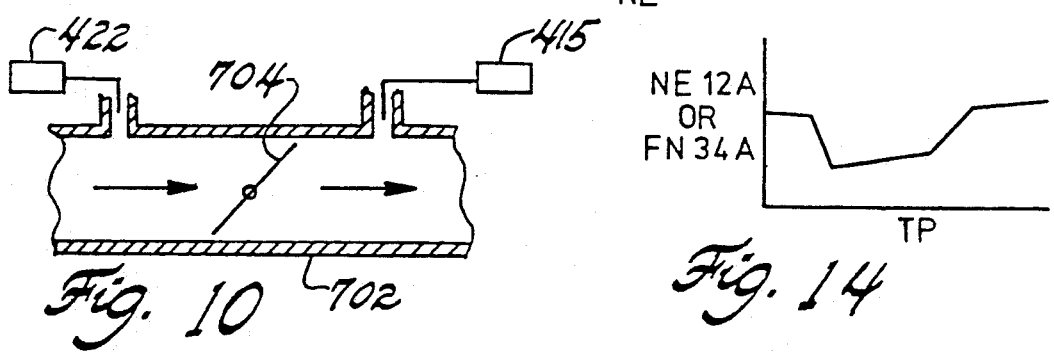
Fig. 13
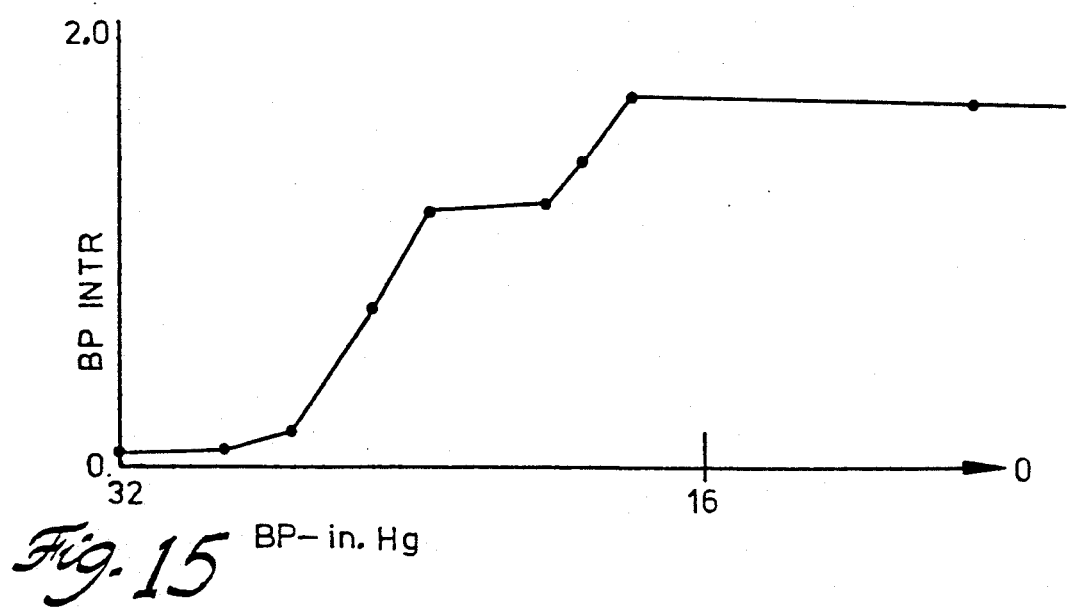
Fig. 10
Fig. 14
Fig. 15

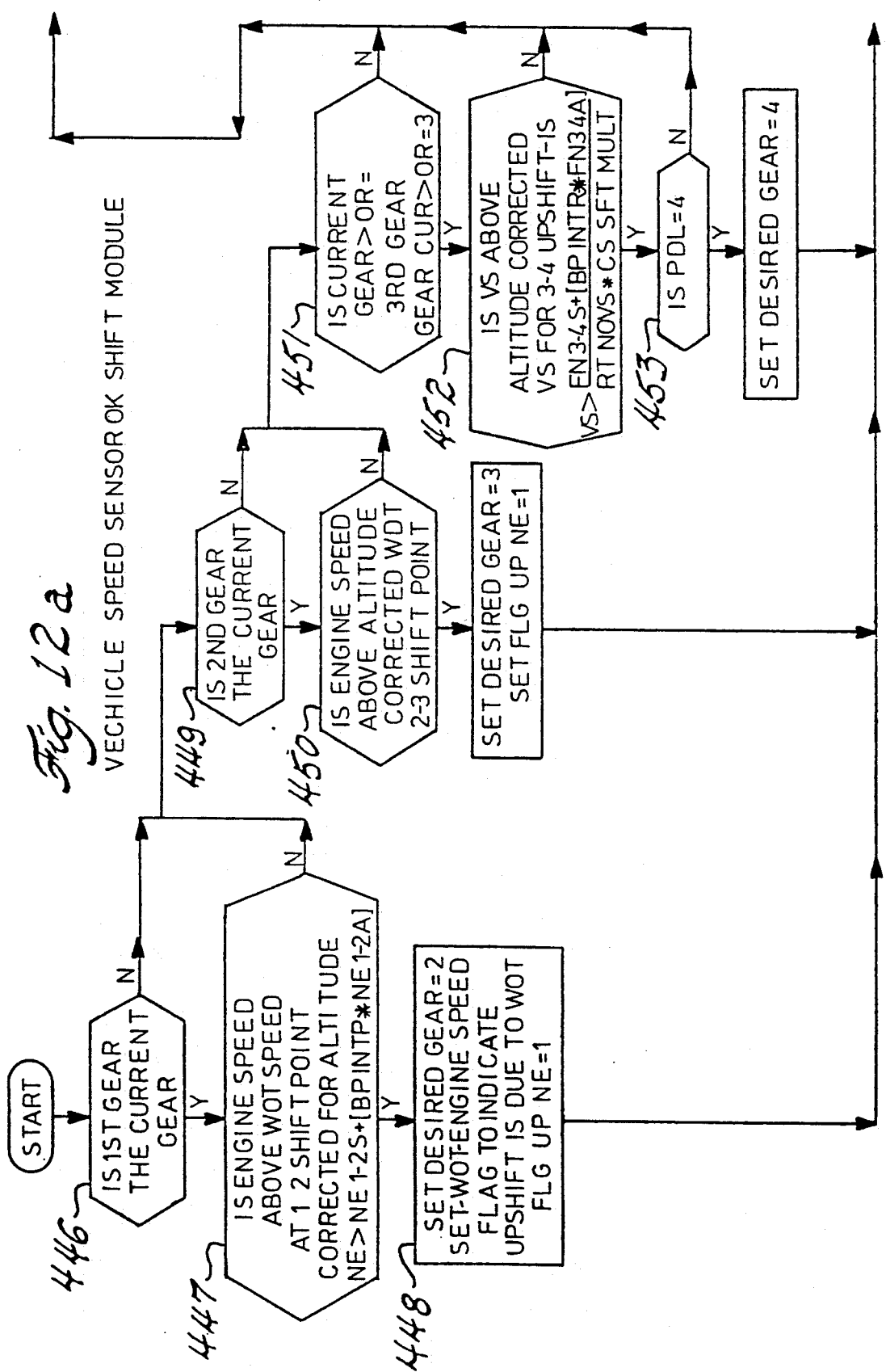

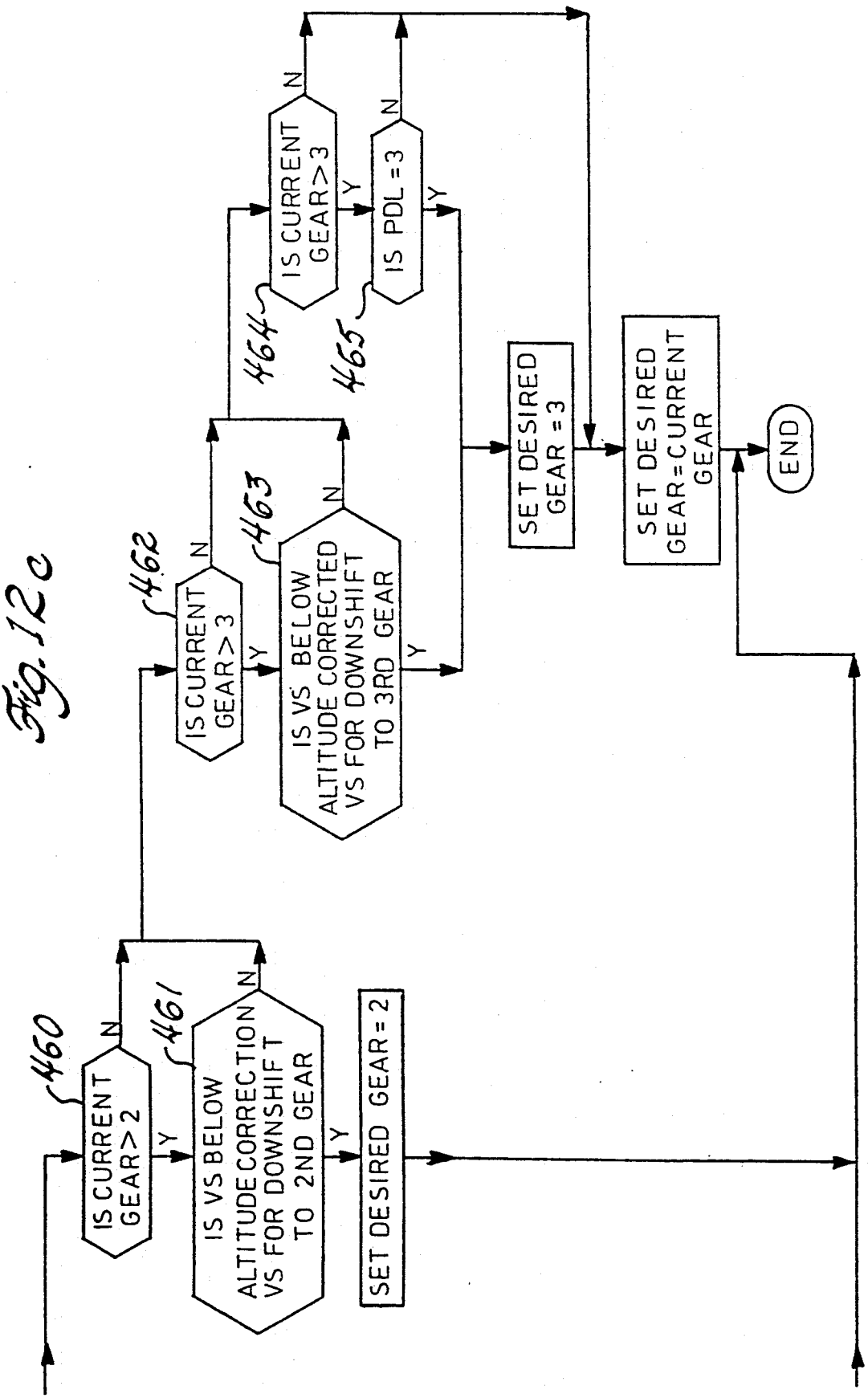

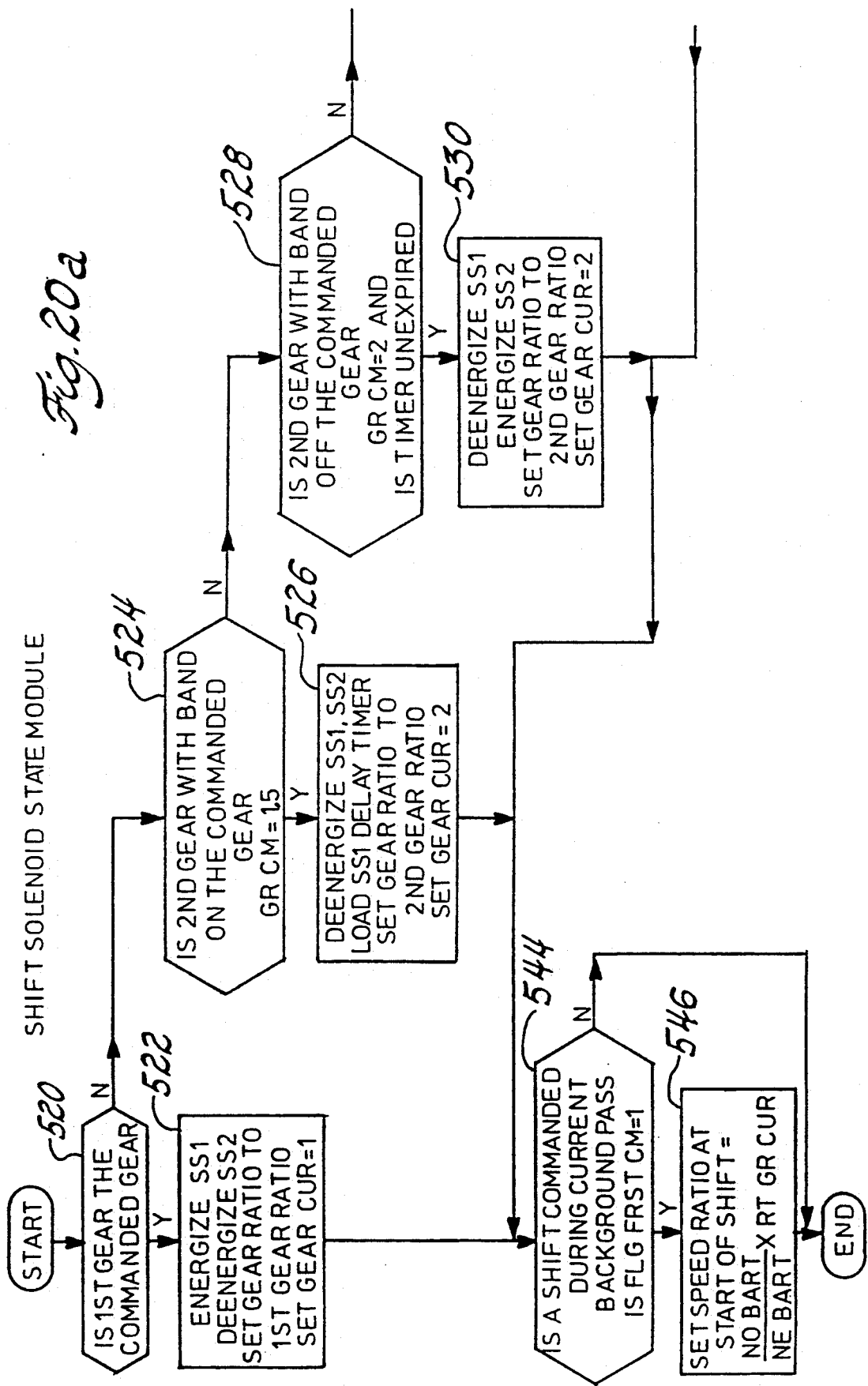

| TP REL. | 2-3 Upshift $V_A$ Minimum | 3-4 Upshift $V_A$ Minimum |
|---|---|---|
| 0 | 0 | 0 |
| 100 | .2 | .3 |
| 300 | .5 | .6 |
| 1000 | .4 | .45 |

LOAD CONDITION PREEMPTION OF SCHEDULED GEARSHIFTS IN AN AUTOMATIC TRANSMISSION

BACKGROUND OF THE INVENTION

1. Field of the Invention

This invention deals with gearshift control in an automatic transmission. It relates particularly to a control technique that prevents a scheduled upshift under certain conditions in which the powertrain operates under load if quality of the upshift or performance of the powertrain after the upshift would be unsatisfactory under conditions extant immediately before the scheduled upshift.

2. Description of the Prior Art

The invention relates generally to automotive transmission controls of the type disclosed in U.S. Pat. No. 4,943,921 and U.S. Pat. No. 5,016,175. This application and patent are assigned to the assignee of this invention.

In an electronically controlled, variable speed automatic transmission, the current gear ratio is determined on the basis of a schedule relating vehicle speed to throttle position stored in electronic memory accessible to a microprocessor. The schedule defines boundaries between operating conditions on the basis of vehicle speed and throttle position, each boundary separating an operating range for a particular gear ratio from an adjacent range of these variables where a different gear ratio is the appropriate gear ratio. Generally, the shift schedule produces a reference vehicle speed, the dependent variable, when memory is addressed with the current throttle position, the independent variable, for the current gear ratio. The reference vehicle speed is compared to current vehicle speed periodically so that upshifts and downshifts from the current gear occur when vehicle speed rises or falls below boundaries corresponding to the current gear ratio and throttle position.

However, when moving from a flat road to an inclined surface, vehicle speed declines if throttle position is maintained. Thereafter, in order to maintain vehicle speed, the throttle is opened by depressing an accelerator pedal. Typically, this action produces a downshift to a lower operating gear ratio where greater torque is delivered to the drive wheels of the vehicle. Consequently, vehicle speed increases. But if vehicle speed exceeds the intended vehicle speed, the accelerator pedal is partially released, thereby inducing an upshift to a higher gear ratio where drive wheel torque decreases and vehicle speed drops.

Operation of the transmission in combination with the engine throttle in this manner is called "hunting", a cyclic repetition of gear shifts between adjacent gear ratios with corresponding changes in vehicle speed.

A similar condition can occur when moving from a flat road to a declining slope, vehicle speed can be maintained by partially releasing the accelerator pedal, but this usually produces an upshift to a higher gear ratio and an increase in vehicle speed.

Operating conditions other than a change in road grade can cause an automatic transmission to cycle unintentionally between gear ratios. Changes in atmospheric pressure due to changes in altitude from that corresponding to the shift schedule; a substantial change in vehicle load from the gross weight corresponding to the shift schedule, such as when pulling a heavy trailer; degradation in engine condition; and a substantial elevated ambient temperature can induce powertrain hunting.

Various techniques have been devised to avoid this problem. For example, U.S. Pat. No. 4,335,428 describes a technique for detecting increased engine load when running on a slope and determinating the appropriate gear ratio in accordance with the magnitude of the loading associated with the inclination of the slope. Slope detecting reference data, indicative of vehicle speeds for various ranges of slope correspond to throttle openings in different gear ratios, are used to detect presence of the slope by comparing the actual gear ratio, the throttle opening, vehicle speed, against the slope detecting reference data.

Signals indicative of the shift lever position, vehicle speed and throttle opening are applied as input to a microprocessor, a slope detecting program determines presence of the slope from these data and modifies standard shift data to produce shift reference data, which is then written into memory. By comparing the current gear ratio throttle opening and vehicle speed against corresponding reference data, a speed ratio is determined and used to energize solenoid valves to produce gear ratio changes in accordance with the control programs.

The gear shift control of U.S. Pat. No. 4,285,252 uses a stored schedule of vehicle acceleration and a comparison between actual vehicle acceleration to the stored value to change scheduled gear shift in accordance with differences between stored and actual vehicle acceleration. The control includes a first schedule of gear shift changes suitable when the vehicle is traveling on a flat road and a second schedule for gear changes suitable for an uphill road. On the basis of a stored schedule of vehicle accelerations, reference to throttle position and actual vehicle acceleration, the slope of the grade is determined, and a gear shift schedule corresponding to the slope is selected to control gear shifts while on the grade.

The gear shift control of U.S. Pat. No. 4,380,048 relies on an average value of engine load and vehicle speed to determine a programmed acceleration, which is compared to actual acceleration to determine whether a transmission shift characteristic is to be selected.

The gear shift control of U.S. Pat. No. 4,897,790 intentionally skips selected drive ratios on the basis of perceived driving conditions and modifies the scheduled gear ratio change on the basis of vehicle acceleration.

It is preferable that the gearshift control for automotive use should anticipate unacceptable operating conditions in the prospective gear ratio and prevent a shift to that gear. Lengthy computation time required for a microprocessor to determine that a scheduled gearshift will produce powertrain hunting or to establish an acceptable alternative should be avoided. Gearshift control techniques in the prior art require excessive computation time and unacceptably large memory capacity.

SUMMARY OF THE INVENTION

An electronic control system for scheduling gearshifts in a multiple speed automatic transmission includes storing in electronic memory, accessible to a microprocessor, functions relating vehicle speed to throttle position, one function being related to each upshift and downshift. Gearshifts are made by probing computer memory with current values of throttle position and vehicle speed, and determining on the basis of the stored shift schedule whether an upshift or downshift is required. Upshift points are determined also on the basis of the maximum engine speed when a wide open throttle condition is detected.

A function relating minimum acceptable vehicle acceleration before an upshift and throttle position is determined empirically. Calibration is conducted at altitude above sea level, on an inclined road of substantial and constant grade. A vehicle equipped with a powertrain of the type to be controlled climbs the hill in a gear other than the highest gear of the transmission, at constant throttle position, with a positive time rate of change of vehicle speed. Vehicle speed, recorded or calculated on the basis of data acquired during successive background loops, is divided by the period between these background loops to establish vehicle acceleration values.

If an upshift is unacceptable, the calibration test is performed again under identical conditions except that vehicle acceleration immediately before an upshift is increased until a shift of high quality and conformance to NVH and post-shift vehicle speed criteria results. Calibration is repeated entirely in this way for each of the gear ratios from which an upshift is to be controlled on the basis of the minimum vehicle acceleration standard. Finally, the entire calibration procedure is repeated while descending a grade to establish for each gear ratio the functions relating pre-downshift vehicle acceleration to throttle position that produce a downshift satisfying NVH and post-shift vehicle speed criteria.

An object to the calibration is to determine whether, after each scheduled upshift, sufficient throttle position movement to a more fully open position is possible in order to maintain after an upshift the vehicle speed present immediately before the upshift. An additional range of throttle position movement is required to increase engine torque because torque delivered to the wheels is reduced due to an upshift. However, at a given vehicle speed, the range of increased throttle position is limited by the corresponding downshift line, which must be avoided to prevent cyclic upshifting and downshifting, the powertrain hunting condition. Shift control logic commands an upshift on the basis of the predetermined shift schedule, provided minimum vehicle acceleration-engine throttle position criteria are satisfied.

Ambient barometric pressure alters the vehicle speed and engine speed attained at high altitude in comparison to those speeds that result for the same throttle position at sea level. Therefore, shift points defined by the schedule on the basis of vehicle speed and throttle position, and shift points related to wide open throttle conditions and engine speed, are corrected for altitude or barometric pressure changes from a reference barometric pressure at which the scheduled shift points are determined for the functions stored in computer memory.

The second altitude correction is based on the stored schedule of shifts relating throttle position to vehicle speed. In this case, the shift schedule is corrected by comparing current vehicle speed to an altitude corrected vehicle speed involving a calibration constant, vehicle speed where an upshift is made at sea level, a barometric pressure integration factor, a calibration constant stated in terms of vehicle speed difference representing a correction of vehicle speed at sea level where the upshift is made, and the ratio of actual N/V to base N/V stored in computer memory.

An object of this invention is to provide a technique for producing gearshifts when various reference speeds are attained, despite changes made in the equipment with which the vehicle is originally fitted when first assembled, and differences between the actual original equipment and that which is assumed or intended. The control computes output shaft speed from a signal whose frequency is a measure of vehicle speed. This frequency also reflects the actual axle ratio of the differential mechanism, the size of gears used in the speedo gear assembly and tire size of the vehicle as originally assembled. On the basis of these data, a base NOV value is stored permanently in computer memory.

The vehicle speed signal can indicate an incorrect vehicle speed, thereby affecting the actual NOV value, because of changes made to axle ratio and tire size after vehicle assembly, such as replacing the differential mechanism with a unit having a different axle ratio or changing tire size. Also, the vehicle speed signal can misrepresent actual vehicle speed through incorrect selection and installation of the speedo gear.

These changes and deviations would cause incorrect shifting from the gearshift schedule stored in computer memory unless a continuous recalculation of NOV is made during the service life of the vehicle and the NOV value is used to correct the stored reference speeds at which transmission operation, or actions within the transmission such as torque converter control, are changed. This control performs both of these functions.

The control produces a ratio of actual NOV to base NOV, and stores this ratio in continuous electronic memory, so that the reference speeds at which operation is scheduled to change are automatically corrected, even in the lowest gears when the vehicle is started.

Remarkably, the control according to this application automatically corrects for errors in transmission assembly and assures that gear shifts occur at the corrected reference speed despite error of this kind. For example, speedo gears having various number of teeth are installed in the transmission assembly after being selected for installation on the basis of the axle ratio and tire size of the vehicle in which the transmission is installed as original equipment. If a speedo gear having a number of teeth compatible with this criteria is installed, the control of this invention correctly adjusts for the incorrect base NOV stored permanently in computer memory. The computed NOV values, stored repetitively in continuous memory, result from the vehicle speed signal, whose frequency depends on the form of the speedo gear. Therefore, incorrect vehicle speed used in the NOV computation cancels the effect in the base NOV value of incorrect speedo gear installation. Consequently, the reference speed, when corrected according to the technique of this invention, accurately produces gear shifts and other operational changes even for a transmission in which the wrong speedo gear is installed.

Vehicle acceleration and speed from stored schedules of gearshift functions are corrected automatically and continually by a calculated ratio to account for changes in the driveline components from the components originally installed in the powertrain of which the transmission is a member and differences these component changes produce from a calculated base NOV ratio.

BRIEF DESCRIPTION OF THE DRAWINGS

FIGS. 1a and 1b taken together are cross section of a transmission according to this invention showing in the assembled condition a hydrokinetic torque converter, the clutches, brakes and gear units.

FIGS. 2a-2h are diagrams of the multiple-speed transmission showing in heavy lines the components that operate to produce each of the various speeds.

FIG. 3 is a table showing the engaged and disengaged states of hydraulic clutches and brakes and the driving and overrunning states of the overrunning clutches for each speed and range in which the transmission can operate.

FIG. 4 is a table showing the states of solenoid-operated shift valves, a converter clutch valve and coast clutch valve for each speed and range of the transmission.

FIGS. 5a-5e show a hydraulic control system capable of engaging and disengaging the hydraulic clutches and brakes of the transmission of FIG. 1. The lines connecting the hydraulic components are labeled alphanumerically to indicate the hydraulic pressures in the lines for each speed and range.

FIG. 10 is a cross section through an engine intake manifold showing the position of a manifold pressure sensor and throttle plate.

FIGS. 12a-12c is a diagram showing logic of a shift module for controlling upshifts and downshifts using a vehicle acceleration function such as that of FIG. 23.

FIG. 13 shows schematically a table of data stored in electronic memory representing factors applied to manifold pressure to produce inferred barometric pressure.

FIG. 14 shows shift point speed correction data, at a reference altitude and corresponding ambient barometric pressure, stored as fox functions in electronic memory.

FIG. 15 is a graph of barometric pressure interpolation factor vs. inferred barometric pressure stored as a fox function in electronic memory.

FIG. 20a-20b is a diagram showing logic for controlling a shift solenoid state module.

DESCRIPTION OF THE PREFERRED EMBODIMENT

1. Gear Units, Clutches and Brakes

Figure 1A:
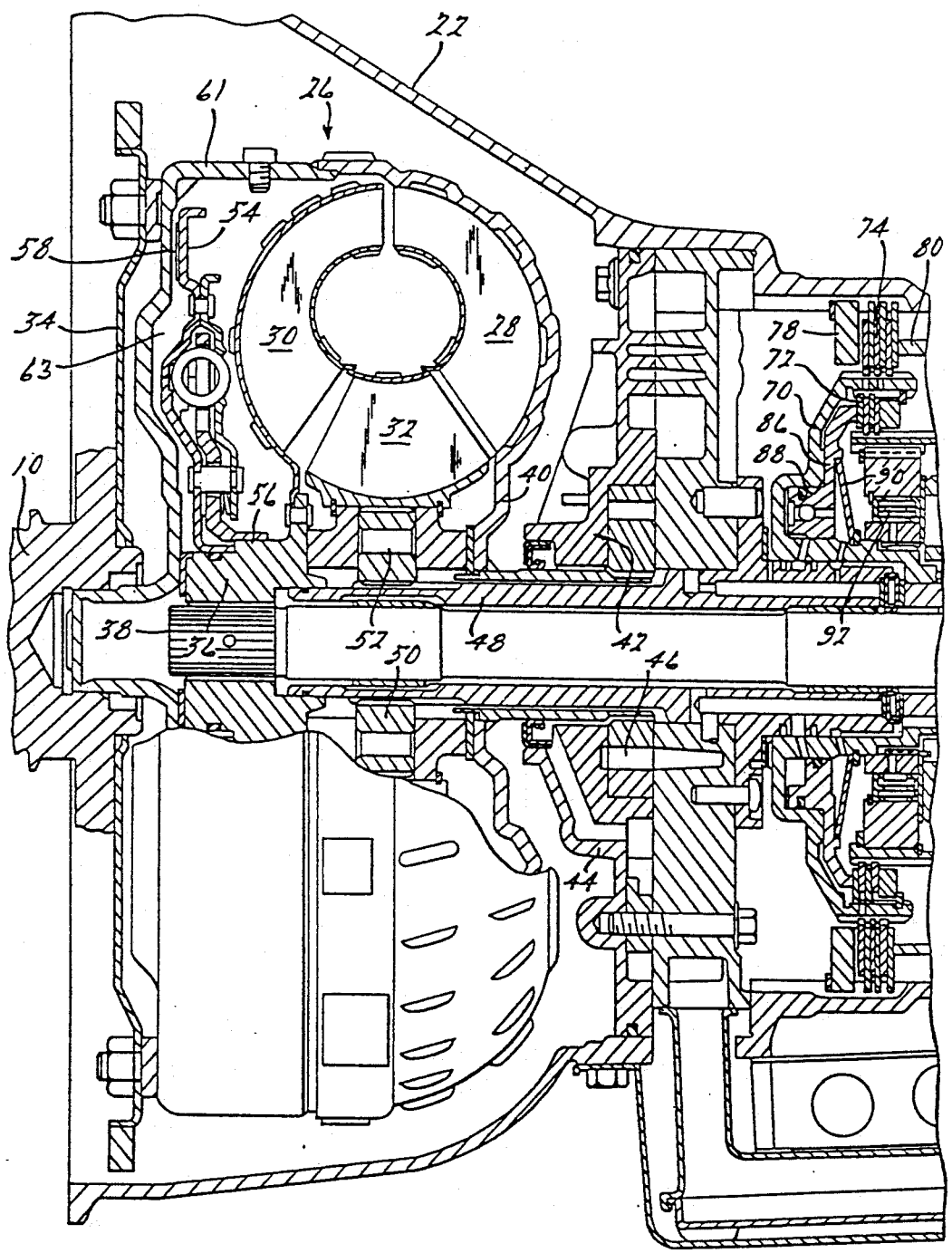
Figure 2A:
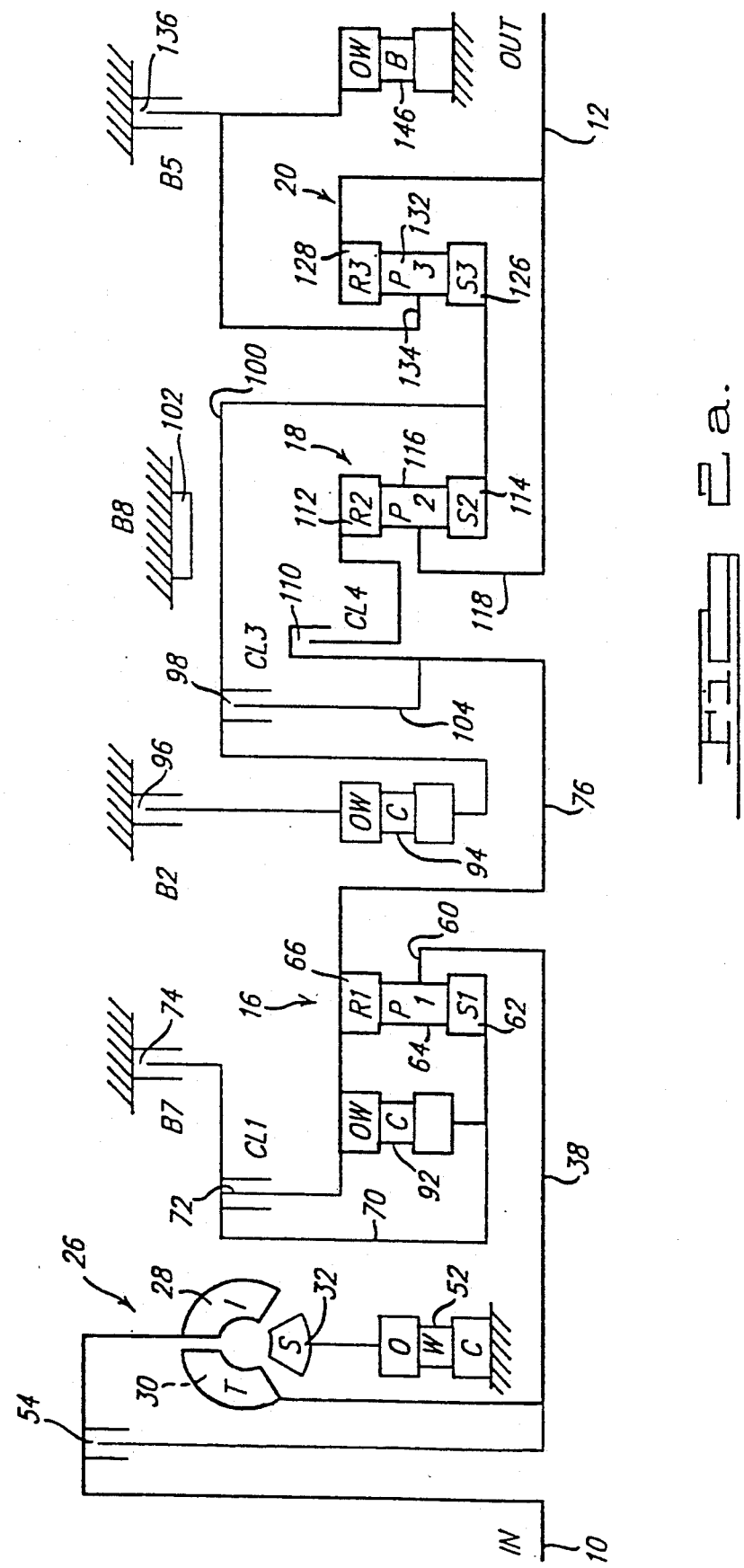
Figure 2B:
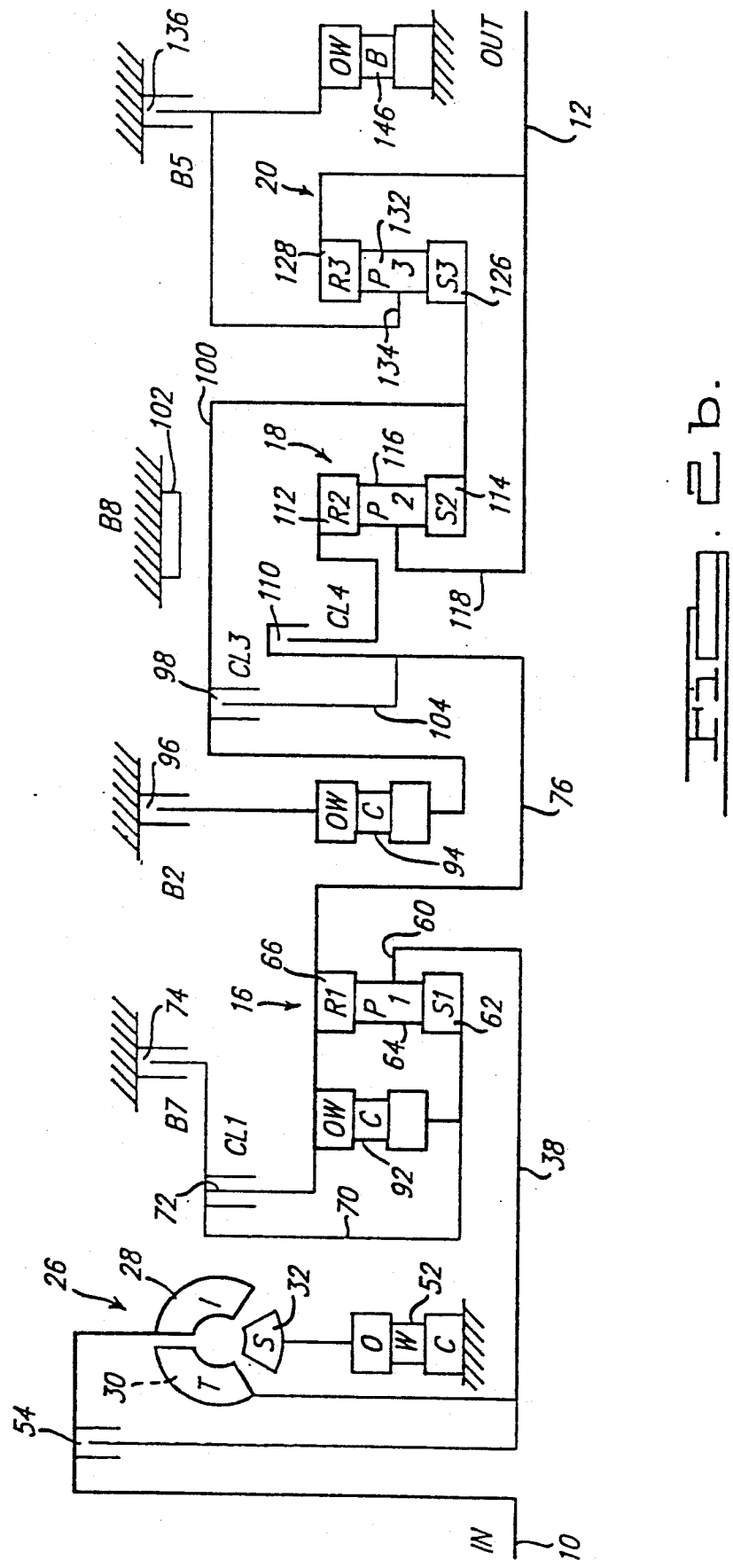
Figure 2E:
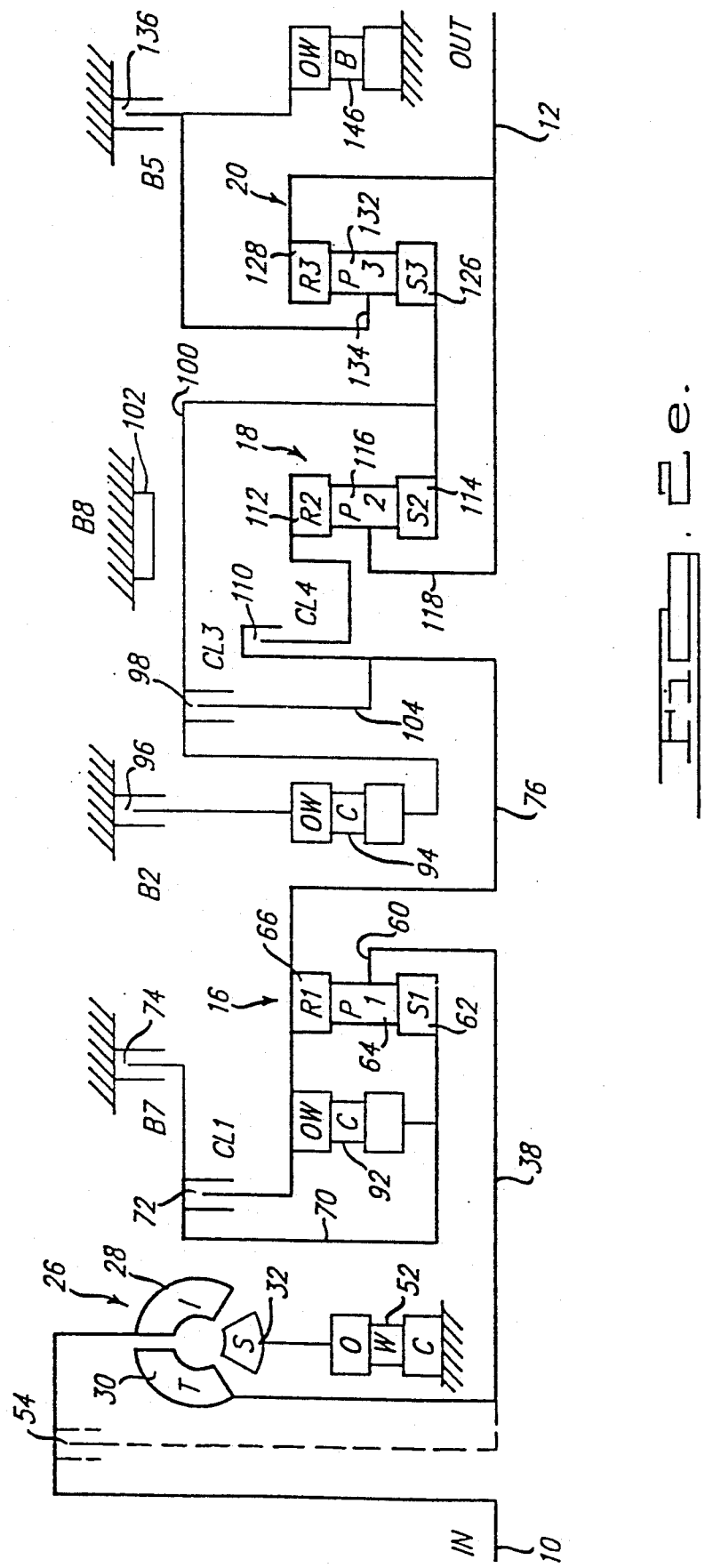
Figure 2G:
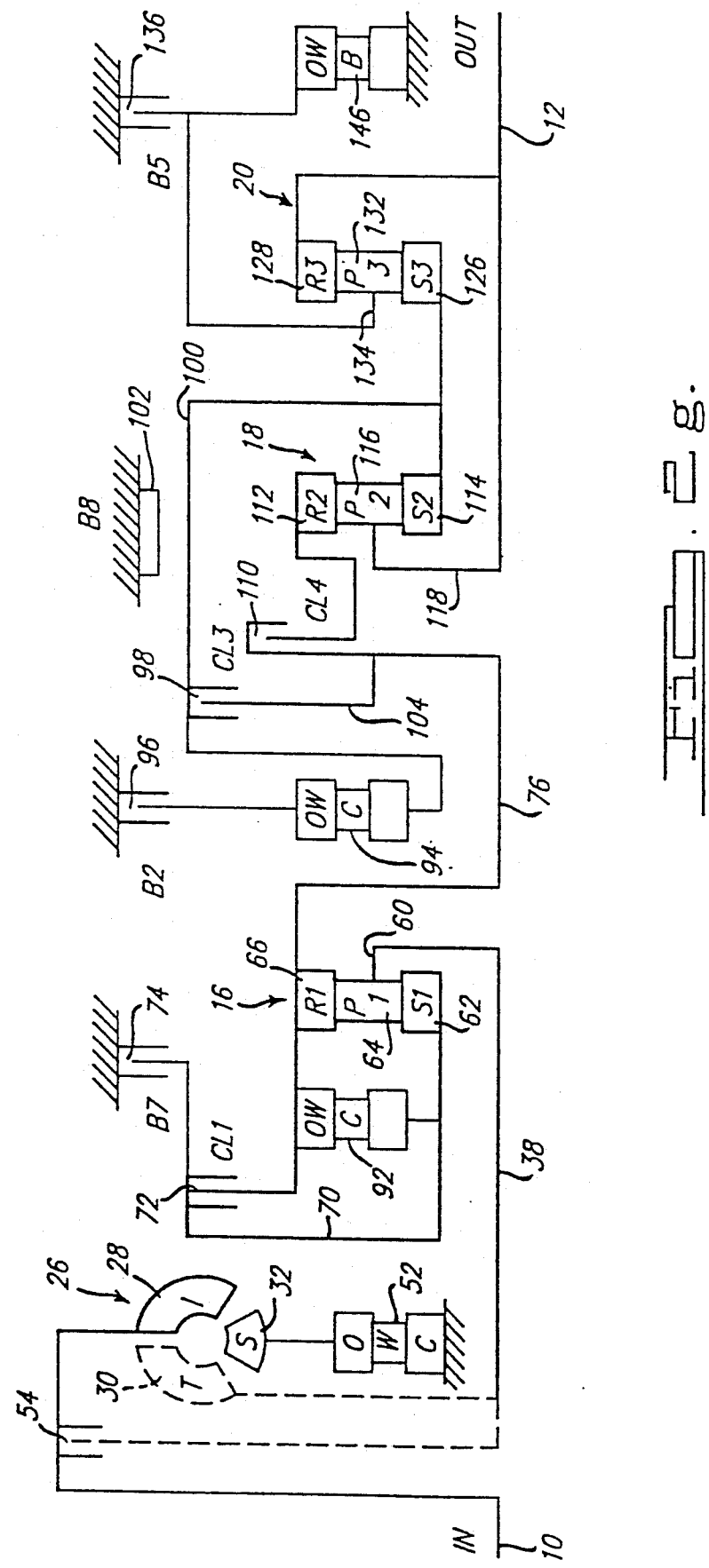
Figure 2H:
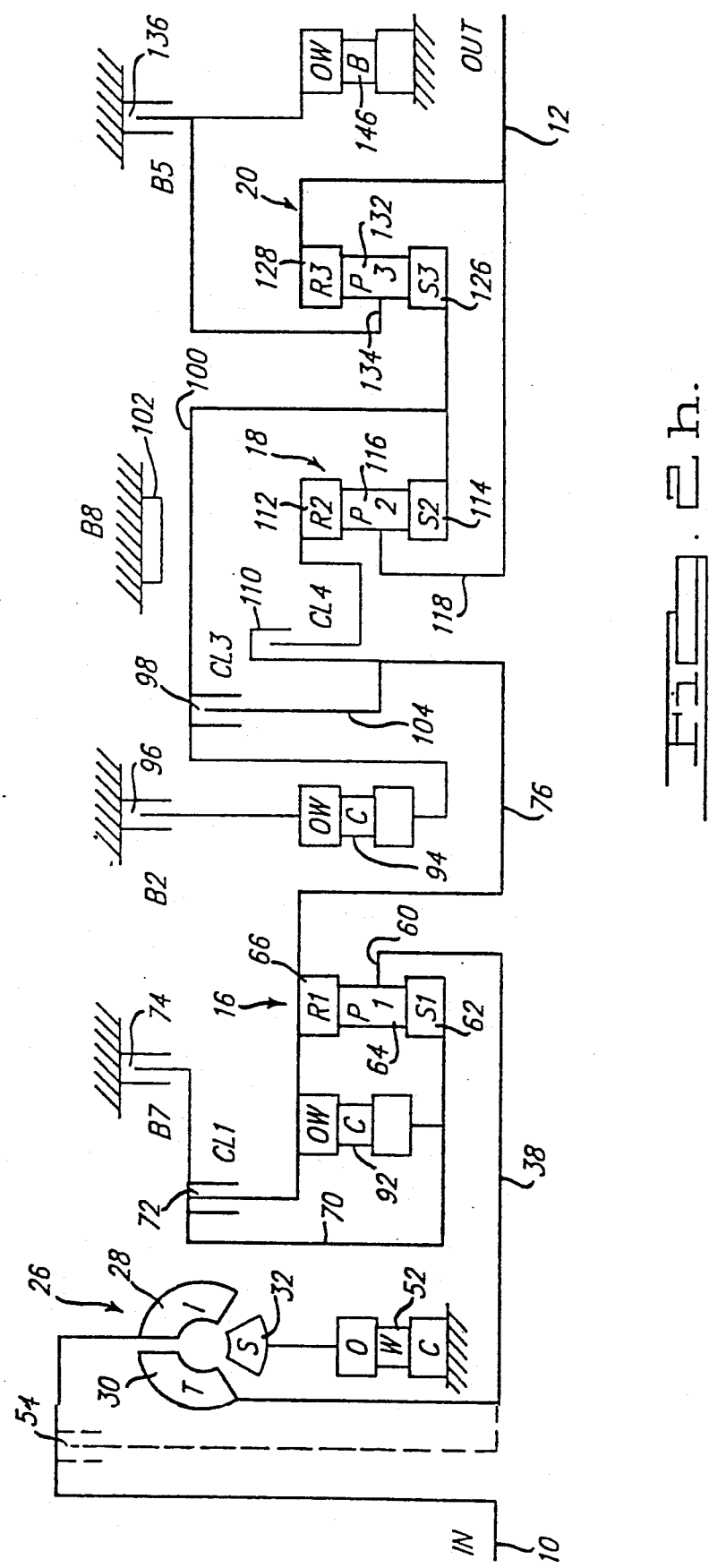

Referring first to FIGS. 1a and 1b, one end of an engine crankshaft 10 is drivably connected through the transmission to the power output tail shaft 12, which is adapted to be connected to the vehicle traction wheels through differential, driveline, and axle assemblies. The main transmission housing 22 encloses simple planetary gear units 16, 18, 20. Transmission housing 22 is bolted at its left-hand periphery to the cylinder block of an internal combustion engine and, at its right-hand end, to the left-hand end of tail shaft extension housing 24, which surrounds output shaft 12.

Transmission housing 22 encloses a hydrokinetic torque converter 26, which includes a bladed impeller 28, a bladed turbine 30 and a bladed stator 32. The impeller, the turbine and the stator are arranged in fluid flow relationship in a common toroidal circuit. The impeller includes a housing connected drivably to drive plate 34, which is bolted to the end of crankshaft 10. Turbine 30 includes a turbine hub 36 splined to turbine shaft 38. Impeller 28 is connected to impeller housing 40, which is journalled for rotation on a portion 42 of a pump housing, which closes converter housing 22. Pump housing 44 is bolted to housing 22 and encloses gear elements of a positive fixed displacement pump 46, which serves as a pressure source for the control valve system to be described with reference to FIGS. 5a-5e. A stator sleeve shaft 48 extends from the pump housing 44 and supports the inner race 50 of a one-way clutch 52 whose outer race supports stator 32.

A torque converter lockup clutch 54 is splined at 56 to the turbine hub 36 and carries a friction surface 58, located at its radially outer end, to drivably engage the torque converter cover 61, welded to the impeller housing. Lockup clutch 54 is closed, locked, applied or engaged to complete a mechanical connection between the impeller and turbine when pressurized hydraulic fluid, contained in the torque converter casing, forces friction surface 58 against the housing. The torque converter is opened, unlocked, released or disengaged so that a hydrodynamic driving connection exists between the impeller and turbine when pressurized hydraulic fluid is supplied through passage 63 between converter cover 61 and friction surface 58 of the lockup clutch to disengage these surfaces.

Turbine shaft 38 is splined at 59 to the carrier 60 of the first planetary gearset 16, which includes sun gear 62, a set of planetary pinions 64 rotatably supported on carrier 60 and ring gear 66. Sun gear 62 is drivably connected to a member 70 that is common to a coast clutch 72 and an overdrive brake 74. Ring gear 66 is drivably fixed to a drum portion 68 connected to intermediate shaft 76.

Overdrive brake 74 includes a set of clutch discs fixed to housing 22, a load block 78 fixed to housing 22, a set of clutch discs drivably connected to the outer surface of clutch member 70 and interposed between the discs affixed to the housing, a clutch piston 80 displaceable hydraulically against the clutch disc assembly and hydraulic cylinder 82 containing piston 80, and a Belleville spring 84 for returning piston 80 to the inactive position when hydraulic pressure is removed from cylinder 82.

Coast clutch 72 includes a set of clutch discs drivably connected to the inner surface of clutch member 70, a load block connected to the inner surface of clutch member 70, a second set of clutch discs drivably fixed to ring gear 66, piston 86 actuated hydraulically to engage the coast clutch disc sets, a hydraulic cylinder 88 within which piston 86 moves, and a Belleville spring 90 to return piston 86 to the disengaged position when hydraulic pressure is removed from cylinder 88.

A first one-way clutch 92 has its outer race drivably connected to ring gear 66, its inner race drivably connected by a spline to cylinder 88 and to sun gear 62 and a driving member located in the annulus between the inner and outer races for producing a one-way driving connection therebetween. A second one-way clutch 94 is located between intermediate brake 96 and direct clutch 98. One-way clutch 94 includes an outer race that carries a set of brake discs for the intermediate brake 96, an inner race drivably fixed to drum 100, and a driving member located in the annular region between the inner and outer races for producing a one-way drive connection therebetween.

Intermediate brake 96 includes a second set of brake discs fixed to housing 22, a load block fixed to the housing, a piston 101 actuated hydraulically to force the brake disc sets into drivable relationship against the load block, hydraulic cylinder 83 within which piston 101 moves and a Belleville spring.

Drum 100 is stopped and held against the transmission casing through the action of an intermediate brake band 102 actuated by a hydraulic intermediate servo. Direct clutch 98 operates to produce a drive connection between drum 100 and clutch member 104. The direct clutch includes a first set of clutch discs splined to the inner surface of drum 100 and a second set of clutch discs connected to clutch member 104, and interposed between successive members of the first clutch disc set. A piston 106 moves within a hydraulic cylinder to force the clutch disc sets into drivable connection against the load block that is carried on the inner surface of the drum 100. Piston 106 moves within the hydraulic cylinder defined by drum 100 and is restored to its disengaged position through operation of a coil compression spring 108.

Forward clutch 110 operates to produce a driving connection between clutch member 104 and the ring gear 112 of the second planetary gearset 18. This gearset includes a sun gear 114, a set of planetary pinions 116 in continual meshing engagement with sun gear 114 and ring gear 112, rotatably supported on a carrier 118 which is drivably connected by spline 120 to the tail shaft 12.

Forward clutch 110 includes a first set of clutch discs drivably connected to the inner surface of clutch member 104 and a second set of clutch discs, each interposed with discs of the first set, drivably connected to the outer surface of ring gear 112. Piston 122 is hydraulically actuated for movement within the cylinder defined by clutch member 104 to force the clutch discs into a drivable connection. Belleville spring 124 returns piston 122 to the disengaged position when hydraulic pressure is removed from the clutch cylinder.

The third planetary gearset 20 includes sun gear 126 formed integrally with sun gear 114, ring gear 128 connected by spline 130 to tail shaft 12, a set of planet pinions 132 rotatably supported on carrier 134, which is drivably connected to a first set of brake discs of the low-and-reverse brake 136. A second set of brake discs of brake 136 is fixed to transmission casing 22; each disc of the second set is interposed between successive discs of the first disc set of brake 136. Brake piston 138 is actuated hydraulically when cylinder 140 is pressurized to force the piston against the first and second brake disc sets and to produce a drivable connection therebetween against the effect of the return spring 142, which forces piston 138 to the brake disengaged position when cylinder 140 is vented. Load block 144, fixed to the transmission casing reacts the force applied by piston 138 to the disc brake sets.

A third one-way clutch 146 includes an outer race pinned to carrier 134, an inner race 150 bolted to the transmission casing 22, and a driving member located in the annular region between the inner and outer races to produce a one-way drive connection between carrier 134 and the casing.

The transmission produces four forward gear ratios and a reverse gear. The three lowest of the forward gear ratios is produced both automatically and by manual operation of the gear selector lever by the vehicle operator. The third forward gear ratio directly connects the engine crankshaft 10 to tail shaft 12, and the fourth forward ratio is an overdrive ratio. When the gear selection is made manually by the vehicle operator, the three lowest forward gear ratios and the reverse drive involve the engagement of coast clutch 72, and through its operation, the engine braking effect is transmitted through the transmission to the tail shaft 12. FIG. 3 shows engaged and release conditions of the clutches and brakes and driving and overrunning conditions of the one-way clutches for each of the gears and ranges of the transmission.

The gear selector lever includes a PRND21 switch, which produces an electrical signal, preferably a voltage, whose magnitudes represent each of the PRND21 positions. The gear selector and the manual valve it controls can be moved among the following alphanumeric positions from leftmost to rightmost: P for park, R for reverse, N for neutral, D for overdrive, 2 for manually selected second gear, and 1 for manually selected first gear. When the gear selector is in the D position and an overdrive cancel button is depressed, a mechanically selected condition called "drive" range, the transmission will produce only the three lowest gears. When the button is released, and the selector is in the OD position, a condition called "overdrive" range, the transmission can produce four forward gears. When the gear selector is moved to the manual 1 or 2 positions, the transmission produces only the first or second gear ratios, respectively.

Coast clutch 72 produces engine braking in third gear when the gear selector is in "drive". Otherwise, the transmission would freewheel in third gear while the vehicle is coasting. When overdrive range is selected, coast clutch 72 is disengaged hydraulically but engine braking results in fourth gear through operation of overdrive brake 74. When manual 2 and manual 1 are selected, the coast clutch is applied hydraulically through operation of a coast clutch shift valve 302; whereas, when drive is selected, the coast clutch shift valve is actuated through operation of a solenoid-actuated coast clutch valve controlled by programmed logic. A manually initiated shift from fourth gear to third gear or second gear causes a short delay to allow overdrive clutch 74 to release fully before coast clutch 72 engages.

To prevent intermediate band 102 from absorbing excessive driveline energy in the manual 2 and manual 1 ranges, application of band 102 is delayed until the coast clutch engagement is inferred by expiration of a shift-in-progress timer.

The torque flow in each gear and range is illustrated in FIGS. 2a-2h.

2. Hydraulic Circuit

FIGS. 5a through 5e show the hydraulic control valve system that controls application and release of the hydraulic clutches and brakes of the change-speed gear box of FIGS. 1 and 2. The various passages are pressurized in accordance with selected positions of a manual valve 160, moved manually by the vehicle operator among six positions P, R, N, OD, 2 and 1, and states of certain solenoid-operated valves as determined by microprocessor execution of control algorithms.

Fluid required for the operation of the hydraulic control valve system is supplied at the output of a hydraulic pump, which is supplied from the sump or reservoir of the transmission through a filter or from a return line connected to the inlet of the pump. The pump may be a fixed displacement pump that produces a flow rate proportional to its speed.

Line Pressure Regulation

Figure 5A:
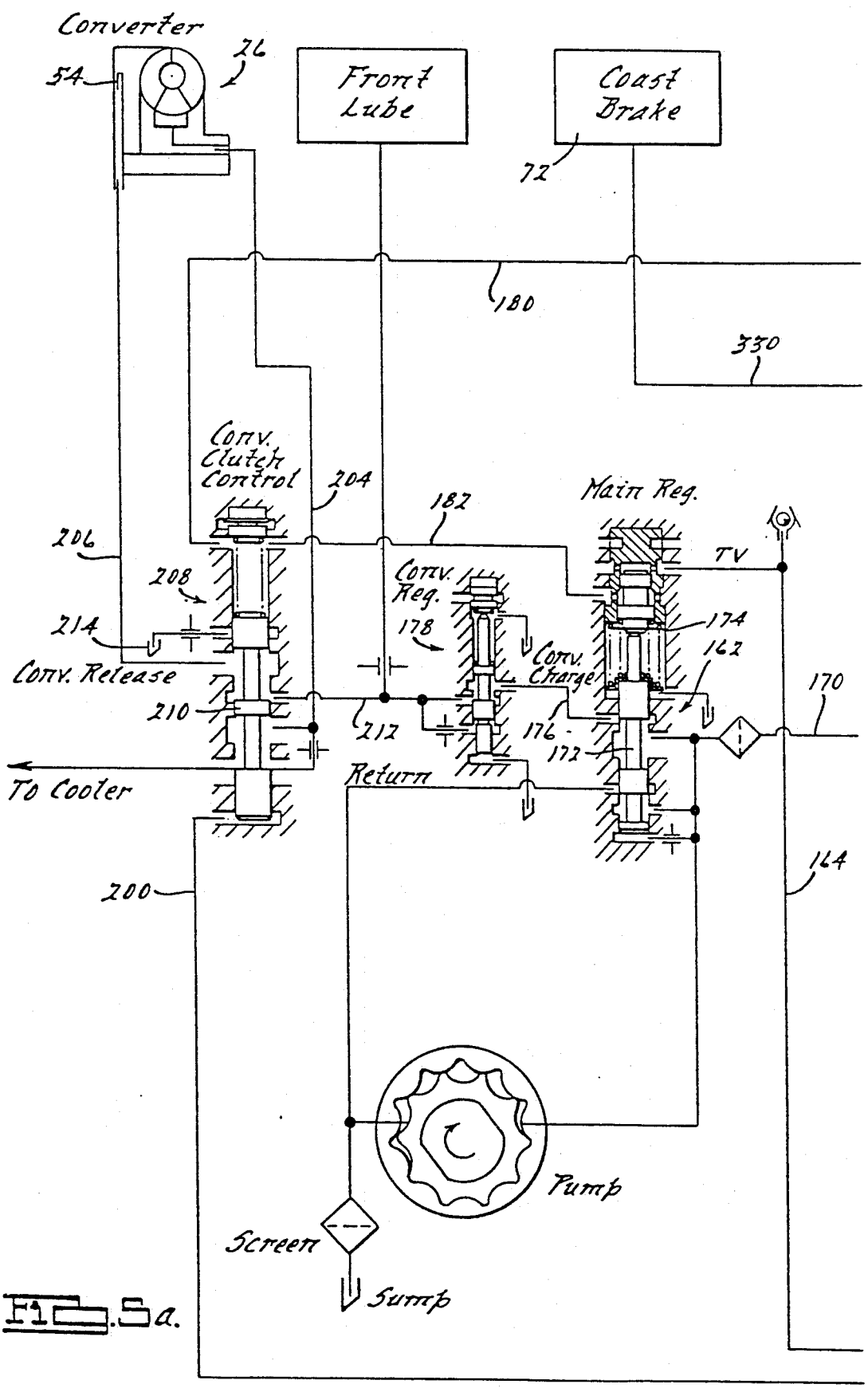

Line pressure magnitude is controlled by main regulator valve 162 shown in FIG. 5a. This valve operates in response to control pressure carried in line 164 from TV pressure valve 166. Valve 166 is connected by passages 168 and 170 from regulated line pressure produced by main regulator valve 162. A variable force solenoid 172 regulates TV pressure by having applied across its winding an electrical voltage duty cycle in accordance with the control of the microprocessor output. Hydraulic pressure having a magnitude between 5 psi and 85 psi produced by valve 166 is applied to the end of line regulator valve 162. When there is demand for a high volume of fluid at line pressure, spool 172 moves downward due to TV pressure operating against the effect of a set of coil springs 174, closes the return line to the suction side of the pump, and closes torque converter charge line 176. Then substantially the entire volumetric flow of the pump is carried in passage 170.

The magnitude of pressure in line 170 is a result of upwardly directed differential pressure on the lower end of spool 172 acting against the spring forces and a TV pressure force directed downward on the spool. When line pressure is high in relation to TV pressure, spool 172 moves upward and opens the feedback line to the suction side of the pump. Before this occurs, however, line 176 to converter regulator valve 178 is opened. Thus, line pressure is regulated by balancing the spring forces and TV pressure against line pressure in passage 170.

When manual valve 160 is moved to the 1 and R positions, line pressure is carried in passages 180, 182 to a differential pressure area of the main regulator valve. The pressure developed on the differential area operates to force spool 172 downward so that line pressure is higher when the reverse and 1 ranges are selected than for any of the other settings of the gear selector and manual valve. Higher line pressure in these ranges increases the torque capacity of the clutches and brakes engaged to produce the first gear and reverse drive while engine torque is near its peak magnitude.

Solenoid-Operated Valves

Passage 170 carries line pressure to solenoid regulator valve 184, which produces a regulated solenoid feed pressure carried in passage 186 to first and second solenoid-operated shift valves 188, 190, a converter clutch solenoid-operated valve 192, and coast clutch solenoid-operated feed valve 194. Regulator valve 184 maintains the output in line 186 at approximately 50 psi by balancing spring force applied to the spool against an opposing line pressure force on the spool end resulting from feedback output.

Valves 188, 190, 192 and 194 are on-off valves that alternately connect and disconnect line 186 and output lines 196, 198, 200 and 202, respectively. The solenoids that operate these valves are controlled by the output of the microprocessor, which selectively energizes and deenergizes the solenoids in accordance with the result of executing electronically stored control algorithms accessible to the microprocessor. For example, when the solenoid of valve 188 is deenergized, line 196 is vented by being connected to the low pressure sump. But when the solenoid is energized, solenoid feedline 186 is connected to line 196. Similarly, valves 190, 192 and 194 either connect solenoid feedline 186 to lines 198, 200, 202 or vent these lines in accordance with the state of the corresponding solenoids.

Converter Clutch

Converter clutch 54 is engaged to lock torque converter 26 by pressurizing line 204 and venting line 206. The converter clutch is disengaged and the torque converter opened when line 206 is pressurized and line 204 is vented. Converter clutch control valve 208 moves upward within the valve body due to a force on spool 210 resulting from converter clutch solenoid pressure carried in line 200. Valve 208 is forced downward by the helical spring and a pressure force resulting from 1-R pressure carried in line 180 to the upper end of spool 210. Also, control valve 208 is supplied through line 212 with regulated converter feed pressure from converter regulator valve 178, which regulates converter feed pressure in line 212 by sensing the pressure in line 212 and throttling converter charge pressure in line 176. When converter clutch solenoid valve 192 is energized, line 200 is pressurized, and spool 210 moves upward against the force of the spring to connect lines 212 and 204. When this occurs, line 206 is connected by valve 208 to vent port 214 and converter clutch 54 is engaged.

When solenoid valve 192 is deenergized, line 200 is vented causing spool 210 to move downward, closing the connection between lines 212 and 204, closing the connection of line 206 to vent 214, and opening a connection between lines 212 and 206. This vents line 204 through valve 208 and a hydraulic fluid cooler to the sump of the transmission. This action opens the torque converter by disengaging the mechanical connection of impeller 28 and turbine 30 made through clutch 54. The 1-R pressure, in addition to increasing line pressure for a given TV pressure, as described with respect to the operation of valve 162, also operates to open the torque converter if solenoid valve 192 remains open while the gear selector is moved to the 1 or R positions, perhaps due to failure of the solenoid that operates valve 192, a short circuit or other electrical fault. This 1-R pressure assures the torque converter will be open if the gear selector is located in the R and 1 positions so that the torque multiplication effect of the converter is available to maximize torque to output shaft 12. Converter regulator valve 178 limits torque converter feed pressure to approximately 110 psi.

Line modulator valve 220 is connected to regulated line pressure by passages 170, 168 and 222, and to TV pressure by passages 164 and 224.

Automatic Forward Drive

Figure 5D:
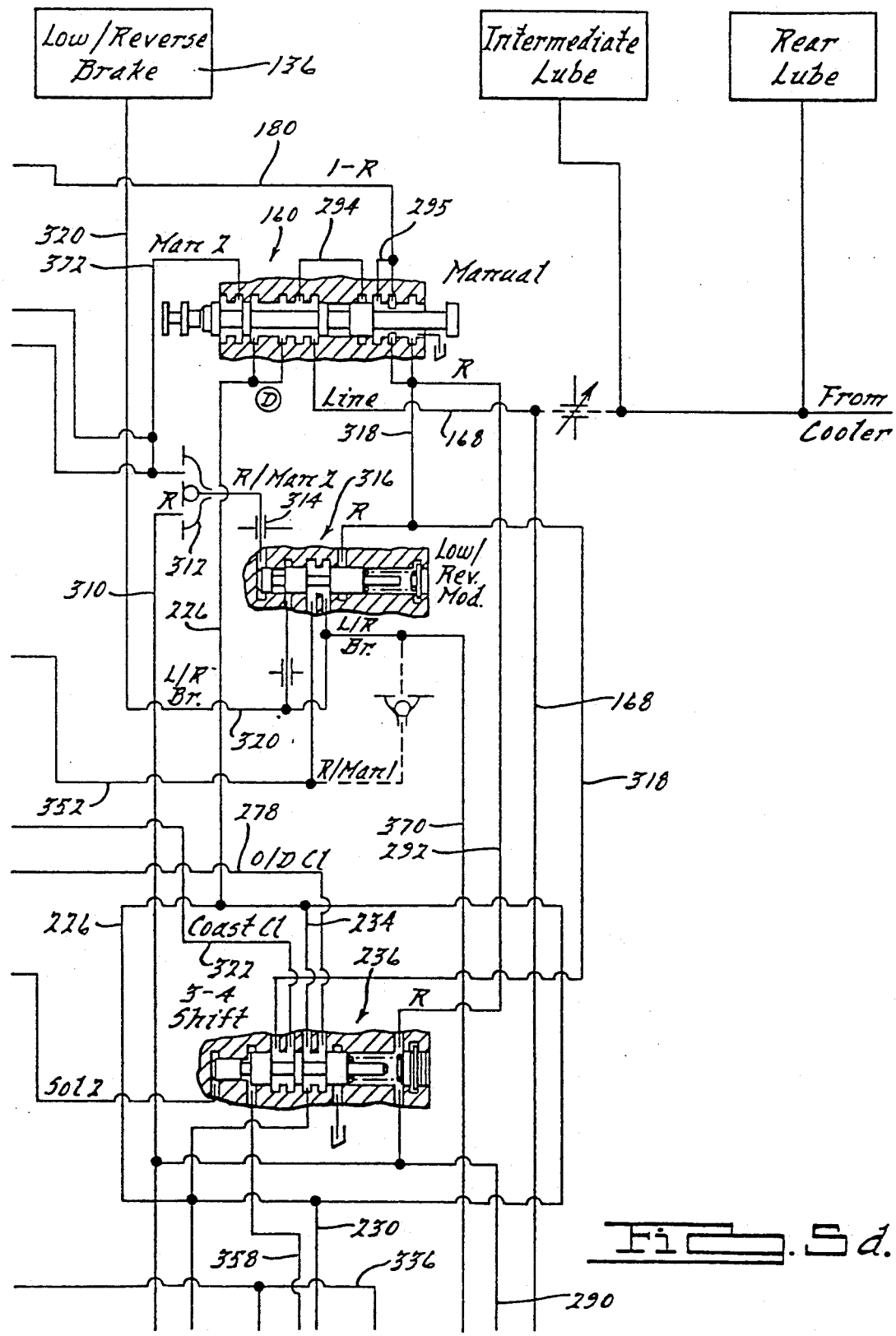

Regardless of whether the OD cancel button is depressed on the gear selector mechanism, whenever manual valve 160 is moved to the OD position, the position shown in FIG. 5d, regulated line pressure in passage 168 is connected through valve 160 to passage 226. Forward clutch 110 is continually connected to regulated line pressure through passage 226, orifice 342 and passage 242; provided the manual valve is in a forward drive position. First gear results for automatic shifting when the forward clutch alone is engaged in this way.

In the OD range and with the transmission operating in first gear, first solenoid shift valve 188 directs SOL1 pressure to 1-2 shift valve 228 through passage 196 and to 2-3 shift valve 232 through passage 244, but second solenoid shift valve 190 is exhausted. Therefore, shift valves 228 and 232 are moved by SOL1 pressure to the rightward extremity, closing line pressure passages 227 and 230, respectively. In this way only forward clutch 110 is pressurized and first gear operation results.

An upshift to second gear occurs while first solenoid shift valve 188 remains open and after second solenoid shift valve 190 is opened. Valve 190 directs SOL2 pressure through passage 198 to the end of 3-4 shift valve 236 and to manual timing valve 306. Passage 198 also directs SOL2 pressure to shuttle valve 246. If passage 372 is not pressurized, valve 246 directs SOL2 pressure to manual transition valve 250. If L/R clutch pressure passage 370 is not pressurized, transition valve 250 directs SOL2 pressure to the spring end of 1-2 shift valve 228. The 1-2 shift valve is moved leftward by SOL2 pressure, thereby opening the connection between passages 227 and 254, through which regulated line pressure is carried to intermediate brake accumulator 256.

Line Modulator and Accumulator

Line modulator valve 220 and accumulator 256 work cooperatively to supply pressurized fluid to intermediate brake 96 thereby engaging second gear. Line modulator valve 220 supplies TVLM pressure to intermediate brake accumulator 256, overdrive clutch accumulator 260, and direct clutch accumulator 262. Each accumulator is shown with its plunger located as it is prior to an upshift and filled with hydraulic fluid supplied from valve 220.

Valve 258, located immediately above accumulator 256, balances the spring force against intermediate brake pressure and moves upward connecting passages 254, 261. The upper end of accumulator 256 is filled through orifice 264. The orifice establishes a constant pressure drop and flow rate into the upper end of the accumulator cylinder and moves the plunger downward at a rate consistent with the flow rate through orifice 264 against the force of the springs within the accumulator and TVLM pressure within the accumulator below the plunger. In this way, the pressure in passage 261 rises linearly and rapidly when valve 258 first opens; thereafter, pressure in brake 96 increases linearly as time increases at a lower rate determined by the flow rate through orifice 264 and the spring constant of the springs within the accumulator. Also, pressure in brake 96 has a magnitude for each unit of elapsed time that varies with TV pressure, as is explained below.

The output of valve 220 is TVLM pressure supplied to the space within each of the accumulators below the plungers. Valve 266, located at the top of the bore of line modulator valve 220, regulates by balancing TVLM pressure against the force of the inner isolator spring 268, a short spring having a relatively high spring rate that prevents contact between spools 270 and 266 when spring 268 is fully closed. When TV pressure, carried in passages 164, 224 from VFS valve 166, is approximately 6 psi or lower, spool 270 is held by the outer spring at the lower end of the valve bore, and spring 268 does not touch spool 266. In this range of TV pressure, passage 272 is vented through port 269 because feedback TVLM pressure will have forced spool 266 downward closing communication between passages 222 and 272. When TV pressure rises above 6 psi, valve 270 rises off its seat against the effect of the outer spring. Spring 268 causes valve 266 to regulate because it moves valve 266 upward causing TVLM pressure to rise by one unit for each two unit increase of TV pressure above 6 psi. In this way, line pressure is modulated according to the magnitude of TV pressure produced by VFS valve 166 in accordance with the control of the microprocessor.

Accordingly, the pressures produced by accumulators 256, 260, 262 increase linearly with time after the initial rapid rise in their output pressures following their being pressurized from passages 254, 278 and 280, respectively. The pressures produced by the accumulators are higher at a given time after their linear increase begins if TV pressure is high, and lower at that time if TV pressure is low, because TVLM pressure varies linearly with TV pressure above 6 psi.

During the upshift, TVLM pressure in line 272 remains substantially constant because fluid forced from below the accumulator plunger briefly and slightly raises the pressure force at the head of valve 266, and opens the connection between line 272 and the vent 269 in modulator valve 220. Then the pressure in line 272 falls and the opening to vent 269 closes. This lost fluid is returned to the accumulator through line 222 while the accumulator is being recharged. When the intermediate brake is to be disengaged, for example, during a 2-1 downshift, the process for activating the accumulator is substantially reversed from that of the upshift. The 2-1 downshift occurs when line 254 is vented at 384 through 1-2 shift valve 228 due to the presence of SOL1 pressure and the absence of SOL2 pressure at that shift valve. Flow from the space above the plunger of accumulator 266 through orifice 275 and the constant spring rate of the accumulator springs again controls the rate at which the plunger rises within its chamber and the rate at which the accumulator cylinder below the plunger is filled with fluid from line 222 and line modulator valve 220. As the accumulator is being recharged, fluid within the accumulator cylinder above the plunger flows through one-way check valve 274, and passages 263, 254. Check valve 277 directs fluid through 2-1 downshift orifice, and, the fluid is vented through 1-2 shift valve 228. Likewise, intermediate brake 96 is vented through passages 261, 254, the 2-1 downshift orifice and shift valve 228.

Intermediate brake 96 remains engaged for third gear and fourth gear during automatic operation because 1-2 shift valve 228 connects passages 227 and 254 for any combination of states of solenoid valves 188, 190 except the first gear states.

Overdrive clutch accumulator 260 works, as accumulator 256 does, to pressurize and vent overdrive clutch 74 through passage 276 during a 3-4 upshift and 4-3 downshift. These upshifts and downshifts are initiated by selectively pressurizing and venting passage 278 through 3-4 shift valve 236, as described below.

An automatic upshift from second gear to third gear occurs after first solenoid shift valve 188 is closed by deenergizing its solenoid, and maintaining second solenoid valve 190 open, according to the schedule of FIG. 4. Line pressure continues to be directed by manual valve 160 through passages 226, 230 to 2-3 shift valve 232. Because of the absence of SOL1 pressure, valve 232 moves to the position of FIG. 5e. This opens line pressure to passage 280 through which control valve 282 at the end of direct clutch accumulator 262 is pressurized. Direct clutch 98 is thereby pressurized rapidly over a first, short portion of its engagement period, during which the clearances among the various components of the clutch are taken up. Thereafter, clutch 98 is pressurized at a linearly increasing pressure controlled by the magnitude of TVLM, the rate of flow through orifice 284, and the spring constant of accumulator 262, as has been previously described with respect to accumulator 256, until the clutch is fully engaged. Clutch 98 remains engaged during third gear and fourth gear operation because SOL1 pressure is absent; therefore, 2-3 shift valve 232 maintains open the connection between line pressure and accumulator valve 282.

An automatic 3-2 downshift occurs when solenoid valves 188 and 190 are both on. Then SOL1 pressure forces 2-3 shift valve rightward so that direct clutch 98 is drained through passages 286, valves 282, passage 280, orifice 283, shift valve 232, passage 290, 3-4 shift valve 236, and passage 292 to sump through manual valve 160. This path to sump from the direct clutch is continually open through the 3-4 shift valve 236 regardless of the presence or absence of SOL2 pressure at valve 236.

An automatic upshift from third gear to fourth gear results when solenoid valves 188 and 190 are both closed, whereby overdrive brake 74 is engaged. When this occurs, 3-4 shift valve 236 is moved by its spring to the position shown in FIG. 5d, whereby line pressure from the manual valve is directed by passage 234 through the shift valve to passage 278. Control valve 286 at the end of overdrive accumulator 260 is moved by its spring downward so that brake 74 is pressurized through passage 276 rapidly during the first, short phase of engagement of the brake during which clearances among the components of a brake are taken up. Thereafter, pressure in brake 74 rises linearly with time according to the control of TVLM pressure, the flow rate of fluid through orifice 288 and the spring constant of the accumulator, as has been described with respect to accumulator 256.

An automatic downshift from fourth gear to third gear occurs when SOL2 pressure is applied to shift valve 236. This action moves the valve rightward opening a connection through passage 278, valve 286, passage 276 and brake 74 to the vent port at shift valve 236.

Reverse Gear

When manual valve 160 is moved to the R position, line pressure in passage 168 is directed to passages 180, through bypass loops 294, 295 to passage 292, and passage 226 is closed to the source of line pressure. Thus, forward clutch 110 is disengaged. Solenoid valve 188 is opened to connect SRV passage 186 to SOL1 passage 196, but solenoid shift valve 190 is closed. SOL1 pressure is carried in passage 244 to the end of 2-3 shift valve 232, and to the SOL1 port of 1-2 shift valve 228.

Passage 180 is connected to line pressure both when the manual valve is moved to the R position and to the 1 position. 1-R pressure forces spool 210 of the converter clutch control valve 208 downward, thereby directing regulated converter pressure through valve 208 and passage 206 to open converter clutch 54. This action assures that, if SOL3 pressure, which is limited to 50 psi, remains on while the gear selector or manual valve is in the 1 or R position, there is sufficient pressure to push spool 210 downward and open the torque converter. In this way, the torque converter is opened when 1 or R positions are selected so that the torque multiplication capacity of the torque converter is available during these high torque conditions. Passage 182 carries line pressure from valve 208 to the main regulator valve 162 when the gear selector is in the 1 and R positions. This forces spool 172 downward, closes return to the pump inlet, and directs more pump output to passage 170.

Passage 300 and one-way check valves 299, 301 direct 1-R pressure also to the end of coast clutch shift valve 302. Check valve valve 299 and passage 304 carry 1-R pressure from the manual valve to manual timing valve 306.

Because SOL2 pressure is absent, 3-4 shift valve 236 is in the position shown in FIG. 5d. Therefore, when the manual valve is moved to the R position, shift valve 236 connects line pressure in passage 292 to passages 290, 310 and 318. Check valve 312 directs R pressure through orifice 314 to the end of low/reverse modular valve 316, where a pressure force acting on the valve in opposition to its spring, opens R pressure in passage 318 to low/reverse brake passage 320. Low/reverse brake 136 is the first friction element to become engaged in the process of producing reverse drive.

The 3-4 shift valve 236 also connects R pressure in passage 318 to coast clutch shift valve 302 through passage 322. Control pressure to coast clutch shift valve 302 is directed from passage 300 through the check valve 301 to passage 324. Valve 302 moves leftward against the effect of its spring due to 1-R control pressure and completes the connection from passage 322 to passage 326 and passage 330 to coast clutch 72, which is the second friction element applied during reverse drive engagement.

Manual Shift Timing Valve

When the manual valve is in the R position, 1-2 shift valve 228 connects passages 310 and 332 through check valve 370. Manual timing valve 306 includes a piston 360, which is forced into contact with retaining plate 363 by SRV pressure forwarded from solenoid regulator valve 184 and maintained at a constant pressure by that valve. A second piston 330 is biased by a spring into contact also with retainer plate 363. First and second inlet passages 360, 362 supply 1-R/MAN2 pressure to timer valve 306 from passage 304. An orifice 364, located in passage 362, controls the flow rate through that passage and through valve 306 during a portion of its operation. Thereafter, when the valve opens, the higher pressure in passage 360 is directed to outlet passage 366.

In operation, first piston 360 is forced by SRV pressure into contact with plate 363. Second piston 330 is forced by the spring into contact with the plate against feedback pressure in passage 366, 368 tending to hold spool 330 rightward. This closes passage 360 but permits flow through orifice 364 and passage 366 to feedback passage 368. Ball check valve 370 and passage 332 carry R pressure from 1-2 shift valve 228 to timing valve 306, but check valve 370 closes passage 332 when it is at a higher pressure than passage 310. Therefore, R pressure in passage 332 is directed by valve 306 immediately without delay to passage 334 because R pressure forces valve spool 330 rightward and opens this connection.

The space immediately adjacent both sides of the retainer plate is pressurized through feedback passage 368. Because of the differential pressure across its ends, piston 360 immediately moves for a short period away from the plate against SRV pressure until piston 360 seats on the valve body at the left-hand extremity. After this occurs, pressure rises quickly in the annulus, within which the retainer plate is located, and piston 330 moves rightward, subject to the flow rate across orifice 364, against the spring force until it becomes seated at the right-hand end of the valve chamber. In this position, feedback passage 368 is open to passage 334, through valve 306 and passage 360 is open also to passage 334 through passages 366 and 368. The operation of the manual timing valve, therefore, delays the occurrence of Delayed 1-R/MAN2 pressure at 2-3 shift valve 232 by the period while piston 360 moves from the right-hand end of its chamber to the left-hand end plus the period while spool 330 moves rightward from plate 363 until valve 306 opens.

Valve 306 assures that whenever the vehicle operator moves manual valve 160 to the 1, 2 positions, a delay occurs before pressure from the manual valve is present at 2-3 shift valve 232. This produces a short delay, one or two seconds, before a downshift from third or fourth gear can be made into second gear. For example, when a 4-2 downshift is commanded by the vehicle operator by a manual shift to the 2 position at high speed, the transmission will dwell for a period, the period required for the manual timing valve to produce MAN2 pressure in third gear, before the downshift to the second gear is completed. In third gear drive range, coast clutch engagement produces the engine braking effect, whereas in second gear manual operation, intermediate band 102 and servo 96 produce the engine braking effect. Torque capacity of the band and servo are much lower than torque capacity of the coast clutch. By avoiding an immediate high speed 4-2 downshift, torque loads are eventually placed on band 102 are lower than otherwise they would be. Similarly, high speed downshifts into first gear are delayed to avoid the sensation of an abrupt downshift.

However, SOL2 pressure at the end of timing valve 306 increases the delay, or the absence of SOL2 pressure prevents entirely any delay in pressure being output from valve 306, depending on the magnitude of 1-R/MAN2 pressure compared to SOL2 pressure, the force developed on the spring of valve 306, and the occurrence of SOL2 pressure.

When manual timing valve 330 is positioned at the right-hand end, pressure in passage 332 is directed as R pressure to passages 334, 336 to ports of the 2-3 shift valve 232. Also, R pressure is present at 2-3 shift valve 232 at the end of passage 290. As a result of pressure in passage 334, a differential pressure is developed on the spool of shift valve 232, which, regardless of the effect of SOL1 pressure at the end of the spool, forces the spool rightward against the effect of the spring to connect passage 290 to passage 280. Control valve 282 at the end of the direct clutch accumulator 262 is pressurized through passage 280 and check valve 338. In this way, application of direct clutch 98 is both controlled to rise linearly with time through operation of accumulator 262 and delayed with respect to engagement of low reverse brake 136 and coast clutch 72. When the direct clutch is fully engaged, reverse drive is completed.

Forward Clutch Valve

R pressure from manual valve 160 is directed by passages 292, 310 also to the reverse port of the forward clutch valve 240. TV pressure also is directed through passage 340 from variable force solenoid valve 166 to valve 240. When TV pressure is high, as when transmission fluid is cold or the accelerator pedal is depressed substantially, valve 240 connects passages 310 and 344. This action adds flow of hydraulic fluid through valve 240 to flow from accumulator 262.

If the manual valve is in the OD or D position, and throttle pressure is high, valve 240 moves leftward against the force of its spring and opens a connection between passage 238, which contains fluid at line pressure whenever the manual valve is in the OD position, and passage 242 to the forward clutch. This action adds the flow of hydraulic fluid through valve 240 to the volume supplied through passage 226 and orifice 342 during automatic operation in forward drive. Therefore, when ambient temperature is low and the viscosity of the hydraulic fluid is relatively high, TV pressure increases the flow to the forward clutch and to the direct clutch to produce forward drive and reverse drive operation, respectively.

First Gear Manual

When first gear is produced manually by moving manual valve 160 to the 1 position, the transmission operates in the first gear by engaging forward clutch 110, low-reverse brake 136 and coast clutch 72, opening first solenoid shift valve 188, and closing second solenoid shift valve 190. In this position, the manual valve connects passages 168 and 180 through bypass loops 294 and 295, but passages 292, 226 and 318 are disconnected from line pressure passage 168. Converter lockup clutch 54 is disengaged and the torque converter opens through operation of the converter clutch control valve 208, main regulator valve 162 and converter regulator valve 178, as was previously described with reference to reverse drive operation.

When manual timing valve 306 times out, passage 334 communicates Delayed 1-R pressure to two ports of the 2-3 shift valve 232, which is moved rightward by the presence of SOL1 pressure at the lefthand end of the valve. This action opens communication between passages 336, 350 to a port of the 1-2 shift valve 228. SOL1 pressure in passage 196 moves shift valve 228 rightward, thereby connecting passages 350 and 352. Low-reverse modulator valve 316 supplied with R/Manual 1 pressure in passage 352, is moved leftward by its spring connecting passage 352 to passage 320, through which low reverse brake 136 is engaged.

When the manual valve 160 is in the 1 position, it directs line pressure from passage 168 through passage 226, orifice 342, and passage 242 to the forward clutch 110.

The coast clutch is energized through the manual valve 160, which directs line pressure through passage 180, check valves 299, 301 and passage 324 to coast clutch shift valve 302.

Line pressure directed by manual valve 160 through passages 226, 230 is present at a port of the 2-3 shift valve 232. The presence of SOL1 pressure or Delayed 1-R pressure will have moved shift valve 232 rightward, thereby closing vent line 356 and connecting lines 230 and 358. The differential pressure on the spool of 3-4 shift valve 236 produced by pressure in passage 358 opens a connection between line passage 234 and coast clutch passage 322. Coast clutch shift valve 302 moves leftward due to the presence of 1-R pressure at its righthand end, and connects passages 322 and 326 to coast clutch 72 through orifice 374 and passage 330. Delayed 1-R pressure transmitted in passage 334 to 2-3 shift valve 232 is also passed through valve 232, passage 350, 1-2 shift valve 228 and passage 352 to low-reverse modulator 316. Low-reverse brake 136 is pressurized from valve 316, as is described above.

Second Gear Manual

A manual shift to second gear results when the gear selector manual valve 160 is moved to the 2 position and both shift solenoid valves 188 and 190 are turned on. In this position, the manual valve connects pressure in passage 168 to passages 226, 372 and disconnects passages 180, 292, 318 from line pressure. Forward clutch 110 is pressurized, as it is for each of the four forward gears, directly from the manual valve through passages 226, 242 and orifice 342.

The presence of SOL2 pressure at the end of 3-4 shift valve 236 moves the valve rightward to open the connection between passage 234, which receives line pressure through passage 226, and passage 322, which transmits line pressure from shift valve 236 to coast clutch valve 302. Manual valve 160 directs MAN2 pressure through passages 372, direction valve 299, passage 300, direction valve 301 and passage 324 to the control end of the coast clutch valve. The presence of the control pressure at valve 302 opens a connection between passages 322, 326 and directs coast clutch pressure through orifice 374 and passage 330 to coast clutch 72.

Whenever coast clutch solenoid valve 194 is on, SRV pressure is connected through valve 194 to passage 202 and direction valve 301 is pressurized, thereby closing passage 300 and pressurizing the control port of coast clutch valve 302 through passage 324. This action, therefore, engages the coast clutch by completing a connection between passages 322 and 326 regardless of the state of the manual valve.

MAN2 pressure is directed from manual valve 160 through passage 372, direction valve 299 and passage 304 to passages 360 and 362, which lead to manual timing valve 306. When the delay period of the valve expires, MAN2 pressure is connected through the valve and passages 334, 336 to the 2-3 shift valve 232. MAN2 pressure develops a differential pressure present at that shift valve, opens passage 230 to passage 358, which is closed at 3-4 shift valve 236, and directs MAN2 pressure through line 350 to 1-2 shift valve 228. The 1-2 manual transition valve 250, biased upward by its spring because of the absence of low-reverse brake pressure in passage 370 and at its control port, directs MAN2 pressure to passage 252. MAN2 pressure adds to the effect of the spring at shift valve 228 and works in opposition to SOL1 pressure to move shift valve 228 leftward, thereby closing the connection between passages 350, 352 and opening a connection between passages 350, 380. MAN2 pressure is directed through orifices 382, 383 to the intermediate servo 96. Orifices 382, 383 delay engagement of servo 97 so that intermediate brake 96 is engaged shortly before servo 97, actuates band 102 and holds drum 100 against rotation. With the 1-2 shift valve so disposed, line pressure in passages 226, 227 and present at shift valve 228 is connected by passage 254 to the control valve at the end of intermediate clutch accumulator 256, by means of which passage 260 and intermediate brake 96 are pressurized in accordance with the technique described above. The delay in applying servo 97 and band 102 until after brake 96 is applied assures that engine torque is not carried by band 100.

A manual downshift to first gear from second gear occurs after MAN2 pressure is removed from the control end of the 1-2 shift valve. This causes shift valve 228 to move rightward thereby closing the connection between passages 350 and 380 to the intermediate servo 96, connecting passages 350 and 352 to low-reverse brake 136 through the low reverse modulator valve 316, disconnecting passages 226 and 254, and connecting passage 254 to vent port 384. In this way, intermediate brake 96 is vented and drained through accumulator control valve 258. The fluid above the plunger of accumulator 256 passes through the 2-1 downshift orifice near ball check valve 277 in passage 254 and eventually to vent 384.

Third Gear Manual

When the manual valve is moved to the OD position and the drive button is depressed, the transmission will produce automatic shifts among the first three gears in the manner previously described with respect to automatic operation. However, in this case, unlike overdrive operation, third gear has engine braking effect due to engagement of the coast clutch. Intermediate brake 96, direct clutch 98, and forward clutch 110 are applied as described above with respect to overdrive operation. To produce third gear, second solenoid shift valve 190 is on and first solenoid shift valve 188 is off. The 3-4 shift valve 236, moved rightward by SOL2 pressure, opens a connection between passage 234 and coast clutch pressure in passage 322.

Coast Clutch Shift Valve and Solenoid Valve

When a command is made for third gear operation and the manual valve is in the overdrive position with the drive range button depressed, coast clutch solenoid valve 194 is on and it directs SOL4 pressure through passage 202. Check valve 301 pressurizes the control port of coast clutch shift valve 302. This moves shift valve 302 leftward and connects coast clutch pressure in passage 322 to passage 326, through which coast clutch 72 is engaged, whereby the transmission is disposed for operation in third gear with engine braking.

To upshift from manual third gear to fourth gear coast clutch 72 is disengaged and overdrive clutch 74 is engaged. To disengage the coast clutch, 3-4 shift valve 236 moves leftward when SOL2 pressure is removed, thereby closing the connection between line pressure in line 234 and passage 322 and connecting passages 234 and 278. Overdrive brake 74 is engaged through operation of accumulator 260. In this way, coast clutch shift valve 302 will not supply pressure to the coast clutch even if SOL4 pressure is available at the control port of coast clutch passage 326. In making the upshift from third gear manual to fourth gear, SOL4 pressure is removed permitting the valve 390 to close passage 322 and to connect coast clutch 22 to vent port 390.

3. Shift Solenoid Control

Figure 6:
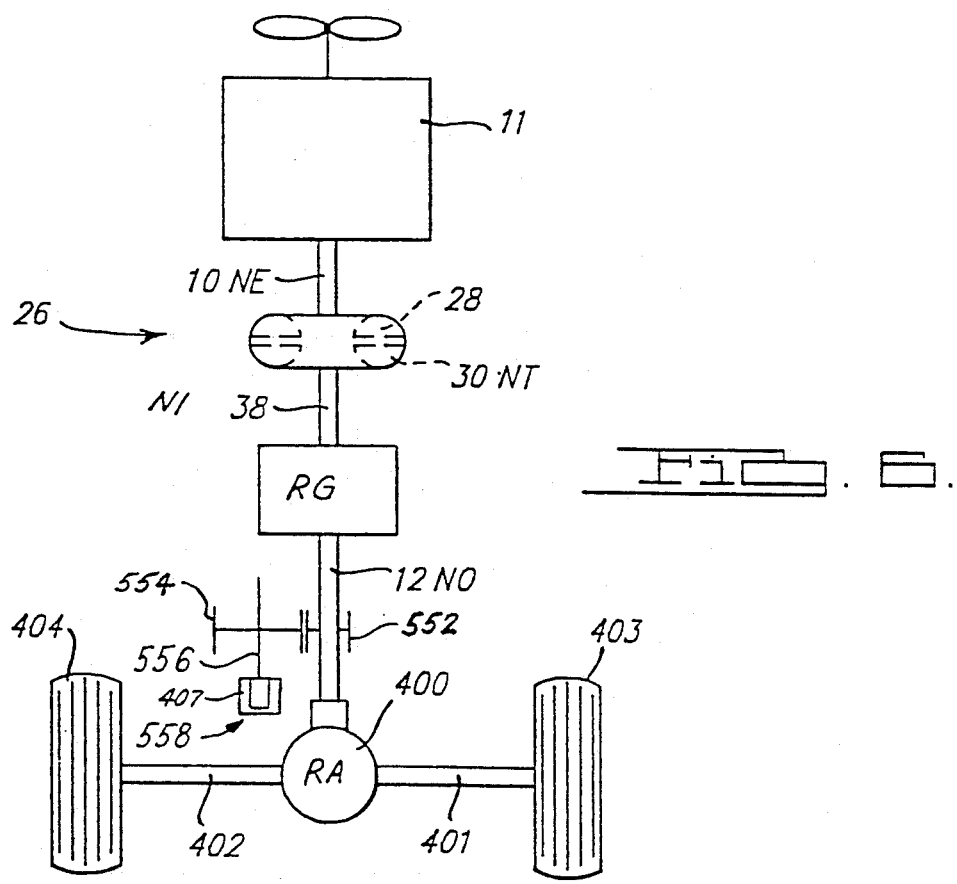
FIG. 6 is a schematic diagram of a drive system including a transmission suited for control by the system of this invention.

A schematic diagram of the driveline, with which the system of this invention is used, is shown in FIG. 6. Crankshaft 10 of engine 11 is drivably connected by torque converter 26 to transmission input shaft 38. The rotational speed of the engine is NE, its filtered speed is NEBART, and the speed of output shaft 12 is NO. The crankshaft is directly connected to a torque converter impeller 28, which hydrodynamically drives the torque converter turbine 30. The impeller is selectively connected mechanically to the turbine by operation of torque converter lockup clutch 54, whose engagement directly connects the impeller and turbine mechanically and whose disengagement disconnects them mechanically but permits a hydrodynamic connection.

The torque converter speed ratio, SR=NI/NE, is 1:0 when clutch 54 is engaged. The ratio of output shaft speed to vehicle speed is the NOV or N/V ratio. That ratio varies according to the gear ratio of the differential mechanism, or axle ratio, and the wheel and tire diameter. The control calculates actual N/V by dividing measured vehicle speed by NO. A base N/V value, stored in computer memory, represents a predetermined axle ratio and tire size. Output shaft speed NO is calculated, with the torque converter locked, by dividing engine speed by current gear ratio. The transmission gear ratio RG=NI/NO.

The output shaft is drivably connected to a differential mechanism 400, which drives right-hand and left-hand axle shafts 401, 402 and drive wheels 403, 404 of the vehicle.

Figure 7:
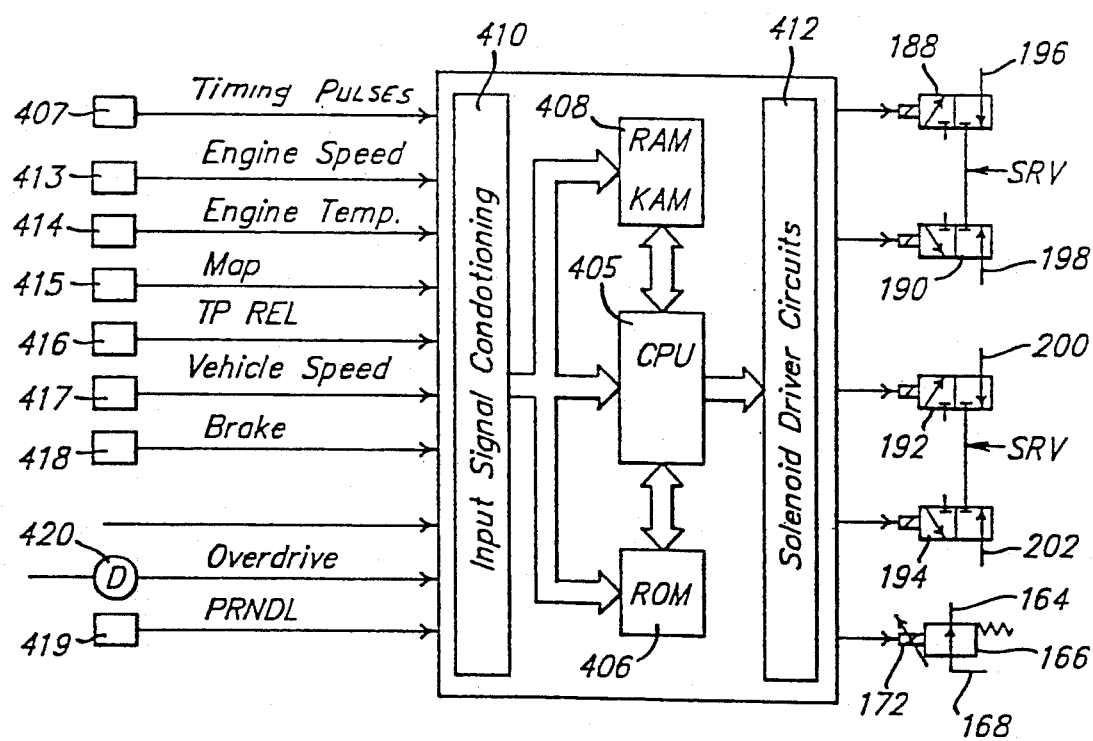
FIG. 7 is a block diagram of an electronic control system including input sensors, a microprocessor, its associated memory, data bus and output for operating solenoid valves located within the hydraulic system.

FIG. 7 illustrates the arrangement of an electronic digital control system that operates on-off shift solenoids SS1, SS2, 188, 190, respectively, converter clutch solenoid on/off valve 192, coast clutch solenoid on-off valve 194, and variable force solenoid 172, which drives associated valve 166 when a pulse width modulated signal is applied to the winding of solenoid 172.

The electronic control system includes a large scale integrated central processing unit 405; a clock pulse; interval count-down and count-up times; read-only memory ROM 406, in which programs controlling the logical operation of the CPU and data are permanently stored; read-write memory RAM 408; input signal conditioning circuits, for converting analog output of various sensors to digital form for processing by the CPU; and solenoid driver circuits 412 for converting digital output of the CPU to analog voltage or current supplied to the windings of the solenoids. An example of a suitable output conditioning circuit for variable force solenoid 172 is described in U.S. Pat. No. 4,487,303.

Sensors that produce input data to the microprocessor include engine speed sensor 413, which produces a square wave voltage output having a frequency proportional to the speed of crankshaft 10; temperature sensors 414, which sense engine coolant temperature and that of another medium, such as the transmission fluid, by detecting an electrical resistance that varies with the temperature of the sensed medium; manifold pressure Map sensor 415, which produces a signal representative of static pressure in the engine intake manifold 702 downstream of throttle valve 704, in FIG. 10; throttle position sensor 416, which produces a signal representing the degree to which the engine throttle is open or the accelerator pedal is depressed by the vehicle operator in relation to a reference position; vehicle speed sensor 417, which produces a voltage output signal having a frequency proportional to NO, the speed of output shaft 12; sensor 418, which produces an electrical signal representing the applied or released state of the brake pedal; PRNDL sensor 419, which produces a linear voltage output whose magnitude varies with the position of the gearshift selector between 0 and 5 volts and is converted to a binary digit PDL; and overdrive cancel button 420, activated by the vehicle operator, permits or prevents, depending upon the state of the button, operation of the transmission in overdrive gear, i.e., the fourth forward gear.

Calibration constants are data stored in RAM accessible to the microprocessor solely by reference to their memory addresses. Data stored in RAM or other electronic memory in the form of values of a first variable X, each X value having a single corresponding value of a second variable Y recalled from memory by reference to a memory location and the first variable, are f(x) or "fox" functions. Data stored in RAM or other electronic memory in the form of multiple first variables X and Y, each combination thereof having a corresponding third variable Z, whose value is recalled from memory by reference to a memory location and variables X, Y, are called "tables". Data recalled from tables and fox functions are automatically interpolated to correspond to the values of the variables used to recall the data. A "register" is a variable whose value is calculated through execution of algorithms comprising the control.

Figure 8:
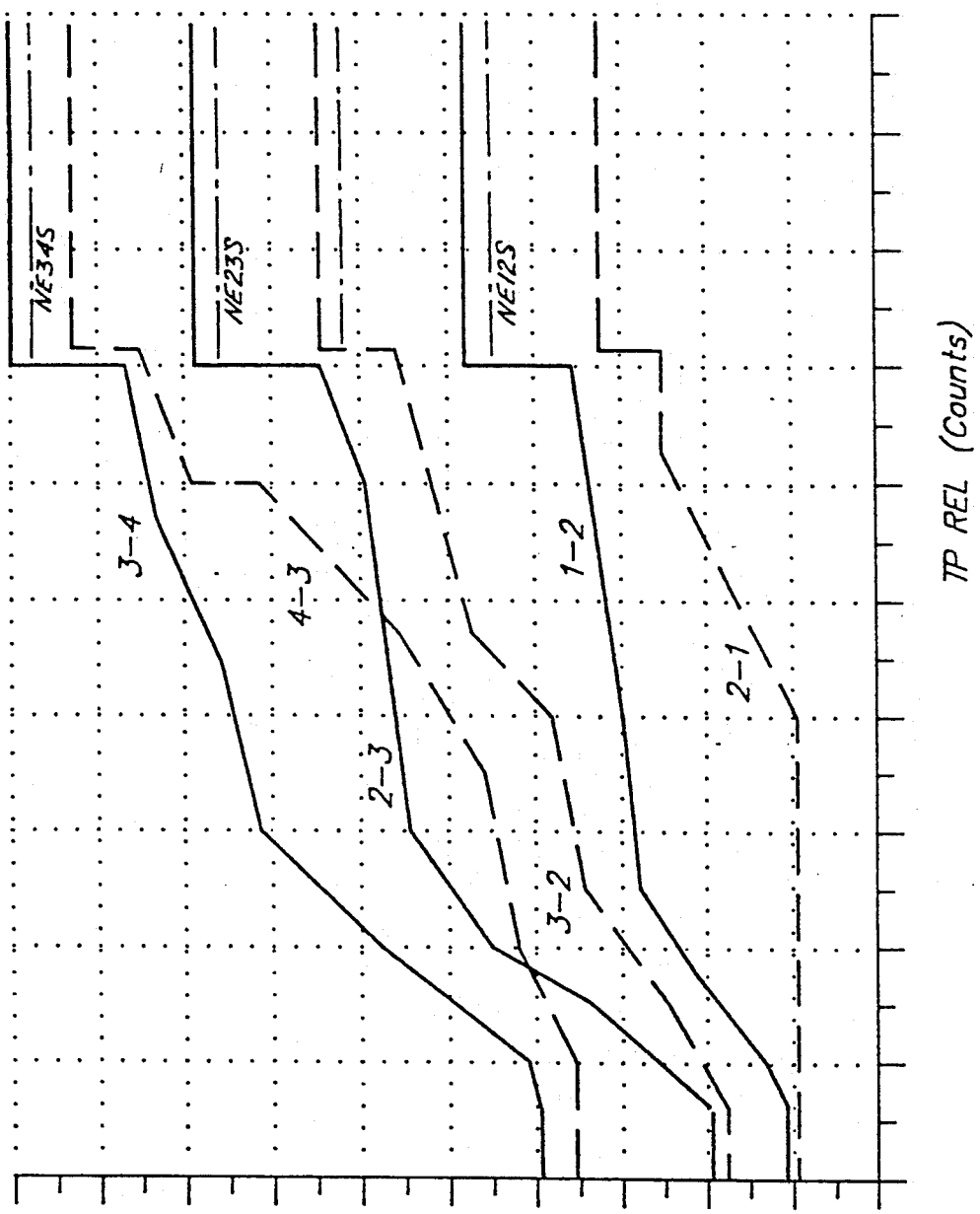
FIG. 8 is a graph illustrating the relationship between throttle position and vehicle speed and their relationship to gear ratio upshifts and downshifts made automatically by the transmission control.

FIG. 8 shows data boundaries, defined by vehicle speed VS and TP REL, which corresponds to output produced by throttle position sensor 416 indicating the amount of throttle movement from the closed throttle or idle setting, where scheduled gearshifts, both upshifts and downshifts, are made automatically among the forward gears. Large values of TP REL occur near wide open throttle WOT, smaller values of TP REL indicate part throttle PT, and values near zero occur near closed throttle CT. The data of FIG. 8 are stored in RAM in the form of tables. The transmission gear according to the schedule of FIG. 8 is produced from memory using TP and VS as input. As VS and TP REL change during vehicle operation in a given gear such that a line of FIG. 8 is crossed during a background pass from an operating condition defined by these variables in the previous pass, need for a gearshift is indicated following a comparison of the gear from the table and the current gear. For example, if the current operating condition (first gear) passes from below the 1-2 line to above that line, a gearshift from first gear to second gear is commanded because of the inequality with the gear from the schedule (second gear), provided other criteria considered by the control so permit. Similarly, downshifts may be commanded when the current operating condition passes through a downshift line, the dash lines of FIG. 8, from above the relevant downshift line. When the operating condition during the current background pass is located in the zone between adjacent upshift and downshift lines, no gearshift is commanded.

Gearshifts are made also on the basis of engine speed corresponding to a WOT condition above which an upshift is commanded regardless of TP value. As FIG. 8 indicates, a 1-2 upshift occurs at engine speed NE12S, the shift point at sea level, provided TP is equal to or greater than a predetermined wide open throttle TP. Each of the other upshift lines, 2-3 and 3-4, has a corresponding WOT shift point, NE 23S and NE34S. The WOT shift points are reached before shift points defined by the VS-TP relationship.

Figure 9:
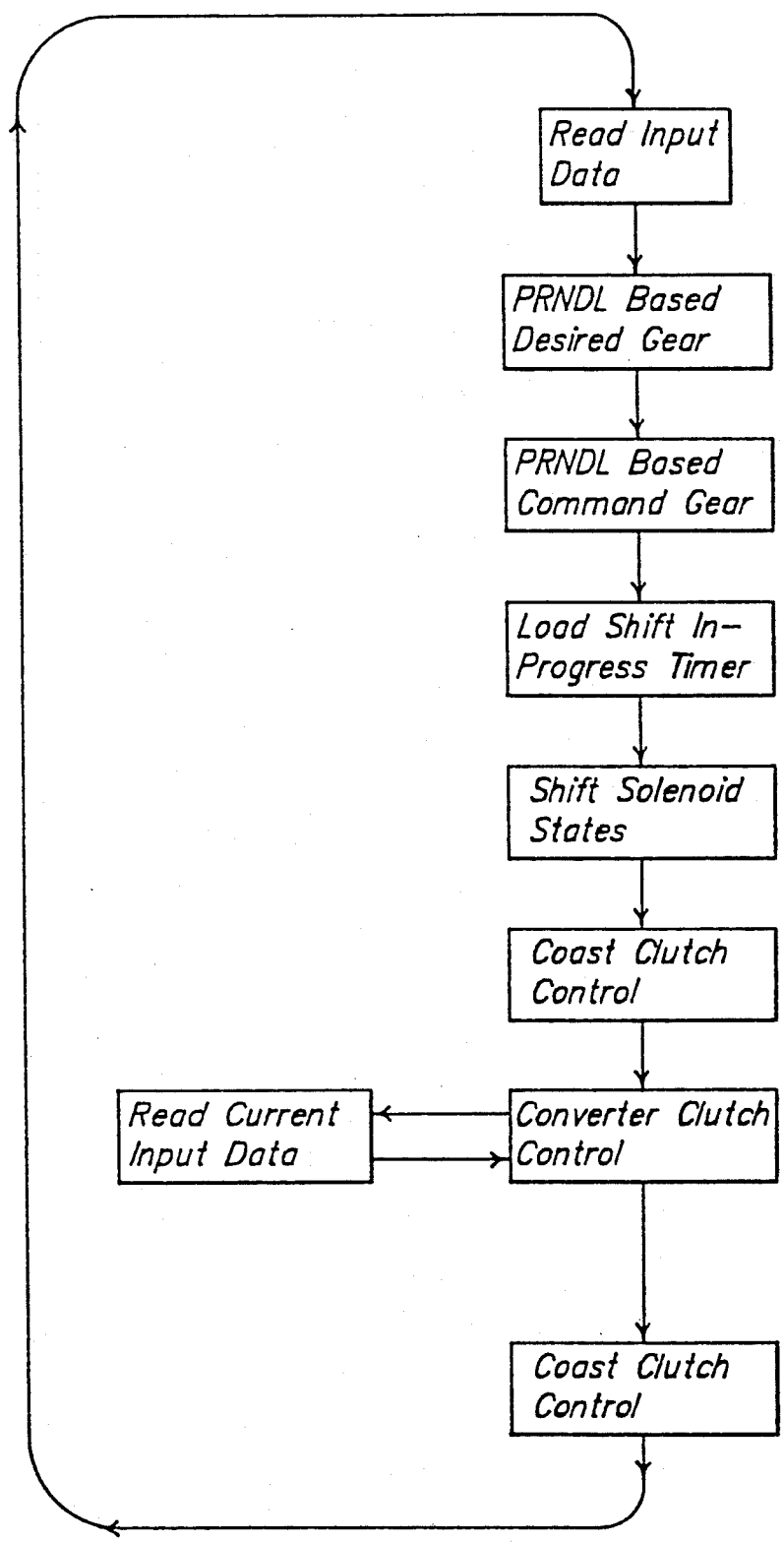
FIG. 9 is a schematic diagram of certain software modules and data acquisition statements executed during a background pass.

As FIG. 9 shows, solenoids are controlled by repetitively executing background passes whose duration increases with engine speed from about 25 msec at idle speed to about 100 msec at high speed. During each background pass, control algorithms divided into modules are executed. The modules are executed serially in the order they are stored in ROM or when called from other modules. Each background pass begins after initializing various registers, upon reading current input data produced by the sensors, and after storing prior input data acquired during the last background pass. Shift solenoids SS1, SS2 are controlled by setting flags FLG SS1 and FLG SS2 at ON or OFF states to produce and to prevent production of SOL1 and SOL2 pressure in any of four possible combinations after determining the commanded gear GR CM from the desired gear DES GR as explained below.

The desired gear is determined on the basis of the gear selector position. The following table shows correspondence between commanded gear GR CM, operating state of the transmission, current gear GR CUR, and position PRD of the PRNDL gear selector for each transmission gear.

| GR CM | Transmission State | GR CUR | PRD |
|---|---|---|---|
| 1 | 1st | 1 | 1 |
| 1.5 | 2nd, band 102 ON | 2 | 2 |
| 2 | 2nd, band 102 OFF | 2 | 2 |
| 3 | 3rd | 3 | 3 |
| 4 | 4th | 4 | 4 |
| | Neutral | | 5 |
| | Reverse | | 5 |
| | Park | | 7 |

With the gear selector in Drive or Overdrive position, desired gear is calculated on the basis of a maximum, wide open throttle speed, WOT RPM, shift point or as a function of throttle position TP REL versus vehicle speed VS. All shift points, whether determined by WOT RPM or by TP vs VS, are adjusted for altitude in accordance with barometric pressure. A strategy for correcting for barometric pressure or a reference speed, such as vehicle speed or engine speed at which a change in transmission operation occurs, e.g. an upshift or downshift, is described with reference to FIG. 11. First, at 421, the current throttle position TP and manifold pressure produced by sensors 416 and 415, respectively, and engine speed NE are read and stored. Sensor 415 is located on the engine intake manifold 702 downstream from the throttle valve 704. Alternatively, the barometric pressure sensor 422 located in the intake manifold upstream from the throttle valve could be used. At 423, the reference speed at which a change in operation of the transmission is to occur is determined by referring to the gearshift schedule of FIG. 8 stored in electronic memory. The reference speed can be engine speed or the vehicle speed depending upon whether the gear change is made on the basis of wide open throttle condition or a VS-TP.

At 424, barometric pressure in digital form is converted from the signal produced by sensor 415 to produce inferred barometric pressure by employing data stored in RAM, as illustrated in FIG. 13. The data of FIG. 13 is stored as a lookup table of barometric pressure correction values corresponding to throttle position TP, the vertical axis, and engine speed, the horizontal axis NE. Although the table of FIG. 13 includes values only at the extremities of the ranges of independent variables used as input to produce the pressure increments, in fact the entire table is filled with data, so that barometric pressure can be inferred from the output of sensor 415. If an ambient barometric sensor not affected by its location downstream of the throttle valve is used, such as sensor 422, barometric pressure need not be inferred but can be used directly from the output of that sensor. The data of table 13 results from an ambient reference barometric pressure, for example, barometric pressure at sea level.

Next, memory locations where the fox function of FIG. 14 is stored are referenced having as input the current throttle position TP to produce as output a difference in reference speed at which the operational change of the transmission is to occur. For example, if the change is a wide open throttle 1-2 upshift, a speed difference NE12A is retrieved from memory. If a 3-4 upshift is to be produced on the basis of the vehicle speed schedule of FIG. 8, the fox function represented by FIG. 14 produces a speed difference FN34A. The speed difference values of the relevant fox functions are determined preferably at high altitude ambient barometric pressure.

At 426 a barometric pressure interpolation factor BPINTR is determined for the inferred barometric pressure from the data represented in FIG. 15. The interpolation factor varies over a range of approximately 0–2.0 and increases in magnitude as inferred barometric pressure decreases from its maximum. At or near the altitude where the fox function represented by FIG. 14 is established, the barometric pressure interpolation factor is approximately 1.0 and remains constant although inferred barometric pressure decreases. Thereafter, the interpolation factor again increases to a maximum value and remains constant despite decreasing inferred barometric pressure. The computer control automatically interpolates and determines the current BP INTR factor from the current ambient barometric pressure value produced as input by sensor 415.

At 427, the reference speed where the operational change is commanded is calculated to correct for current barometric pressure using the equations stated in box 427. After the shift point speed is determined in this way, at 428 an inquiry is made to determine whether the reference speed for the operational change is equal to or greater than the reference speed corrected for the current ambient barometric pressure. If the reference speed, for example, NE or VS, exceeds the altitude corrected reference, the inquiry is true and control passes to statement 429 where a command that will result in a change of transmission gear is made by setting register gear command GR CM equal to 2 or 3, depending upon whether the gear ratio change is made in response to the wide open throttle condition or to vehicle speed condition used here as examples.

If inquiry 428 is false, at 430 the current command gear is maintained because no change in operating condition is required. After statement 429 or 430 is executed, the shift solenoid state module is called at statement 431.

Figure 11A:
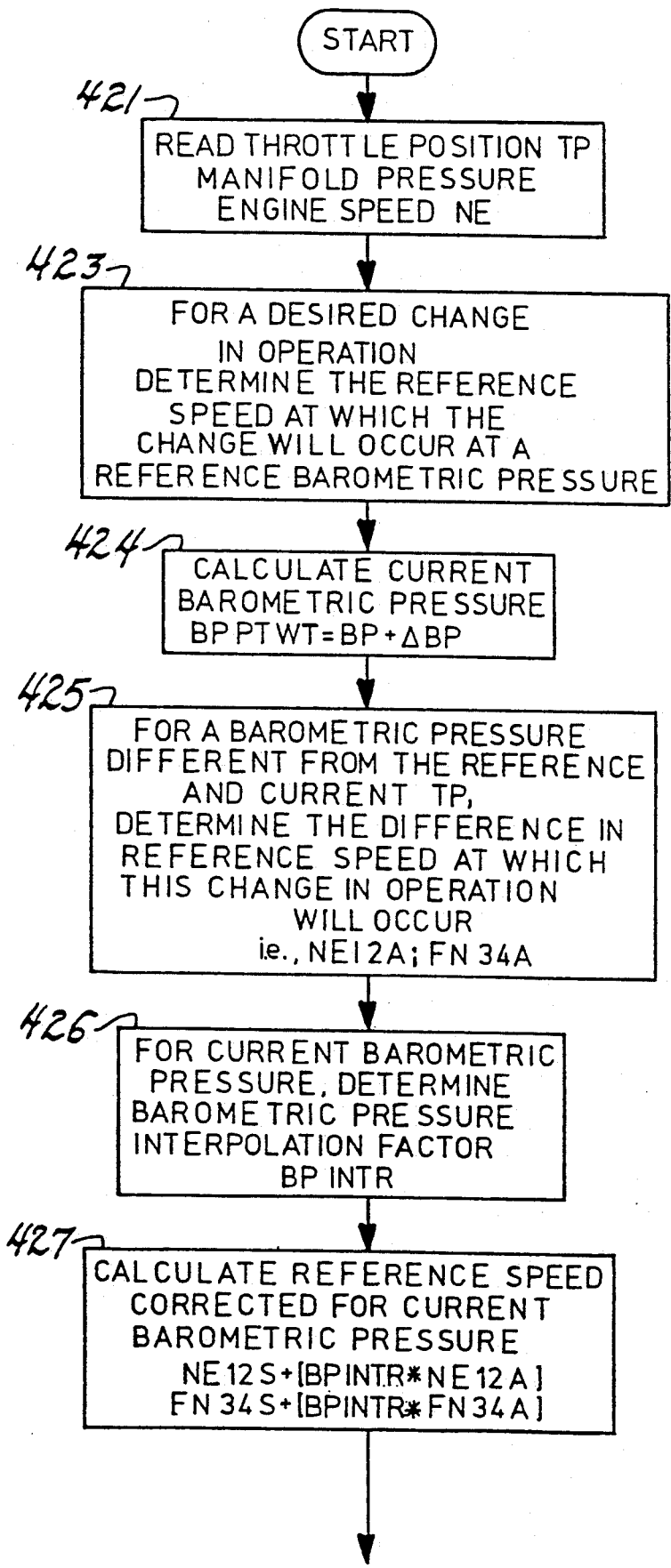
FIGS. 11a and 11b taken together are a diagram showing a technique for correcting shift point speeds for barometric pressure.
Figure 11B:
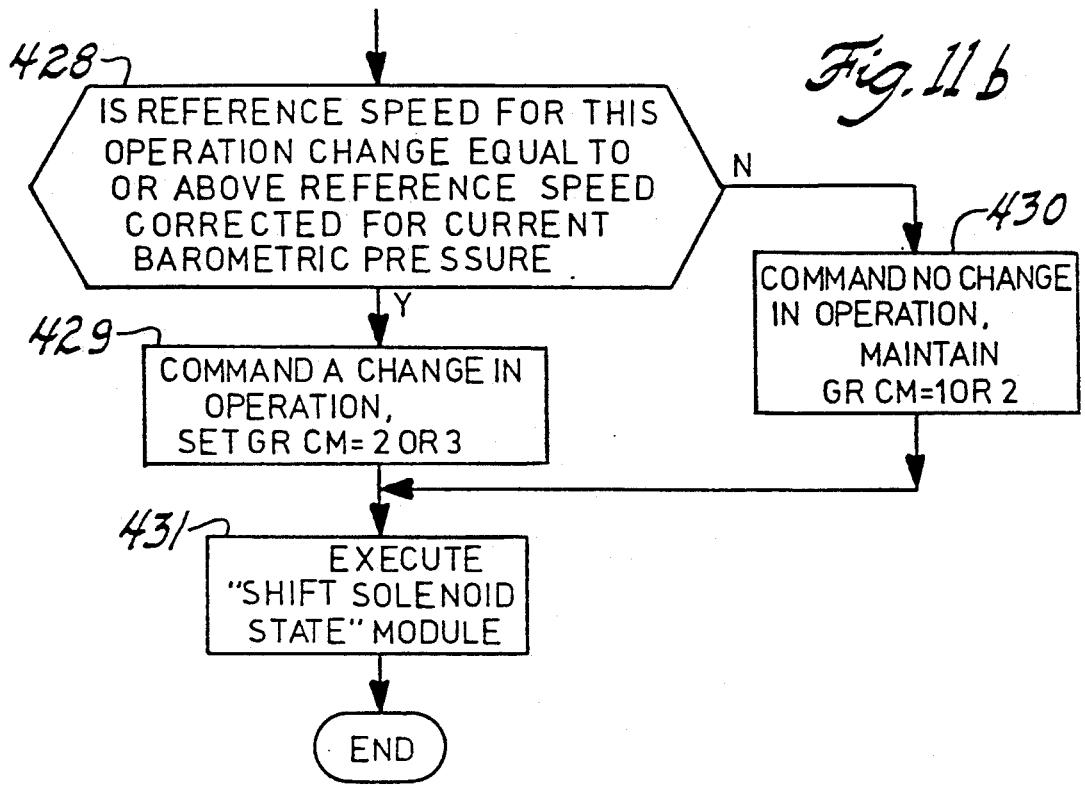

Although the wide open throttle shift point described with reference to FIG. 11 is for a 1-2 upshift and the vehicle speed scheduled shift point has been described with respect to a 3-4 upshift, upshifts and downshifts for either scheduled or wide open throttle conditions can be made among any of the gears of the transmission. Also, the change in operation can be other than a gearshift, e.g., a change in state of the torque converter clutch.

An example of applying the barometric pressure correction technique is described next for upshifts and downshifts.

Vehicle Acceleration-Throttle Position Calibration

A function relating minimum acceptable vehicle acceleration before an upshift and throttle position is determined empirically by calibration. Preferably two substantially identical vehicles fitted with a similar powertrain, transmissions control, engine control, and axle ratio are selected for operation under identical road conditions. The transmission control should control gearshifts according to a function relating throttle position and vehicle speed or engine speed but without reference to vehicle acceleration or any other criteria for delaying, preempting or preventing scheduled gearshifts. Vehicle speed, set manually by each operator before each test, is controlled automatically, preferable by speed control logic such as electronic engine control having vehicle speed control capability, available as standard or optional equipment from most manufacturers. Before calibration begins, conformance of the powertrains to an identical shift schedule is checked by verifying that upshifts occur at the same vehicle speed and throttle position when the vehicles are loaded and operated under the same conditions.

One of the vehicles is then loaded to a substantially higher gross weight than the other, either by attaching to the vehicle an external load on a trailer or by placing weight in the vehicle. Calibration is conducted at altitude of about 5000 feet above sea level, on an inclined road of substantial and constant grade.

The unloaded vehicle precedes the other; both climb the hill in a gear other than the highest gear of the transmission, at constant throttle position, with a positive time rate of change of vehicle speed. In the upper range of throttle position and throughout the major portion of the entire range positive vehicle acceleration is maintained, but at the lower extremity of the range vehicle acceleration can be negative and yet satisfy vehicle acceleration requirements. Vehicle speed, recorded or calculated on the basis of data acquired during successive background loops, is divided by the period between these background loops to establish vehicle acceleration values. Vehicle speed and acceleration are continually recorded with onboard electronic instrumentation. When a scheduled upshift to the next gear occurs, conformance of the quality of the upshift of the heavily burdened vehicle to acceptable standards of noise, vibration and harshness (NVH) is determined objectively. For example, among other conditions, care is taken to avoid the lugging limit, an engine speed at which shuddering and vibration is induced because engine speed is too low for the current gear and load. Sensible feel of the upshift to the operator is determined and recorded in subjective terms.

If the upshift is unacceptable, the calibration test is performed again under identical conditions except that vehicle acceleration immediately before an upshift is increased repeatedly until a shift of high quality and conformance to NVH and post-shift vehicle speed criteria is produced. The calibration is performed in this way repeatedly under similar conditions except that throttle position is varied substantially over its full range. At each throttle position, vehicle acceleration is changed until shift quality and post-shift vehicle speed requirements are met. Calibration is repeated entirely in this way for each of the gear ratios from which an upshift is to be controlled on the basis of the minimum vehicle acceleration standard. Finally, the entire calibration procedure is repeated with both vehicles descending a grade to establish for each gear ratio functions relating pre-downshift vehicle acceleration to throttle position that produce a downshift satisfying NVH and vehicle speed criteria.

Gear shifts in the unweighted vehicle are used to verify that the functions resulting from calibration testing will inhibit scheduled shifting in a vehicle operating under normal load conditions. This verification is necessary to assure that the new criteria established by calibration for preempting upshifts will not adversely affect scheduled shifting unless load conditions are so excessive, such as when operating a weighted vehicle under unusual loads, that normal shift schedules require modification.

An object to the calibration is to determine whether, after each scheduled upshift, sufficient throttle position movement to a more fully open position is possible in order to maintain after an upshift the vehicle speed present immediately before the upshift. Referring to FIG. 8, this additional available throttle travel is represented by the horizontal distance between upshift and downshift lines for a particular gear ratio at a given vehicle speed. For example, the varying TP REL range between the upshift function labeled 2-3, where an upshift from second to third gear occurs, and the corresponding downshift function labeled 3-2 is the maximum reserve range through which throttle position can be increased after an upshift to maintain vehicle speed without causing a dowmshift. An additional range of throttle position movement is required to increase engine torque because torque delivered to the wheels is reduced due to an upshift. However, at a given vehicle speed, the range of increased throttle position is limited by the corresponding downshift line, which must be avoided to prevent cyclic upshifting and downshifting, the powertrain hunting condition.

Figures 23, 24:
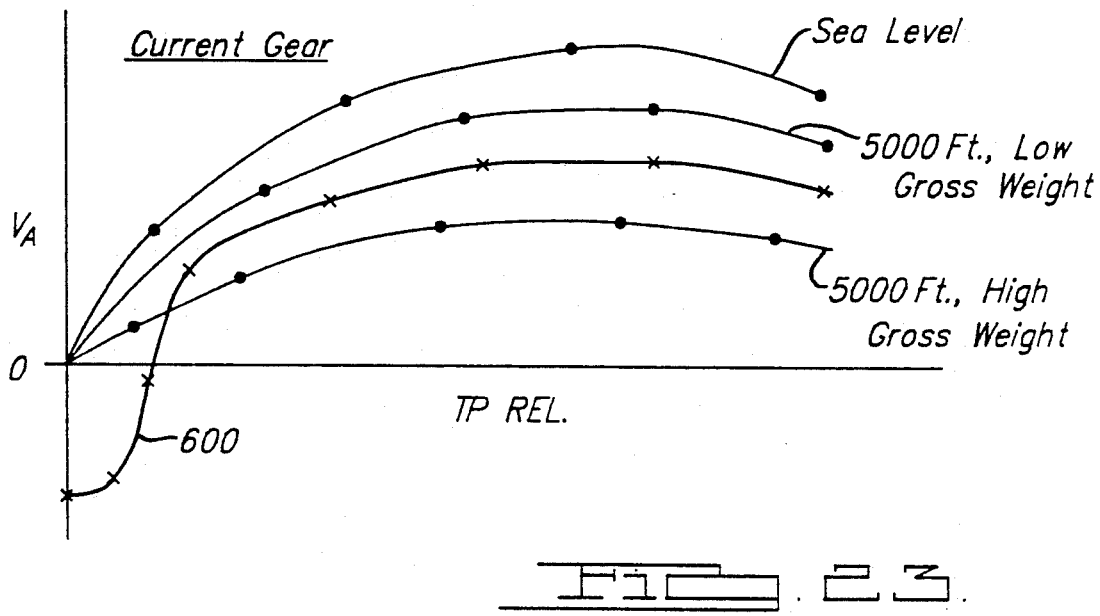
FIG. 23 ia a graph showing a function relating vehicle acceleration and current throttle position for use in the shift control module to preempt scheduled gearshifts.
FIG. 24 is a schematic representation of vehicle acceleration values from functions, like that of FIG. 23, stored in memory accessible by reference to current throttle position.

A function 600 for use in a 2-3 upshift that results from this calibration technique is illustrated in FIG. 23 together with similar functions derived by calibration at sea level, high altitude and low gross weight, and high altitude and high gross weight. The relation 600 between minimum vehicle acceleration and throttle position changes uniformly over the range of throttle position. Its maximum value may be approximately 0.5 mph/sec near the mid-range of throttle position. However, in the vicinity of the lowest throttle position settings, minimum vehicle acceleration can be negative and still meet the shift criteria because the shift control must permit throttle backout upshifts especially when the vehicle is going downhill in high gear. A downshift in this condition reduces engine and allows engine braking effects to control vehicle speed.

Learned NOV Shift Control—FIGS. 21 and 22a–22c

Figure 21:
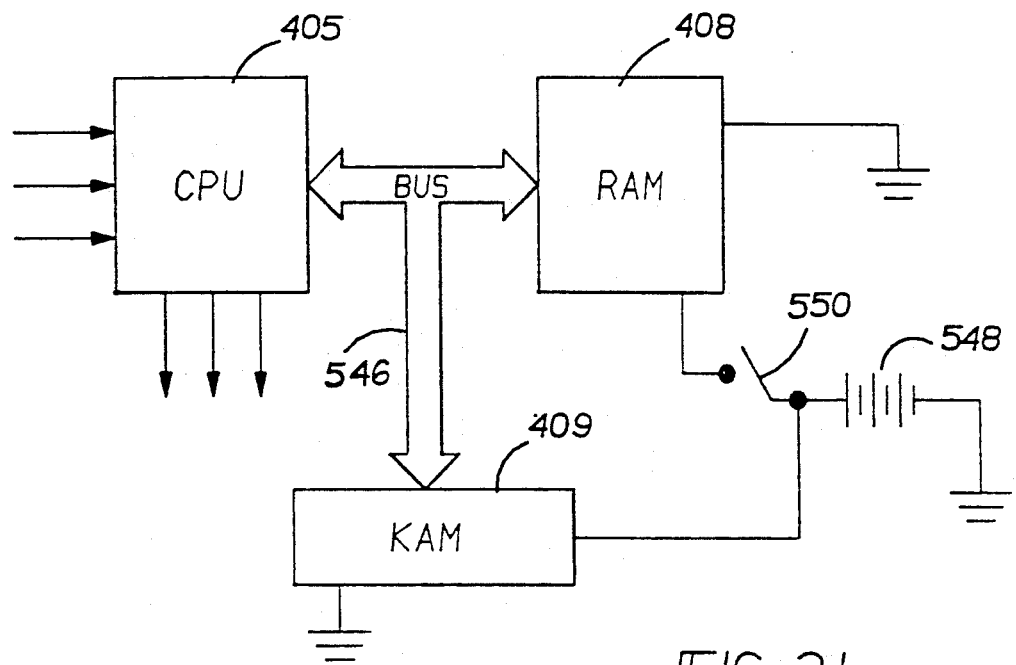
FIG. 21 is a schematic diagram showing sensor data input lines, a computer, keep-alive memory, random access memory, and control data output lines.

FIG. 21 shows the arrangement of CPU 405, RAM 408 and KAM 409 in greater detail than does FIG. 7. Data bus 546 carries data among the components, and a DC power source 548 is connected by a switch 550 to RAM but remains continually connected to KAM, a continuous electronic memory. Switch 550 represents the vehicle ignition switch. The diagram shows schematically that the contents of RAM is lost when switch 550 is open but the contents of KAM is retained and available to CPU 405 regardless of the state of the switch.

FIG. 6 shows a speedo gear assembly, which drives the vehicle speedometer and produces a signal representing vehicle speed. The assembly includes a pinion 552 fixed to output shaft 12, a gear 554 meshing with the pinion, and a speedo cable 556, whose speed is NC. The axle ratio RA and wheel revolution per mile are variables whose magnitudes may be changed after the driveline, transmission and vehicle are assembled. RA is the ratio of NO divided by wheel speed.

The number of speedo cable revolutions per mile is determined by calibration, and the calibration constant is XC. The number of teeth on the speedo drive gear 552 is TDE, and the number of teeth on the speedo driven gear 554 is TDN. The speed of output shaft 12 can be determined electronically with use of an eight pole variable reluctance device 558 or a Hall effect device, which creates a magnetic field that is cut by teeth formed on the output shaft as it rotates within the magnetic field. An electrical signal is induced in a conductor, the signal having a frequency Fv Hz, the VSS signal having PR pulses per revolution of shaft 12. Pinion 552 and gear 554 are chosen so that device 558 turns at 1000 revolutions per mile to produce 8000 pulses per mile when operating in a driveline having a predetermined RA and tire size.

The relation between output shaft speed NO, in revolutions per minute, and vehicle speed VS, in miles per hour, is the NOV ratio. An algorithm stored in an electronic memory contains steps for computing the NOV ratio, testing the accuracy of the calculations and storing the calculated results in KAM, whose contents are retained permanently yet replaceably. The algorithm is stored, recalled and executed repetitively while the vehicle is operating.

Engine speed NE and vehicle speed are derived from signals produced by sensors 413 and 417, respectively, RG is a constant corresponding to the current transmission gear, and RS is unity because the algorithm requires the torque converter to be locked up before NOV is calculated. The relationship among these variables is:

$$VS = (NE \times RS)/(RG \times NOV)$$

$$NOV = (NE \times RS)/(RG \times VS)$$

Vehicle speed is determined from the following:

$$VS = F_v/((TDE/TDN)(RA)(RM)(PR/3600))$$

wherein TDE and TDN are constants representing the number of teeth on the pinion 552 and gear 554 selected at assembly of the transmission, RA is a constant representing the axle ratio of the differential mechanism supplied as original equipment when the vehicle is assembled, RM is a constant representing the number of revolutions per mile for the tire size supplied as original equipment, PR is a constant representing the number of VSS pulses produced by the speedo assembly per revolution of the speedo cable, and Fv is the VSS frequency in Hz.

Therefore, $$NOV = [(NE)(RS)(TDE/TDN) - (RA)(RM)(PR/3600)]/(RG)(Fv)$$

This equation reduces to:

$$NOV = (NE)(RS)/(RG)(Fv)/(0.451 \pm 0.017)$$

or $$NOV = (NE)(RS)/(RG)(Fv)(2.222 \pm 0.0.83)$$

assuming a design parameter $$Xc = 1000 \pm 37.5 \text{ speedo cable revolutions per mile.}$$

Therefore, NOV can be calculated provided NE, RS, RG and Fv are known.

Figure 22A:
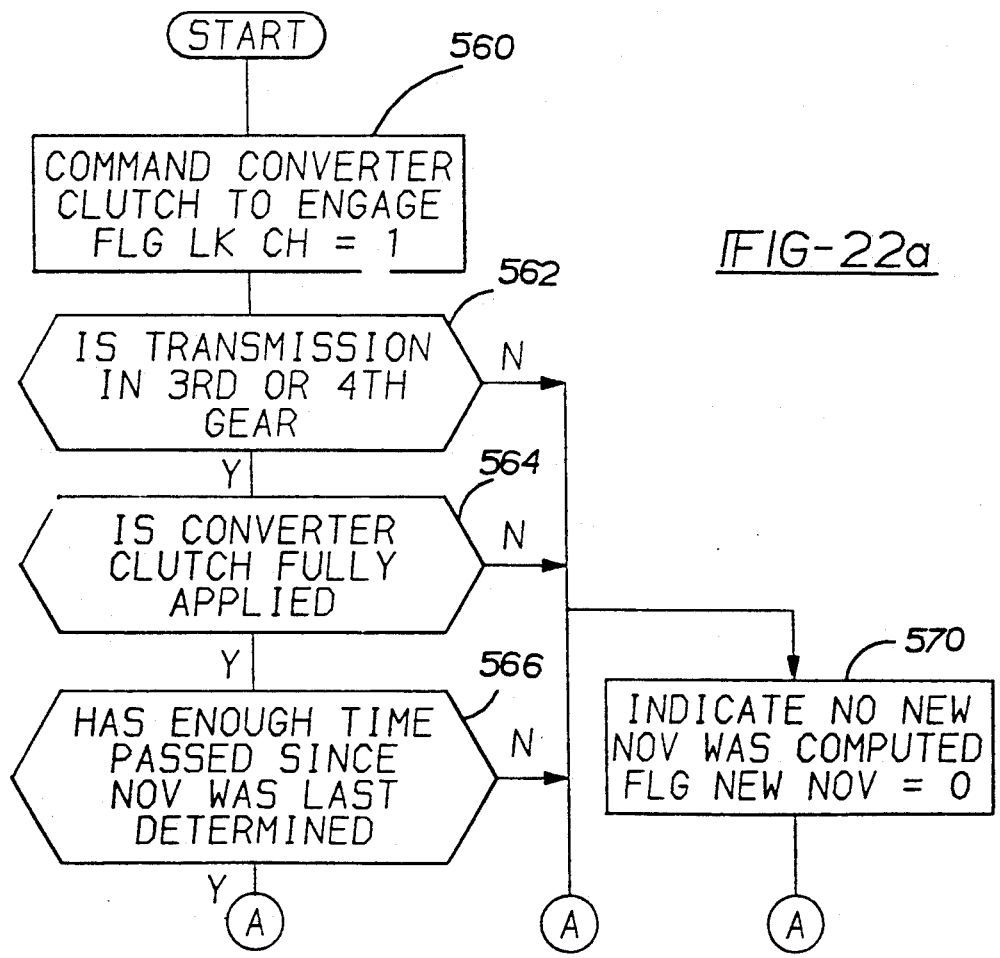
FIGS. 22a-22c show logic for calculating and storing in keep-alive memory a ratio of actual NOV to base NOV for use in controlling automatic transmission reference speeds at which a change in operation of the transmission, such as a gearshift, occurs.
Figure 22B:
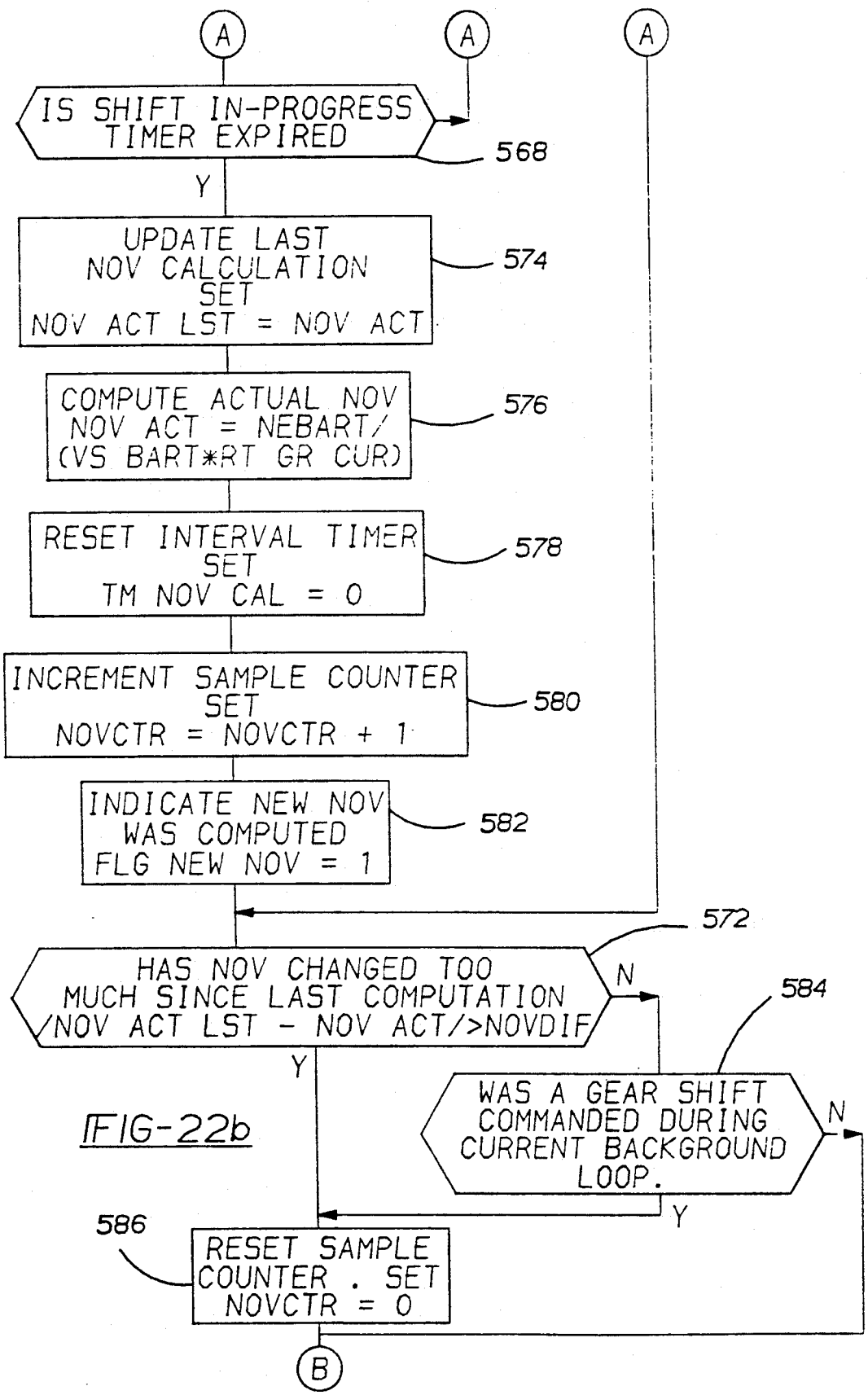
Figure 22C:
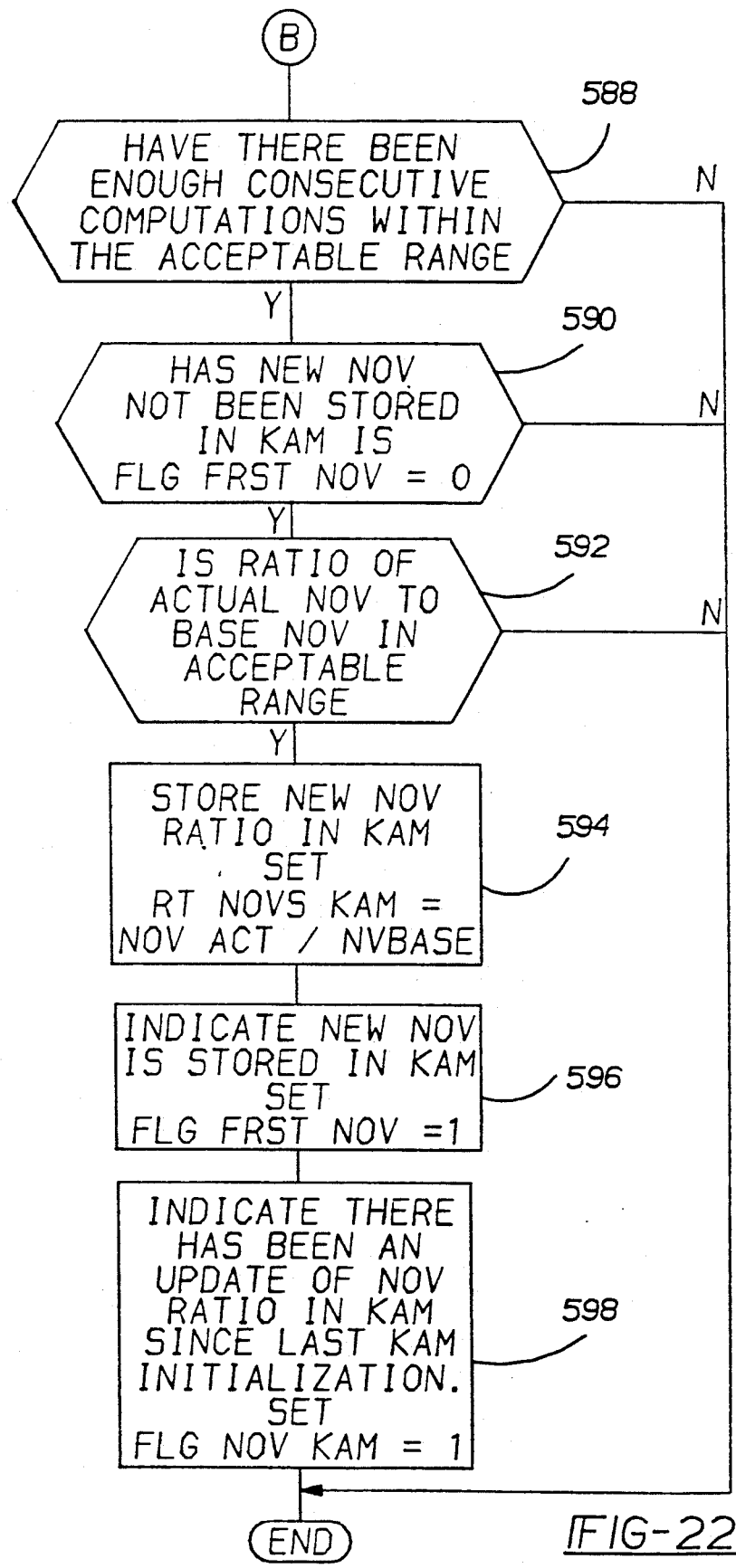

Refer now to FIGS. 22a–22c where the algorithm that controls repetitive determination of NOV is diagramed. At statement 560, a converter clutch lockup command issues to assure RS is unity. Preferably, the transmission is operating in a higher gear, the converter has engaged, sufficient time has passed since NOV was last determined, and no gearshift is in progress, conditions tested at statements 562, 564, 566, 568 before the algorithm next sets NOV. If any of these conditions is false, at statement 570 flag FLG NEW NOV is set equal to zero to indicate NOV was not computed during the current background pass. Thereafter, control continues at statement 572.

If these conditions are true, statement 574 updates NOV by setting NOV computed during the last pass, NOV ACT LST, equal to NOV ACT. Then, NOV is computed at 576 for the current pass by using the filtered engine speed NEBART and filtered vehicle speed VSBART (derived from Fv) and current gear ratio RT GR CUR. Next, at 578, interval timer TM NOV CALC is set equal to zero, the timer previously checked at 566. At 580 NOV calculation sampling counter NOV CTR is incremented to keep a running total of the number of such calculations. At 582, flag FLG NEW NOV is set to unity to indicate a new NOV ACT has been calculated during the current background pass. If condition 562, 564, 566 or 568 is false, NOV ACT will have been set to zero.

A test is made at 572 to determine whether there is too much variation in NOV since last calculated, by comparing the difference between current and previous NOV values to constant NOVDIF. If this test is true, or if test 584, which inquires whether a gear shift is commanded during the current background pass, is true, then statement 586 resets NOV calculation counter NOVCTR to show that no acceptable NOV has been calculated during the current pass.

But if 572 or 584 is false, counter NOVCTR retains its current value and control passes to 588 where NOVCTR is compared to a constant NOVCVT, the minimum number of acceptable NOV calculations required to update NOV stored in KAM. AT 590, FLG FRST NOV is compared to zero to test whether RT NOVS KAM has not been loaded into KAM. At 592, the ratio of actual NOV to base NOV is tested against an acceptable range.

If 588, 590 or 592 is false, control terminates. But if true, 594 stores the new calculated NOV to base NOV ratio NOV ACT/NV BASE in KAM as RT NOVS KAM. NV BASE is a calculated constant corresponding to the original equipment TDE, TDN, RA and RM values with which the vehicle is originally assembled. At 596, FLG FRST NOV is set equal to unity to show the new value has been loaded in KAM. At 598, FLG NOV KAM is set to unity to indicate at least one updating of RT NOVS KAM has been made since the last time KAM was initialized.

The new value for RT NOVS KAM is used to correct VS, at which gear ratio changes are scheduled to occur, as explained above with reference to FIG. 8, for example, to correct vehicle speed FN34S at which a 3-4 upshift is scheduled at sea level barometric pressure, or vehicle speed FN21S at which a 2-1 downshift is scheduled, as explained above with reference to FIGS. 12*a*, 12*b* and 12*c*.

Figure 12B:
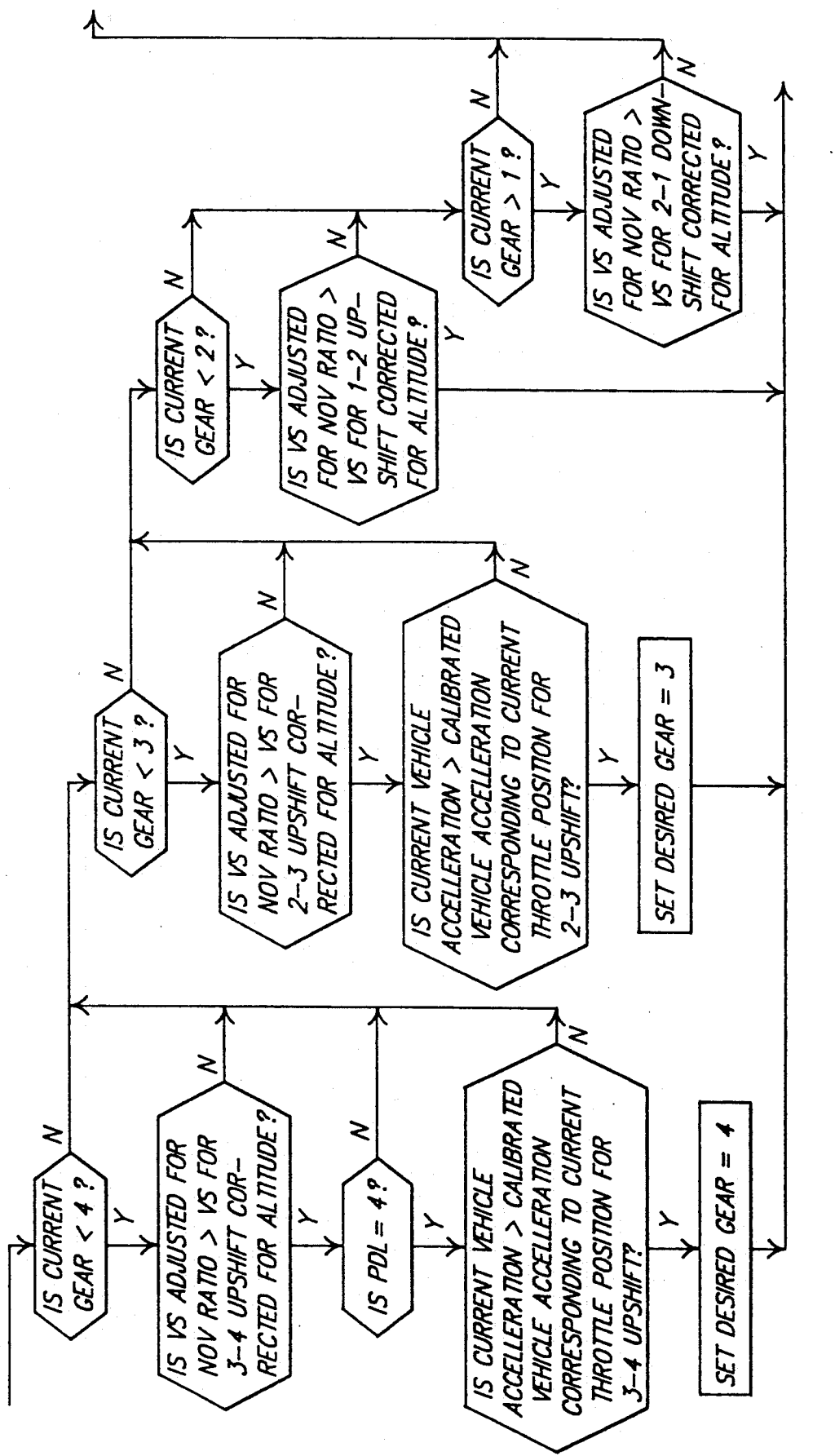

Gearshift Control Module—FIGS. 12*a*-12*c*

This module begins at statement 446 where current gear is compared to first gear. If that comparison is true, a comparison is made at 447 to determine whether engine speed NE is above wide open throttle speed corresponding to the 1-2 shift point corrected for altitude. NE is the filtered engine speed during the current background pass. NE12S is the wide open throttle speed at sea level where the 1-2 shift occurs. BP INTR, an interpolation factor corresponding to barometric pressure at the current altitude of the vehicle produced by sensor 415, is multiplied by NE12A, the wide open throttle engine speed difference at the current altitude where the 1-2 shift point occurs. If current engine speed is above the engine speed for the 1-2 shift point corrected for altitude, statement 448 is executed, whereby desired gear is set equal to 2 indicating second gear, and flag FLG UP NE is set to indicate that the upshift is due to a wide open throttle condition.

If 446 is true, a comparison is made at 447 to determine whether engine speed is above wide open throttle speed for the 1-2 shift point corrected for altitude. To make this comparison, engine speed is compared to the speed resulting from the sum of NE12S, a calibration constant stored in computer memory defining the engine speed above which an upshift from the first gear to the second gear occurs at sea level, and the product BP INTR * NE12A. BP INTR is an interpolation factor stored in computer memory as a f(x) function related to a range of ambient barometric pressure values X. NE12A is a calibration constant stored in computer memory containing a predetermined engine speed by which the shift point at sea level is altered to account for altitude difference. This speed difference is multiplied by BP INTR and the product is added to the sea level shift point engine speed.

If both statements 446 and 447 are true, desired gear is set equal to 2 and a flag is set to indicate an upshift due to a wide open throttle condition is desired. However, if either statement 446 or 447 is false, an inquiry is made at 449 to determine whether second gear is the current gear and, if so, at 450 whether engine speed is above the wide open throttle shift point corrected for altitude, as has been described for a 1-2 upshift with respect to statement 447. If statements 449 and 450 are true, desired gear is set to 3 and wide open throttle upshift flag FLG UP NE is set.

Thereafter, desired gear is determined on the basis of vehicle speed rather than engine speed. If either statement 449 or 450 is false, at 451 a comparison is made to determine whether current gear is equal to or greater than third gear. If so, at 452, the current engine speed NE is compared to an altitude corrected NE for a 3-4 upshift. The value to be compared to engine speed includes the variables: NE34S, a calibration constant engine speed where a scheduled 3-4 upshift at sea level is made; BP INTR, the barometric pressure integration factor; NE34A, a calibration constant stated in terms of engine speed difference representing a correction of engine speed at sea level where a 3-4 upshift is made. RT NOVS is the ratio of calculated N/V to a base or calibration constant N/V stored in keep-alive memory KAM and CS SFT MULT, a cold start shift multiplier. If statements 451 and 452 are true, and if PDL is equal to 4, desired gear is set equal to 4. CS SFT MULT varies between 1.0 when transmission fluid temperature is warm and 1.25 when it is cold. Its value also depends on the fluid temperature at start-up.

Control passes to the logic shown in FIG. 12*b* if either statement 451 or 452 is false. The desired gear is set equal to 4 if current gear is less than 4, vehicle speed adjusted for NOV ratio is greater than VS corrected for altitude, and PRD equals 4, provided vehicle acceleration requirement is also satisfied. To pass the acceleration test, statement 455 must be true. That statement compares current vehicle acceleration to the vehicle acceleration from the calibration function, such as the function shown in FIG. 23, for upshifts from third gear to fourth gear at current throttle position.

If either statement 454 or 455 is false, a comparison is made at 456, provided current gear is less than 2, to determine whether vehicle speed adjusted for NOV ratio is greater than VS corrected for altitude. If this is true, statement 457 compares current vehicle acceleration to the vehicle acceleration from the calibration function for upshifts from second gear to fourth gear at current throttle position. If both of these conditions are true, desired gear is set equal to 3.

Yet another upshift is considered if current gear is less than 2 by executing statement 458 where vehicle speed, corrected for the NOV ratio, is compared to vehicle speed corrected for altitude. If this test is true, control passes to the logic of FIG. 12*c* where execution of this module is ended, and no test is made on the basis of vehicle acceleration criteria.

Alternatively, the control continues thereafter with respect to downshifts in a similar way. For example, current gear is compared to 1, and at statement 459 vehicle speed, corrected for NOV ratio, is compared to an altitude corrected vehicle speed for a 2-1 downshift. The interpolation factor, calibration constants, and other variables shown in the equation at statement 459 are the same as those discussed previously with respect to statement 452 except that the calibration constants relate to a 2-1 downshift rather than a 3-4 upshift.

If statement 459 is true, control passes to statement 460 where a comparison is made to determine whether current gear is greater than 2. If so, at 461 the comparison is made to determine whether vehicle speed is below altitude corrected vehicle speed for a downshift to the second gear, and if true, desired gear is set equal to 2.

If statement 460 or 461 is false, a comparison is made at 462 to determine whether a current gear is greater than 3, and, if so, whether vehicle speed is below altitude corrected vehicle speed for a downshift to third gear. If statements 462 and 463 are true, desired gear and current gear are set equal to 3 and execution of the module terminates. If statements 462 or 463 are false, a comparison is made at 464 to determine whether current gear is greater than 3, and, if so, whether the operator has moved the PRNDL gearshift lever to the 3 position, thereby indicating that a manual downshift is desired. If a manual downshift is desired, both current gear and desired gear are set equal to 3; otherwise, only current gear is set equal to 3 and execution passes to the shift solenoid state module.

Figure 20B:
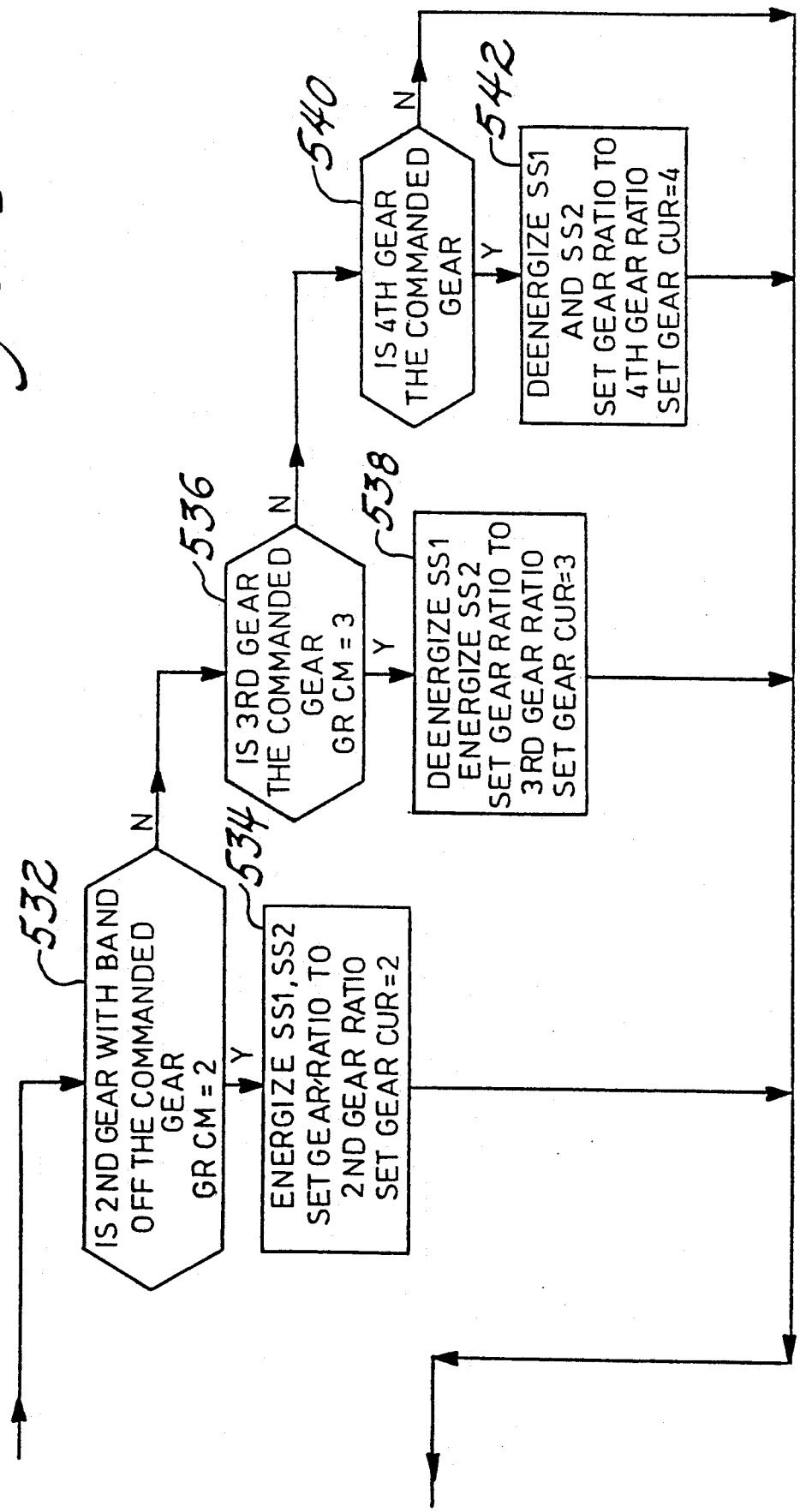

Shift Solenoid States Module—FIG. 20a-20b

The shift solenoid state module establishes the shift solenoid output states on the basis of commanded gear. The shift solenoids have different reaction rates, e.g., the solenoid that operates shift valve 188 reacts faster than the solenoid that operates shift valve 190. Gear shift changes are made for changing the state of only one shift solenoid, except when PRNDL movement causes a commanded gear change from 1.5 to 2. When this occurs, both shift solenoids move from off-state to on-state. A countdown timer is set when this condition occurs so that solenoid SS2, which operates shift valve 190, is energized before solenoid SS1 so that both hydraulic shift valves move to the on-state at the same time.

At 520 a comparison is made to determine if first gear is the commanded gear. At 522, if comparison 520 is true, shift solenoid SS1 is energized and shift solenoid SS2 is deenergized. The gear ratio corresponding to first gear is set equal to register SPD RT ST RT, which is the speed ratio at the beginning of the shift, and the current gear is set equal to 1. If comparison 520 is false, comparison 524 is made to determine whether second gear with the intermediate band ON is the commanded gear. If so, shift solenoids SS1 and SS2 are deenergized and SS1 delay timer is loaded with a predetermined time to allow SS2 to move Prior to SS1 because of the difference in response times previously referred to. Then the gear ratio is set equal to the second gear ratio and current gear is set equal to 2.

If comparison 524 is false, comparison 528 is made to determine whether second gear with the intermediate band OFF is the commanded gear and whether SS1 delay timer has expired. If so, the statement represented by 530 deenergize SS1, energize SS2, sets the gear ratio to the second gear, and sets current gear equal to 2.

If the comparison at 528 is false, statement 532 determines whether second gear with intermediate band OFF is the command gear. This condition implies that SS1 delay timer is expired. Then both shift solenoids are energized, and the gear ratio and current gear are set equal to corresponding second gear values.

A comparison is made at 536 to determine whether third gear is the commanded gear. If it is, solenoid SS1 is deenergized and SS2 is energized, the gear ratio and current gear are set equal to third gear values. If the comparison at 536 is false, a final comparison at 540 determines whether fourth gear is the commanded gear. Statement 542 causes the shift solenoids SS1 and SS2 to be deenergized and the fourth gear values to be set equal to current gear and gear ratio.

After statements 522, 526, 530, 534, 538 and 542 are executed, or if the comparison at 540 is false, control moves to a comparison at 544 to determine whether a shift is commanded during the current background pass. If so, the speed ratio at the start of the shift is set equal to the value specified in statement 546. When this is done, or if the comparison at 544 is false, execution of this module terminates.

4. Torque Converter Control—FIG. 16

After the control is enabled, usually upon staring the engine, background passes execute sequentially but with interrupts that occur at 1 msec intervals. Engine timing pulses occur at the rising edge or falling edge of a square wave whose period is proportional to the number of engine cylinders, kind of engine and engine speed. For example, when the powertrain of FIG. 6 includes an eight cylinder, four stroke engine, at 6000 rpm the period DT12S between these pulses expressed in clock pulses between each rising edge is 2.5 msec (60 sec. per min./4 pulses per rev./6000 rpm). After each pulse, certain functions necessary to operate the vehicle are executed under the control of algorithms, called and executed upon occurrence of each timing pulse. After each of these pulses, functions are commanded and executed, and data produced by various sensors are read, converted to digital form, and stored electronically for use later in calculations and control logic.

Figure 19A:
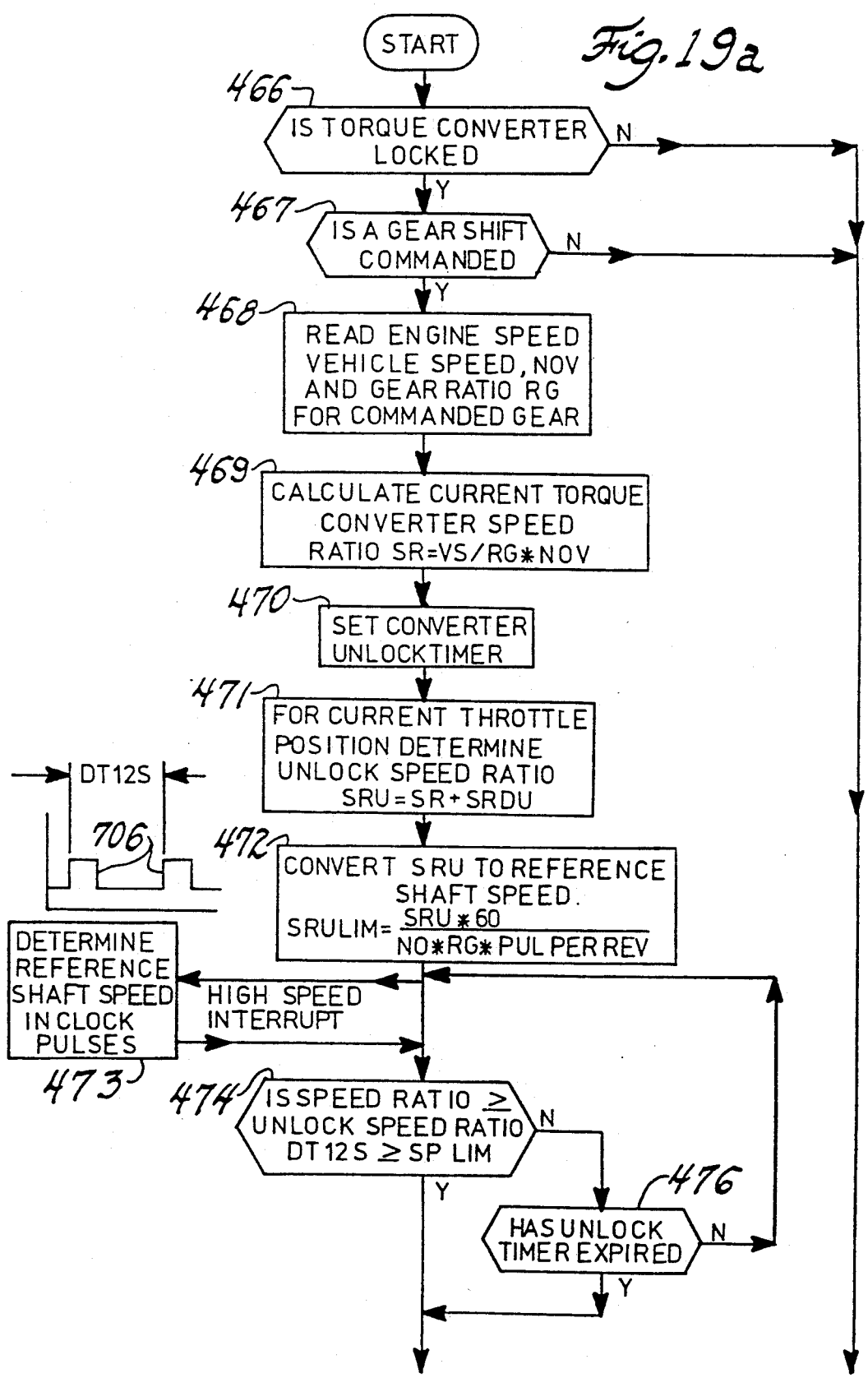
FIGS. 19a and 19b taken together are a diagram showing logic for controlling an upshift converter clutch module.
Figure 19B:
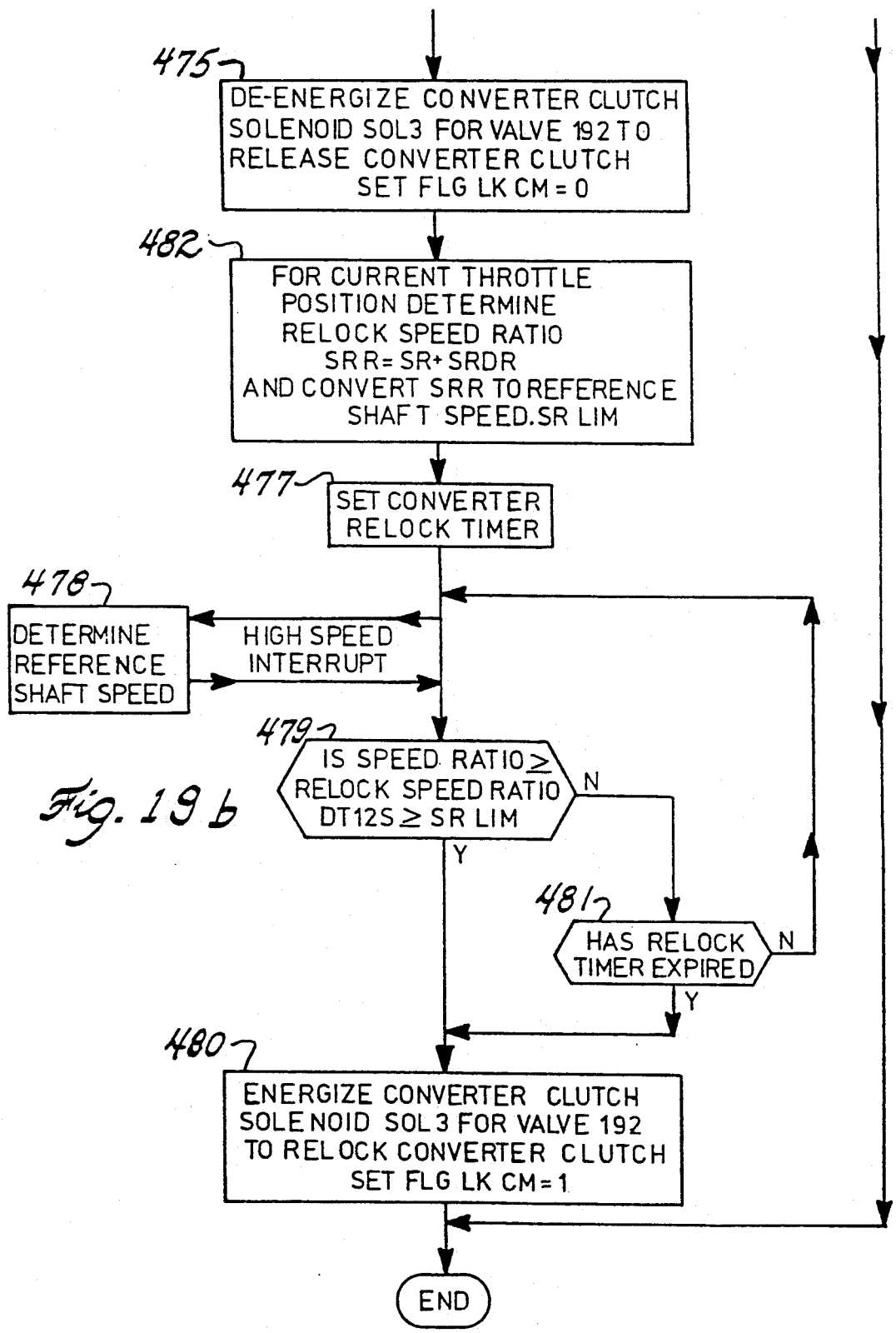

The frequency at which the timing pulses occur varies with engine speed, but certain data are required to be read, updated and processed more frequently. For example, during a power-on upshift, such as that discussed below with reference to FIGS. 19a and 19b, torque converter speed ratio is calculated during each interrupt and its current value is compared to a predetermined value.

In vehicles having front wheel drive, space limitations and lack of access to certain transmission shafts require that no torque converter turbine speed sensor be used. But converter speed ratio SR is required. Instead, torque converter turbine speed NI is calculated from current vehicle speed and current transmission gear, for which the associated gear ratio is a stored constant value. Vehicle speed is known from data produced by sensor 417. Turbine speed NI is calculated from NO and the gear ratio. Converter speed ratio SR is equal to NI/NE.

Figure 16:
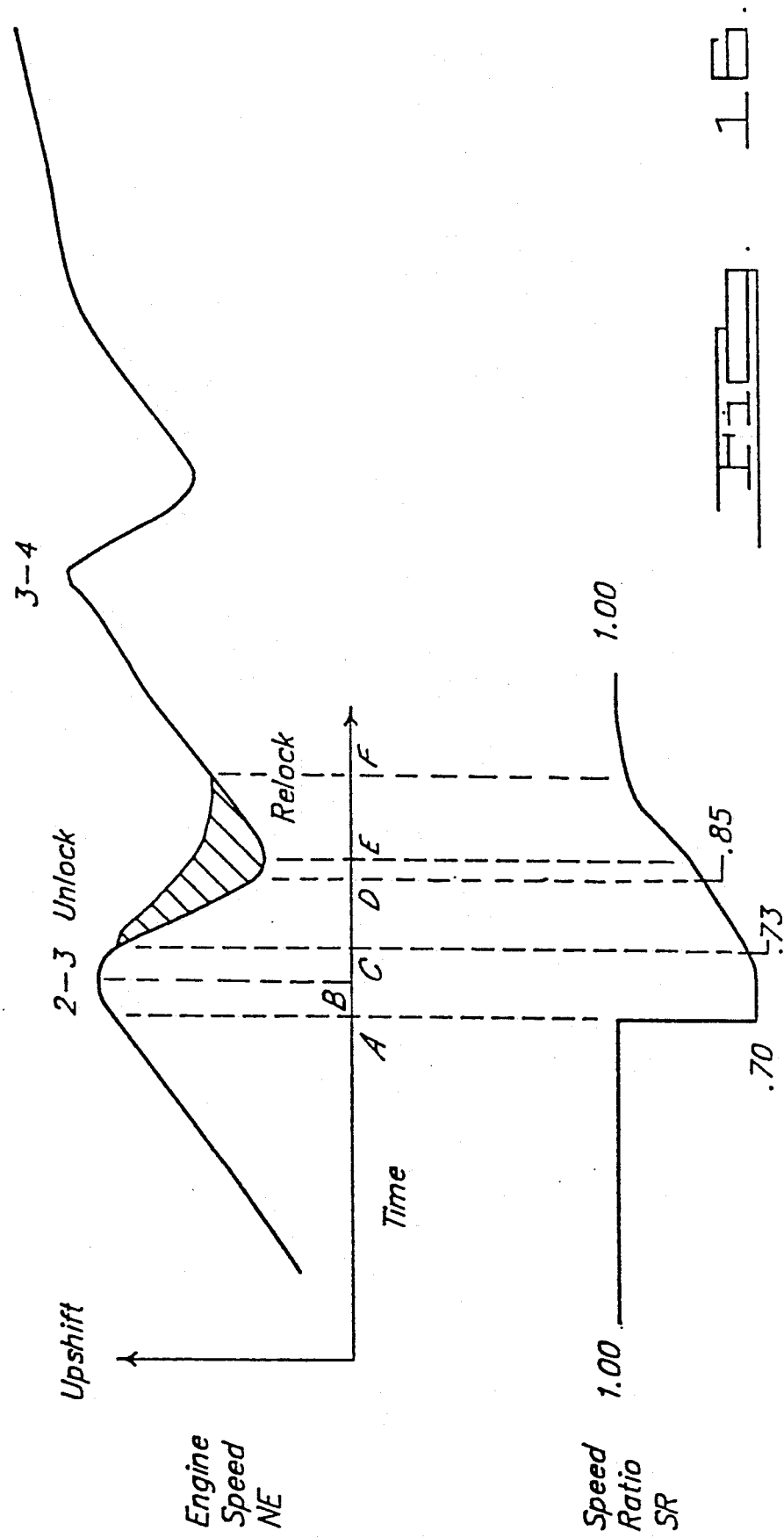
FIG. 16 is a diagram showing the change in engine speed and torque converter speed ratio over time during a 2-3 shift in which the torque converter is unlocked and relocked.

The technique can be understood best with reference to FIG. 16. Engine speed varies with time as transmission gear ratio changes are made, but VS is assumed to be, and is in fact, substantially constant during each background pass. When engine speed rises to A in FIG. 16, an upshift, e.g. a 2-3 upshift to third gear, is commanded.

At B, the oncoming function begins to engage. The control logic, immediately after occurrence of an upshift command and thereafter until a new commanded gear issues, uses third gear as the current gear in all subsequent calculations. However, a short period passes between the command to produce third gear and its completed engagement. After current gear acquires its third gear value upon issuance of the upshift command, calculated torque converter speed ratio SR falls, as in FIG. 16, from 1.00, the value corresponding to the converter lockup clutch being engaged, to a lower value, e.g., 0.70. This reduction occurs because impeller speed NI, calculated on the basis of the new gear ratio for third gear, is lower than NI for second gear assuming vehicle speed is constant. The lower calculated SR value is inaccurate until the upshift is completed at F, where calculated and actual speed ratio are again 1.00.

During the interval from A to F, SR rises from 0.70 to 1.00 as the oncoming and off-going friction elements attain the status each has at completion of the upshift, and the converter clutch relocks. At time C, the control issues a command which unlocks converter clutch 54. At time D, the control issues a command to relock the converter, and the relock is completed at time F. During the D-F period, the gear ratio change is completed at E where the oncoming friction element becomes fully engaged.

At time C and thereafter, continuously during the period before clutch 54 is relocked at F, converter SR rises as NE falls due to progressive engagement of the oncoming friction brake or clutch and the associated gear ratio reduction this engagement produces. During the A-F period, current converter SR must be compared to predetermined reference speed ratios to establish time C, when clutch 54 is commanded unlocked, and time D, when the clutch is commanded relocked. Converter SR changes too fast during the A-F period to maintain control if the comparison is performed only once per background pass. Therefore, a comparison is made during each 1 msec interrupt between reference unlock and reference relock converter speed ratios to determine when to unlock and relock the converter clutch. The converter speed ratio is proportional to the ratio NE/VS. The speed ratio at C and D, where the converter unlocks and later relocks, are known.

To implement this control strategy for the torque converter, a register SR LIM is calculated in units of clock pulses. It represents the reference unlock torque converter speed ratio and, at a later point during the execution of the control algorithm, the reference relock torque converter speed ratio. SR LIM is determined once per background loop and is compared to DT12S, which is the number of clock pulses produced by the internal clock of the microprocessor control unit between the rising edges of the square wave timing pulses produced by wave generator 407. The reference speed ratio is related to engine speed and is expressed in units of clock pulses. Rapid changes in converter speed ratio are determined each millisecond during the interrupt. DT12S is updated at that frequency and compared at that frequency to the reference converter speed ratio, which is updated once per background loop.

After the converter clutch control begins to operate and the comparison shows that DT12S exceeds SR LIM, a command to unlock clutch 54 issues. Next, a new value for SR LIM corresponding to a higher converter speed ratio, at which the converter clutch is to relock, is calculated. When DT12S again equals or exceeds the new reference speed ratio, a command to relock the clutch issues. Commands to unlock and relock the clutch cause converter solenoid SOL3 to change state, which action causes valve 192 to change state and produce the desired change in the state of clutch 54. If the calculated converter speed ratio does not reach or exceed the reference speed ratio before expiration of a default timer set to regulate the length of the period between the commands to lock and relock the converter and their execution, then clutch 54 is immediately locked and relocked upon expiration of the timer.

Vehicle speed, updated each background pass, is known from output produced by sensor 417, and is equal to the product of the following: engine speed NE, known from the output of sensor 413; transmission gear ratio RG, available from electronic memory as a stored constant; NOV, the ratio NO/VS; and torque converter speed ratio, for which no sensor information is available directly. However, because all of the other values of this relationship are known, torque converter speed ratio can be calculated from VS/NE*RG*NOV. In this way, the reference converter speed ratio SR LIM is calculated and updated once per background loop, the first calculation being made with the gear ratio corresponding to the desired gear in which the transmission is to operate at the conclusion of the gearshift change.

Figure 17:
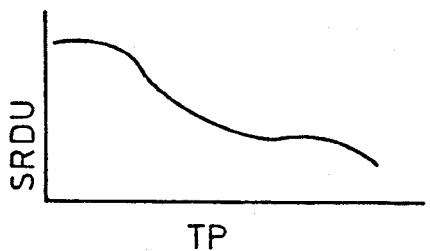
FIG. 17 is a graph, stored as a fox function in electronic memory, relating torque converter speed ratio unlock correction factor vs. throttle position.
Figure 18:
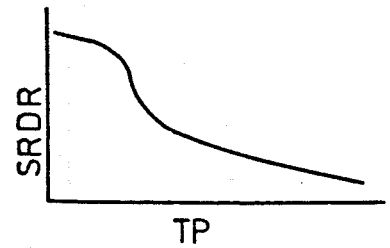
FIG. 18 is a graph, stored as a fox function in electronic memory, relating torque converter speed ratio relock correction factor vs. throttle position.

An example of this is third gear set at time A for the 2-3 upshift described with reference to FIG. 21. Using this example, the initial reference converter speed ratio is 0.7 at time A. Stored in memory as fox functions of throttle position and desired gear are converter speed ratio unlock correction factors SRDU, an example of which is shown in FIG. 17. The initial reference speed ratio is updated by adding SRDU to establish the unlock reference speed ratio, 0.73 in FIG. 21, at which the converter clutch is unlocked. By suitably adjusting the dimensional units, this value is expressed in terms of clock pulses corresponding to the dimension of DT12S.

After clutch 54 is unlocked, the converter reference speed ratio is updated again recalling from computer memory on the basis of current throttle position, a relock converter speed ratio correction SRDR. This second correction is added to the reference speed ratio to produce a speed ratio that is compared to the rapidly changing value DT12S. When torque converter speed ratio, expressed in clock pulse units, equals or exceed the relock reference speed ratio, a command issues to relock the torque converter clutch.

Converter unlock and relock timers are set when the corresponding commands to change the state of clutch 54 issue. Upon expiration of the timers, the converter clutch is unlocked and relocked regardless of the result of the comparison of current converter speed ratio with the reference speed ratio.

Converter Clutch Control Module—FIG. 19

An example of the technique for controlling converter clutch during a gear ratio change is described next with reference to FIG. 19. At 466, an inquiry is made to determine whether the torque converter is locked and, at 467, whether a gearshift is commanded. If either statement 466 or 467 is false, execution of the module terminates, but, if both statements are true, control passes to 468 where engine speed, vehicle speed NOV and gear ratio RG for the commanded gear are read or calculated. From values determined by executing statement 468, the current torque converter speed ratio is calculated by executing 469. At 470, a converter unlock countdown timer is set with a predetermined period that unlock clutch 54 when the timer expires.

At 471, a converter clutch unlock speed ratio increment SRDU, recalled from computer memory on the basis of current throttle position, is added to the calculated converter speed ratio to produce SRU, the reference converter unlock speed ratio. At statement 472, SRU is converted to SR LIM, the unlock converter speed ratio reference in units of clock pulses per timing pulse. This value is comparable to the number of clock pulses represented by DT12S, which is upgraded each millisecond during a high speed interrupt 473.

At 474, a comparison is made to determine whether DT12S is equal to or greater than SR LIM. If statement 474 is true, at 475, flag FLG LK CM is set equal to zero, thereby deenergizing the converter clutch solenoid SOL3 and causing the pressure output from valve 192 to release the converter clutch. If statement 474 is false, an inquiry is made at 476 to determine whether the unlock timer has expired. If so, 475 is executed, but if not, control passes to 474 to determine whether the value of DT12S, updated during the next high speed interrupt, has attained a value that permits clutch 54 to unlock. This loop continues until either the timer is expired or the speed ratio criteria is satisfied.

Thereafter, at 482, SRDR is recalled from memory on the basis of current throttle position. This value is added to the reference converter clutch speed ratio to produce SRR, the converter relock speed ratio. SRR is converted to SR LIM, the relock reference in clock pulses per timing pulse, by the equation in block 472.

At 477, a torque converter relock countdown timer is set at a predetermined speed. Successive high speed interrupts 478 continue at one millisecond intervals.

At 479, an inquiry similar to that at 474 is made to determine whether DT12S equals or exceeds the relock reference speed ratio SR LIM. If statement 479 is true, at 480, converter clutch solenoid SOL3 is energized by setting the command flag FLG LK CM equal to 1 so that pressure output from valve 192 causes clutch 54 to relock. If statement 479 is false, at 481, a check is made to determine whether the relock timer has expired If expired, statement 480 is executed, but if unexpired, control passes again to statement 479. This relock loop continues to update DT12S until DT12S equals or exceeds the current SR LIM or the relock timer expires. Thereafter, clutch 54 is relocked.

Having described a preferred embodiment of our invention, what we claim and desire to secure by U.S. Letters Patent is:

1. A system for controlling gearshifts in an automatic multiple gear ratio transmission having an input and output for an automotive vehicle having an engine controlled by engine throttle position comprising:
   multiple ratio gearing and pressure-operated friction elements selectively engaged and released to produce multiple gear ratios through said gearing;
   a hydraulic circuit having multiple shift control valves and flow path switching means for selectively engaging and releasing said friction elements;
   means for determining current position of the engine throttle;
   means for determining current vehicle speed;
   means for determining current vehicle acceleration from the current vehicle speed;
   means for determining the currently engaged gear ratio;
   means for determining for a current gear ratio a function relating the current throttle position and a minimum vehicle acceleration at which an upshift from the corresponding current gear ratio can occur and a function relating the current throttle position and minimum vehicle speed at which an upshift from the corresponding current gear ratio can occur;
   means for comparing the current vehicle acceleration to said minimum vehicle acceleration and the current vehicle speed to said minimum vehicle speed; and
   means for producing a change in gear ratio by selectively engaging and releasing the friction elements in response to the result of said comparisons.

2. The system of claim 1 wherein the gear ratio change producing means includes means for preventing an upshift from the current gear ratio unless the current vehicle acceleration exceeds said minimum vehicle acceleration and the current vehicle speed exceeds minimum vehicle speed.

3. The system of claim 1 wherein the transmission operates in a driveline having an unknown or variable relation between vehicle speed and transmission output speed, further comprising:
   means for determining current engine speed;
   means for determining a base NOV ratio of transmission output speed to vehicle speed;
   means for calculating a current NOV ratio from the current engine speed, the current vehicle speed, and the currently engaged gear ratio;
   means for calculating a ratio of the current NOV ratio to the base NOV ratio and correcting said minimum vehicle speed using said corresponding functions and the ratio of the current NOV ratio to the base NOV ratio;
   means for comparing the current vehicle speed to said corrected minimum vehicle speed; and
   means for producing a change in gear ratio by selectively engaging and releasing the friction elements in response to the result of said comparisons.

4. A system for controlling gearshifts in an automatic transmission for an automotive vehicle, comprising:
   multiple ratio gearing and pressure-operated friction elements selectively engaged and released to produce multiple gear ratios through said gearing;
   a pressurized valve system having multiple shift control valves in a valve circuit that communicates with said friction elements;
   solenoid valve means in said circuit for distributing selectively to said shift control valves a fluid pressure signal actuating said friction elements;
   an electronic processor having a memory accessible to the processor stored with shift control information for a current gear ratio including a predetermine function relating current throttle position and a minimum vehicle acceleration at which an upshift from the corresponding current gear ratio can occur and a predetermined function relating current throttle position and minimum vehicle speed at which an upshift from the corresponding current gear ratio can occur;
   means communicating with said processor for generating a throttle position signal representing the current position of the engine throttle;
   means communicating with said processor for generating a vehicle speed signal representing current vehicle speed;
   means for determining current vehicle acceleration from the current vehicle speed;
   means communicating with said processor for generating a gear signal representing the currently engaged gear ratio;

means for comparing the current vehicle acceleration to said minimum vehicle acceleration and the current vehicle speed to said minimum vehicle speed; and means for energizing and deenergizing the solenoid valve means to produce a change in gear ratio by selectively engaging and releasing the friction elements in response to the result of said comparisons.

5. The system of claim 4 wherein the gear ratio change producing means includes means for preventing an upshift from the current gear ratio unless the current vehicle acceleration exceeds said minimum vehicle acceleration and the current vehicle speed exceeds said minimum vehicle speed.

6. The system of claim 4 wherein the transmission operates in a driveline having an unknown or variable relation between vehicle speed and transmission output speed, further comprising:

means communicating with said processor for generating a current engine speed signal representing current engine speed;

means for determining a base NOV ratio of transmission output shaft speed to vehicle speed;

means for calculating a current NOV ratio from the current engine speed, the current vehicle speed, and the currently engaged gear ratio;

means for calculating a ratio of the current NOV ratio to the base NOV ratio and correcting said minimum vehicle speed using the ratio of current NOV ratio to base NOV ratio;

means for comparing the current vehicle speed to said corrected minimum vehicle speed; and means for producing a change in gear ratio by selectively engaging and releasing the friction elements in response to the result of said comparison.

7. In an automotive vehicle powertrain comprising a multiple speed automatic transmission having multiple gear ratio gearing and pressure-operated friction elements electively engaged and released to produce multiple gear ratios through said gearing, a hydraulic circuit having multiple shift control valves and flow path switching means for selectively engaging and releasing said friction elements, and an internal combustion engine having a variable-position throttle, a method for preventing powertrain hunting comprising the steps of:

determining current position of the engine throttle;
determining current vehicle speed;
determining current vehicle acceleration from the current vehicle speed;
determining the currently engaged gear ratio; establishing for a current gear ratio a predetermined function relating the current throttle position and a minimum vehicle acceleration at which an upshift from the corresponding current gear ratio can occur and a predetermined function relating the current throttle position and a minimum vehicle speed at which a gear ratio upshift from the corresponding current gear ratio can occur;
comparing the current vehicle acceleration to said minimum vehicle acceleration and the current vehicle speed to said minimum vehicle speed; and
producing a change in gear ratio by selectively engaging and releasing the friction elements in response to the result of said comparisons.

8. The method of claim 7 wherein the gear ratio change producing step includes preventing an upshift from the current gear unless the current vehicle acceleration exceeds said minimum vehicle acceleration and the current vehicle speed exceeds said minimum vehicle speed.

9. The method of claim 7 wherein the step of defining a predetermined function includes:

operating the motor vehicle in a current gear ratio other than the highest gear of the transmission, at constant throttle position, and under a high load condition consisting of a gross weight substantially greater than normal gross weight, climbing a grade having substantial inclination, accelerating the vehicle while climbing a grade, accelerating the vehicle while vehicle gross weight is high, or a combination of these conditions;

determining vehicle acceleration immediately before an upshift to the next higher gear ratio occurs;

determining whether harshness of the upshift is acceptably and whether, after the upshift, vehicle speed falls below the vehicle speed before the upshift;

changing the vehicle acceleration existing immediately before an upshift to the next higher gear ratio occurs and repeating the operating step under substantially the same conditions;

determining on the basis of operating the motor vehicle a minimum vehicle acceleration corresponding to the throttle position immediately before the upshift such that after the ensuing upshift vehicle speed is maintained and harshness of the upshift is acceptable.

10. In an automotive vehicle driveline comprising a multiple speed automatic transmission having multiple gear ratio gearing, pressure-operated friction elements selectively engaged and released to produce multiple gear ratios through the gearing, a pressurized valve system having multiple shift control valves in a valve circuit that communicates with the friction elements, solenoid valves in said circuit for distributing selectively to said shift control valves a fluid pressure signal actuating said friction elements, an electronic processor and memory accessible to the processor, and an engine having a variable-position throttle, a method for preventing powertrain hunting comprising the steps of:

generating and transmitting to said processor a throttle position signal representing current position of the engine throttle;

generating and transmitting to said processor a vehicle speed signal representing current vehicle speed;

determining current vehicle acceleration from the current vehicle speed;

generating and transmitting to said processor a gear signal representing the currently engaged gear ratio;

storing in said memory shift control information for a current gear ratio including a predetermined function relating the current throttle position and a minimum vehicle acceleration at which a gear ratio upshift from the corresponding current gear ratio can occur and a predetermined function relating the current throttle position and a minimum vehicle speed at which a gear ratio upshift from the corresponding current gear ratio can occur;

comparing, for the current throttle position, the current vehicle acceleration to said minimum vehicle acceleration and the current vehicle speed to said minimum vehicle speed; and energizing and deenergizing the solenoid valves to produce a change in gear ratio by selectively engaging and releasing the friction elements in response to the result of said comparisons.

11. The method of claim 10 wherein the gear ratio change producing step includes preventing an upshift from the current gear unless the current vehicle acceleration exceeds the minimum vehicle acceleration and the current vehicle speed exceeds the minimum vehicle speed.

12. The method of claim 10 wherein the transmission operates in a driveline having an unknown or variable relation between vehicle speed and transmission output speed, further comprising:

determining the current engine speed;

determining a base NOV ratio of transmission output shaft speed to vehicle speed;

calculating a current NOV ratio from the current engine speed, the current vehicle speed, and the currently engaged gear ratio;

calculating a ratio of the current NOV ratio to the base NOV ratio and correcting said minimum vehicle speed using the ratio of current NOV ratio to base NOV ratio;

comparing the current vehicle speed to said corrected minimum vehicle speed; and producing a change in gear ratio by selectively engaging and releasing the friction elements in response to the result of said comparisons.

* * * * *